US010606161B2

(12) United States Patent
Hirata et al.

(10) Patent No.: US 10,606,161 B2
(45) Date of Patent: Mar. 31, 2020

(54) PROJECTION VIDEO DISPLAY APPARATUS

(71) Applicants: MAXELL, LTD., Kyoto (JP); HITACHI INDUSTRY & CONTROL SOLUTIONS, LTD., Ibaraki (JP)

(72) Inventors: Koji Hirata, Kyoto (JP); Masahiko Yatsu, Kyoto (JP); Kazuya Ozawa, Kyoto (JP)

(73) Assignees: Maxell, Ltd., Kyoto (JP); Hitachi Industry & Control Solutions, Ltd., Ibaraki (JP)

( * ) Notice: Subject to any disclaimer, the term of this patent is extended or adjusted under 35 U.S.C. 154(b) by 0 days.

(21) Appl. No.: 16/318,602

(22) PCT Filed: Jul. 19, 2016

(86) PCT No.: PCT/JP2016/071118
§ 371 (c)(1),
(2) Date: Jan. 17, 2019

(87) PCT Pub. No.: WO2018/015991
PCT Pub. Date: Jan. 25, 2018

(65) Prior Publication Data
US 2019/0243228 A1 Aug. 8, 2019

(51) Int. Cl.
G03B 21/56 (2006.01)
G02B 26/10 (2006.01)
(Continued)

(52) U.S. Cl.
CPC ............ G03B 21/56 (2013.01); G02B 26/10 (2013.01); G03B 21/2033 (2013.01);
(Continued)

(58) Field of Classification Search
CPC ........ G03B 21/56; G03B 21/60; G03B 21/58; G03B 21/625; G03B 21/62
(Continued)

(56) References Cited

U.S. PATENT DOCUMENTS

2005/0190419 A1* 9/2005 Ishihara ............... G02B 26/101
359/202.1
2006/0139718 A1* 6/2006 Ishihara ............... G02B 26/101
359/205.1
(Continued)

FOREIGN PATENT DOCUMENTS

| JP | 2000-222127 A | 8/2000 | |
| JP | 2005-234157 A | 9/2005 | |
| JP | 2006-178346 A | 7/2006 | |
| JP | 2006-195123 A | 7/2006 | |
| JP | 2010-139687 A | 6/2010 | |
| JP | 2011-027675 A | 2/2011 | |
| JP | 2011027675 * | 2/2011 | ............ G01B 11/00 |

(Continued)

OTHER PUBLICATIONS

International Search Report for PCT/JP2016/071118, dated Oct. 4, 2016.

Primary Examiner — Clayton E. LaBalle
Assistant Examiner — Kevin C Butler
(74) Attorney, Agent, or Firm — Volpe and Koenig, P.C.

(57) ABSTRACT

A projection video display apparatus includes: a video projection screen, having a front and a rear surface, arranged in an indoor space. The video projection screen transmits video light from behind the rear surface or in front of the front surface to display video on the front surface. The front surface functions as a video display surface. A video projecting apparatus, arranged in a side of the rear surface or the front surface, enlarges and projects the video light from the rear or front surface. The video projecting apparatus is configured by an optical scanning video projecting apparatus that forms the video by scanning video light composed of coherent light on the video projection screen. The video projection screen guides the video light from the video projecting apparatus toward a direction to the front surface, and causes part of the light in the indoor space to be transmitted therethrough.

9 Claims, 42 Drawing Sheets

(51) Int. Cl.
*G06F 3/041* (2006.01)
*H04N 9/31* (2006.01)
*G03B 21/20* (2006.01)

(52) U.S. Cl.
CPC ..... *G03B 21/2066* (2013.01); *G03B 21/2073* (2013.01); *G06F 3/041* (2013.01); *H04N 9/3129* (2013.01); *H04N 9/3135* (2013.01); *H04N 9/3179* (2013.01); *H04N 9/3194* (2013.01)

(58) Field of Classification Search
USPC .......................................................... 359/443
See application file for complete search history.

(56) References Cited

U.S. PATENT DOCUMENTS

| | | | | |
|---|---|---|---|---|
| 2011/0205456 A1* | 8/2011 | Mizoguchi | ........... | G02B 5/0236 349/5 |
| 2011/0298993 A1* | 12/2011 | Hirata | .............. | B29D 11/00269 348/744 |
| 2014/0126033 A1* | 5/2014 | Hirata | .................... | G02B 17/08 359/202.1 |

FOREIGN PATENT DOCUMENTS

| | | | |
|---|---|---|---|
| JP | 2011-175110 A | 9/2011 | |
| JP | 2011-253130 A | 12/2011 | |
| WO | 2012/176235 A1 | 12/2012 | |
| WO | WO-2012176235 A1 * | 12/2012 | ............. G02B 17/08 |

* cited by examiner

FIG. 15
(a)  (b)
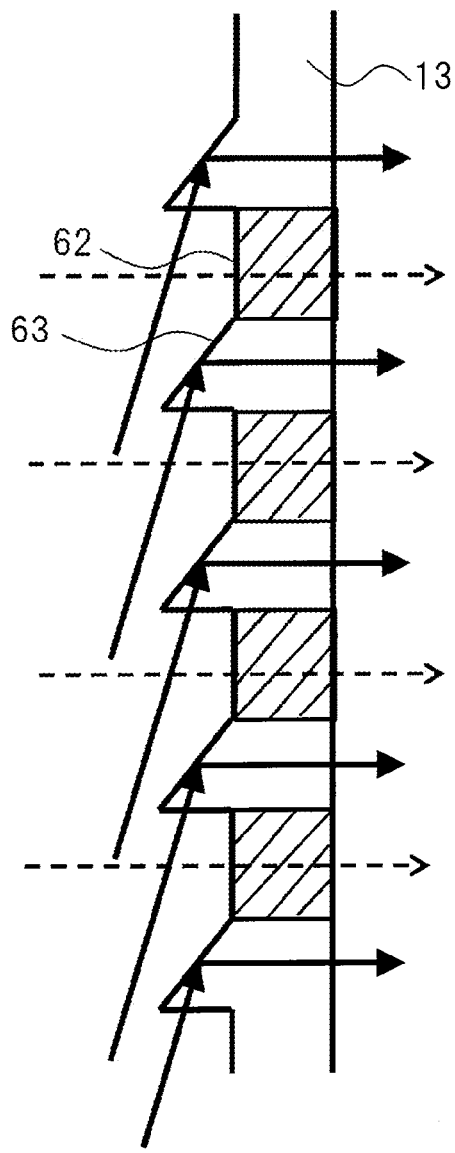
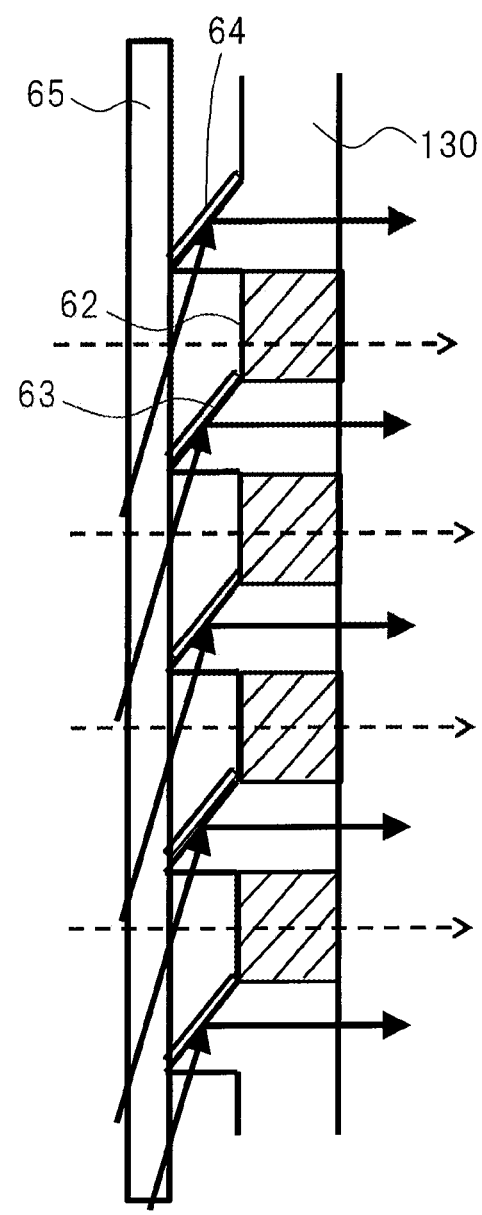

FIG. 25
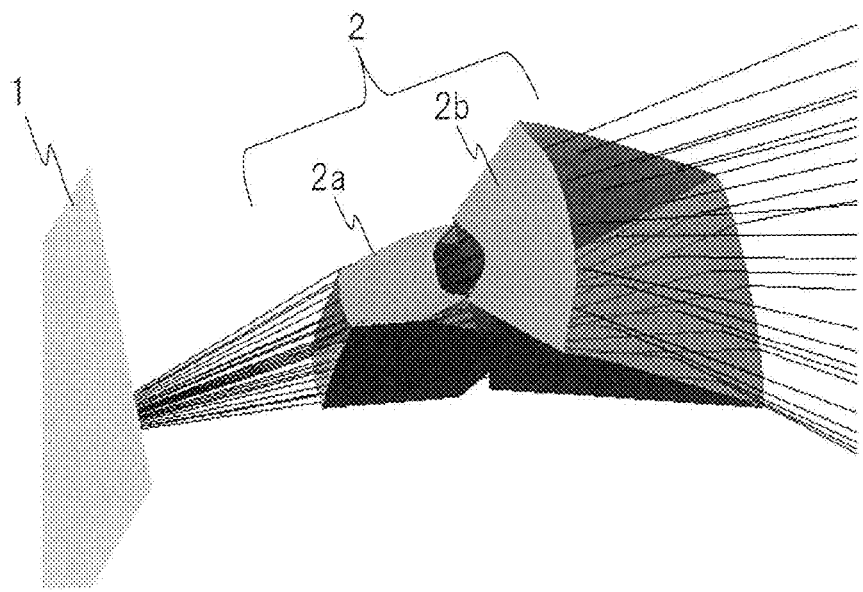
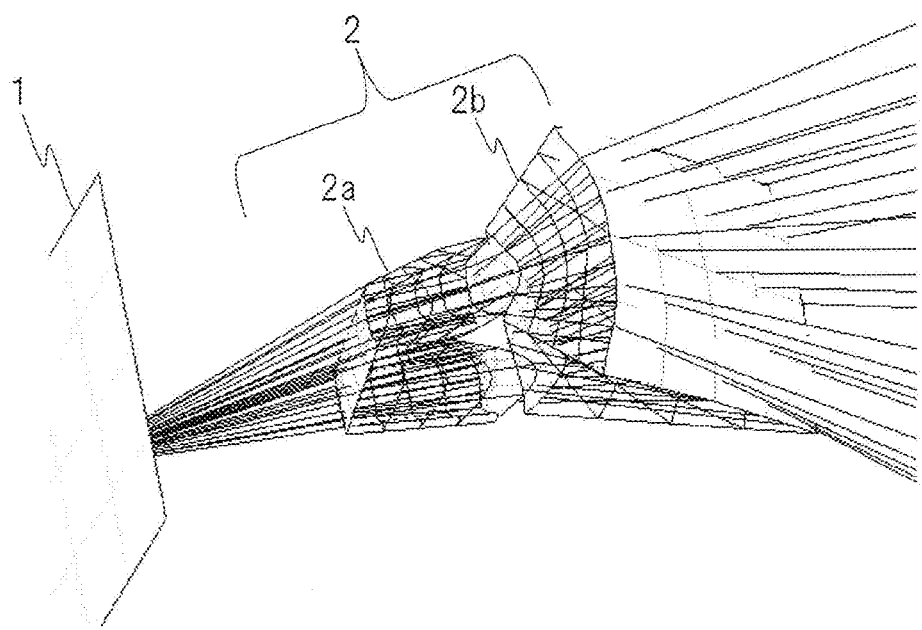

FIG. 35
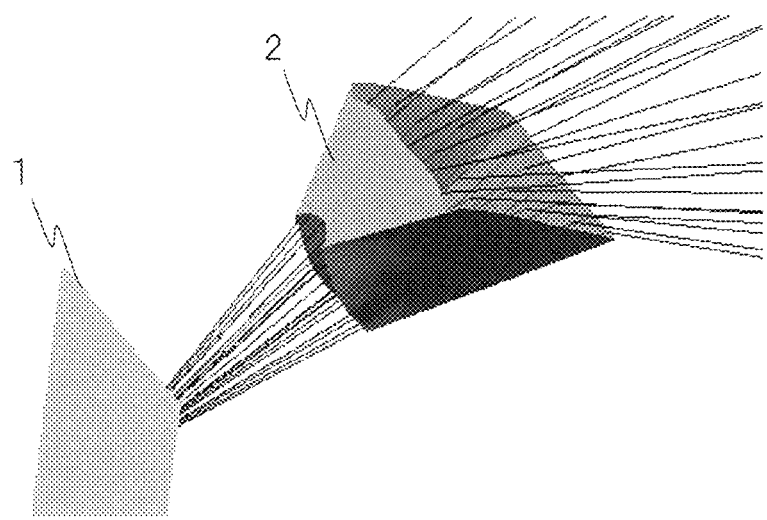
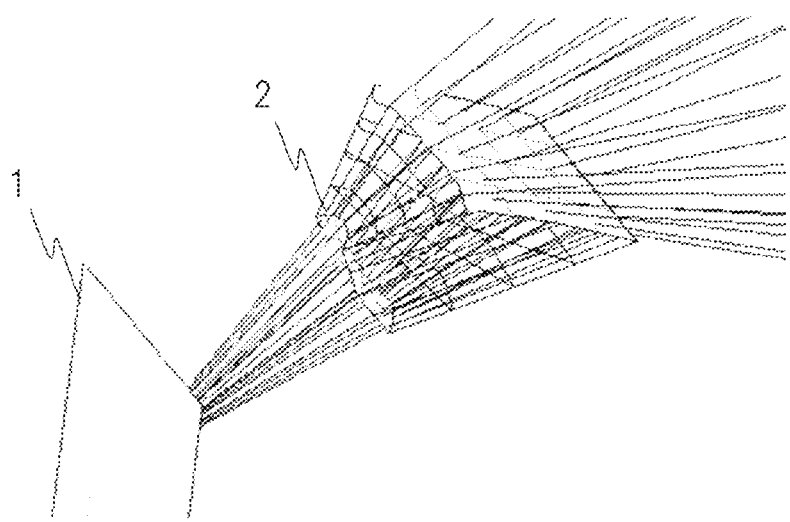

FIG. 39
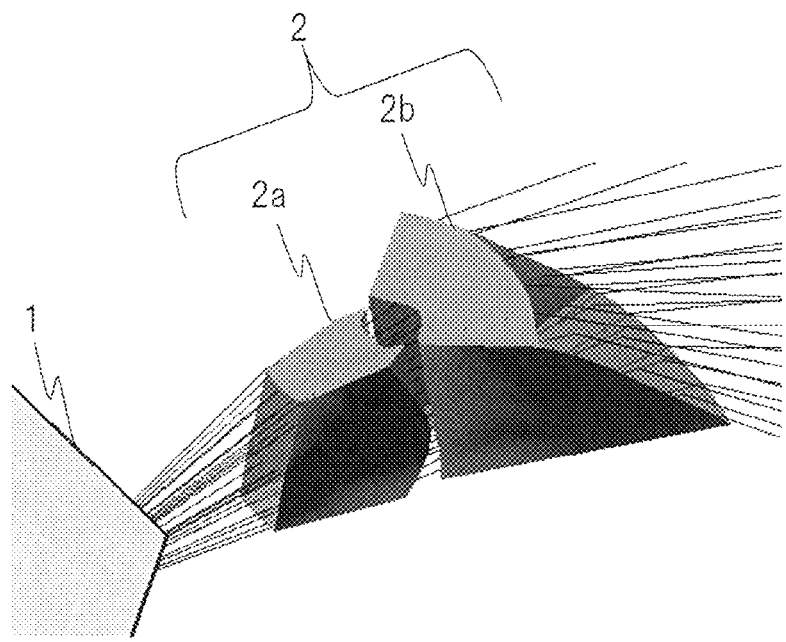
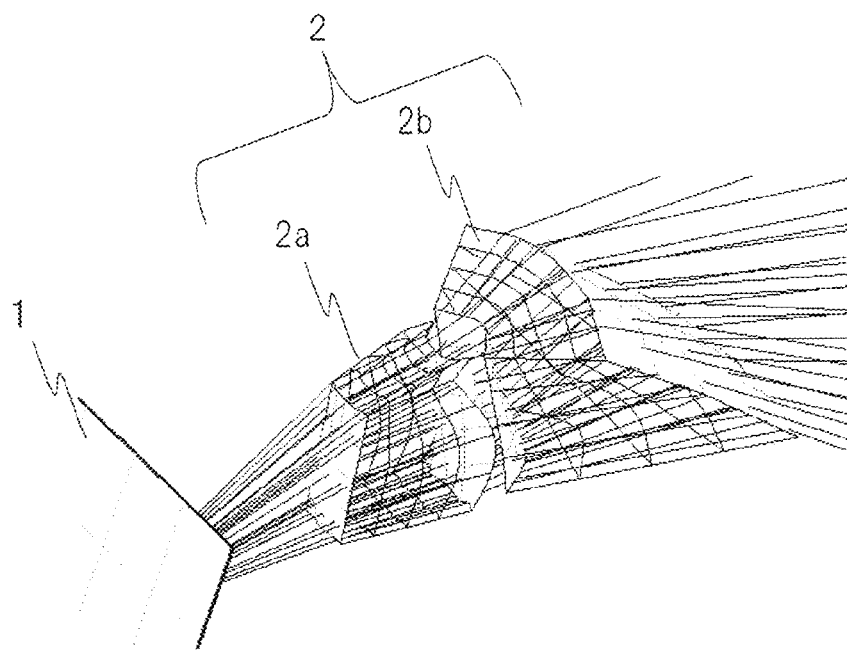

FIG. 40
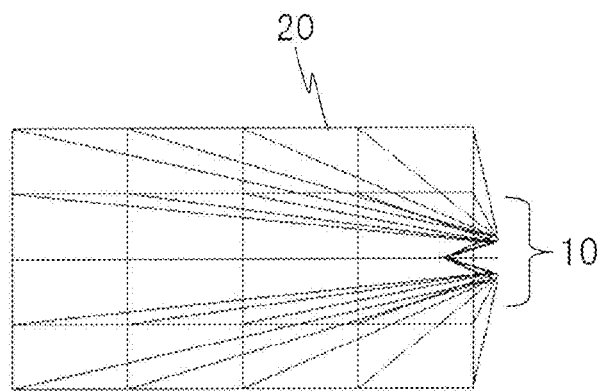
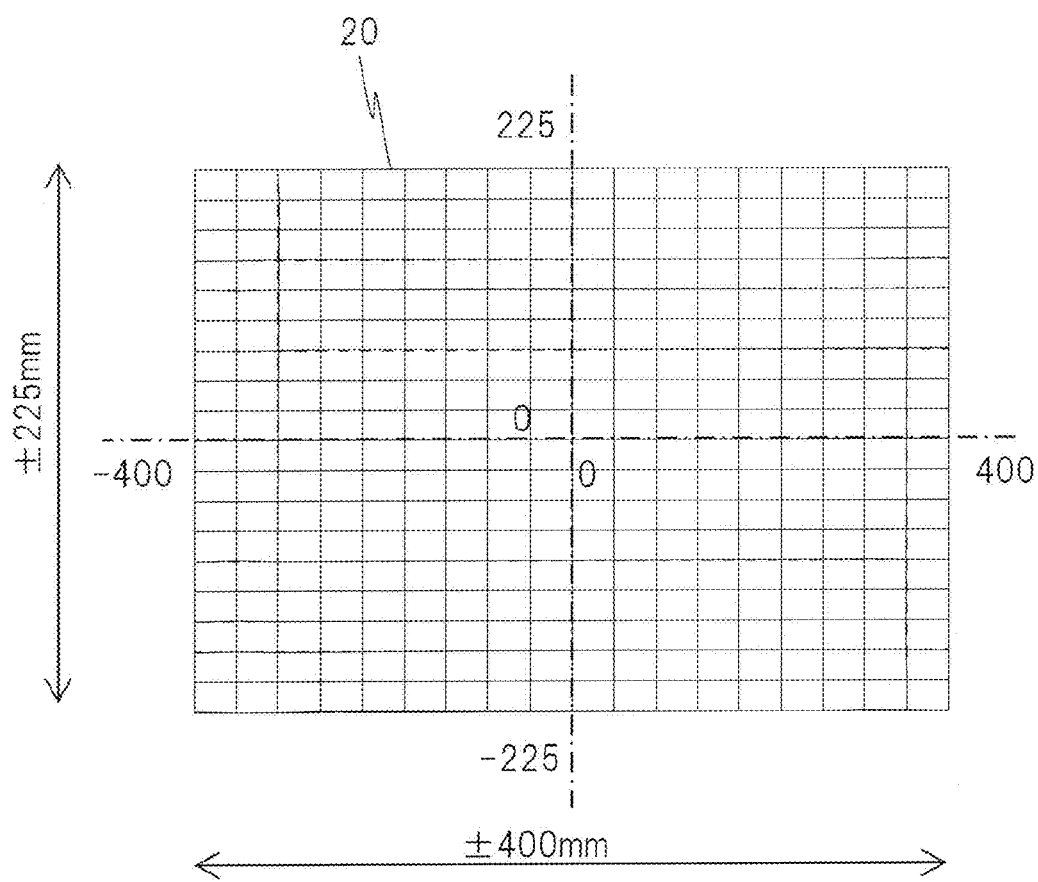

PROJECTION VIDEO DISPLAY APPARATUS

TECHNICAL FIELD

The present invention relates to a projection video display apparatus that projects video onto a transmission projected surface from behind a rear surface or in front of a front surface thereof to display the video.

BACKGROUND ART

Development of a large and flat video display apparatus is remarkable. In recent years, a video display apparatus using a so-called flat panel such as an organic EP panel, for example, is widely diffused in place of a projection video display apparatus that has been widely diffused conventionally. However, the projection video display apparatus can be manufactured at relatively low cost, is light and has excellent portability. In addition to usage as a television receiver, by making use of its characteristics, the projection video display apparatus is widely used as a video display apparatus in education scenes, a conference room or the like, for example.

In a conventional projection video display apparatus, as disclosed in Patent document 1 below, which has been proposed by inventors of the present application and has already been disclosed, for example, a projection video display apparatus that does not require a housing, can be manufactured at low cost, and has excellent portability is realized.

RELATED ART DOCUMENTS

Patent Documents

Patent document 1: Japanese Patent Application Publication No. 2011-253130

SUMMARY OF THE INVENTION

Problems to be Solved by the Invention

However, the video display apparatus including a rear projection type has been widely used in order to display broadcast video or an image of a personal computer. Thus, various improvements suitable for its usage environment are required. For that reason, various improvements for the projection video display apparatus are also required, such as reduction of its manufacture price and power consumption, miniaturization and weight saving, its portability, or its design property in the room interior in which the apparatus is arranged.

Thus, the present invention provides a projection video display apparatus that has an extremely new configuration to project video from behind a rear surface or in front of a front surface thereof in place of a general configuration of a conventional video display apparatus. In particular, it is an object of the present invention to provide an improved projection video display apparatus including reduction of a manufacturing price, reduction of power consumption (ultra-low power consumption), miniaturization and weight saving of the apparatus, and its design property.

Means for Solving the Problem

In order to achieve the object described above, according to the present invention, as one example, a projection video display apparatus is provided that includes: a video projection screen arranged in an indoor space in a state where both surfaces of the video projection screen are exposed to the indoor space, both surfaces including a rear surface and a front surface, the video projection screen being configured to transmit video light to display video on the front surface, the video light being projected from behind the rear surface or in front of the front surface of the video projection screen, the front surface functioning as a video display surface; and a video projecting apparatus arranged at a predetermined position in a side of the rear surface or the front surface of the video projection screen, the video projecting apparatus being configured to enlarge and project the video light from the rear surface or the front surface of the video projection screen, wherein the video projecting apparatus is configured by an optical scanning video projecting apparatus that forms the video by scanning video light on the video projection screen, the video light being composed of coherent light, and wherein the video projection screen is configured to guide the video light composed of the coherent light from the video projecting apparatus toward a direction to the front surface of the video projection screen, and to cause part of the light in the indoor space to be transmitted therethrough.

Effects of the Invention

According to the present invention, excellent effects are exhibited that an improved projection video display apparatus is provided by which: excellent video can be obtained without requiring a housing that covers the whole apparatus; folding can be carried out easily; portability is excellent; the apparatus can be manufactured at low cost; power consumption can be greatly reduced; and miniaturization and weight saving of the apparatus, and its design property are included.

BRIEF DESCRIPTIONS OF THE DRAWINGS

FIG. 15 is a partially enlarged sectional view illustrating a more detailed configuration of the above semitransparent screen;

FIG. 25 is an enlarged view of a freeform surface lens in the above optical scanning video projecting apparatus according to the first embodiment;

FIG. 35 is an enlarged view of a freeform surface lens in the above optical scanning video projecting apparatus according to the second embodiment;

FIG. 39 is an enlarged view of a freeform surface lens in the above optical scanning video projecting apparatus according to the third embodiment;

FIG. 40 is a distortion performance diagram of the above optical scanning video projecting apparatus according to the third embodiment;

DETAILED DESCRIPTION OF PREFERRED EMBODIMENTS

Figure 1:
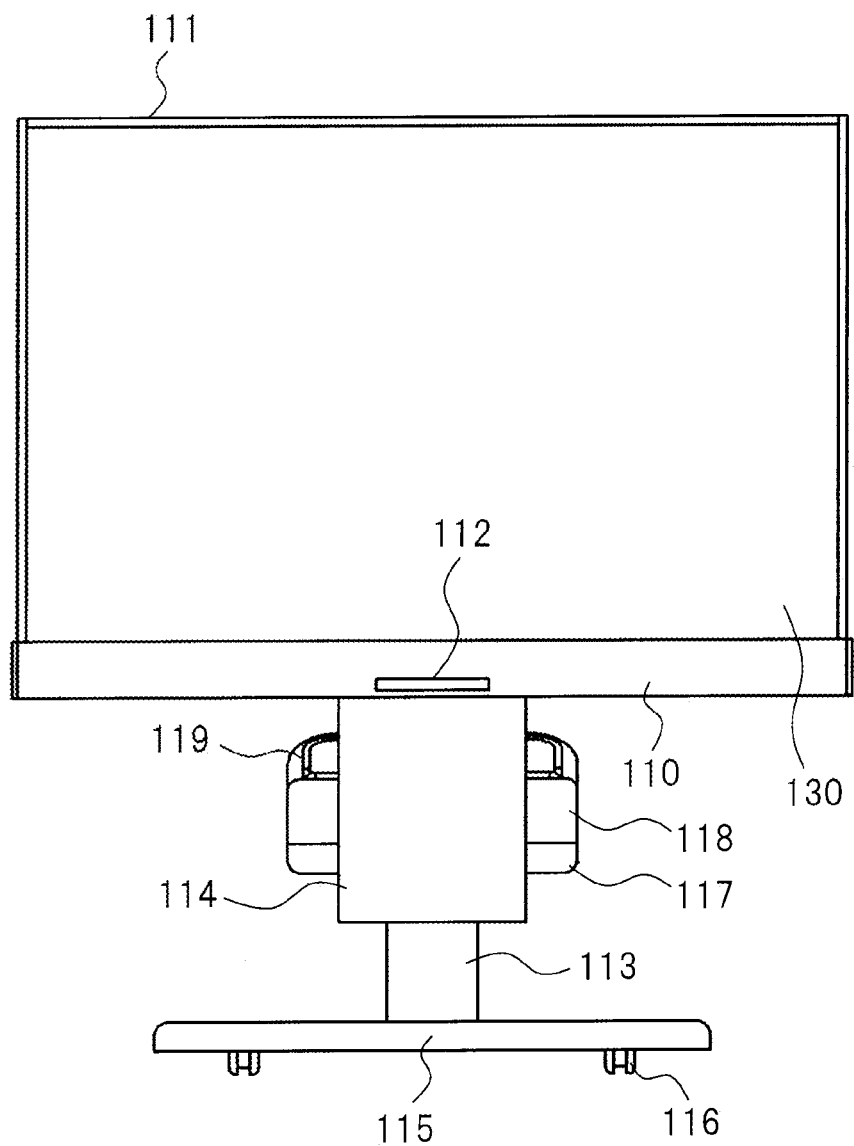
FIG. 1 is a front view illustrating the overall structure of a rear system projection board apparatus (rear projection video display apparatus) according to one embodiment of the present invention.

Hereinafter, one embodiment of the present invention will be described in detail with reference to the accompanying drawings. In the following drawings, the same reference numeral is assigned to components each having a common function, and explanation of components that have been explained once will be omitted thereafter.

Figure 2:
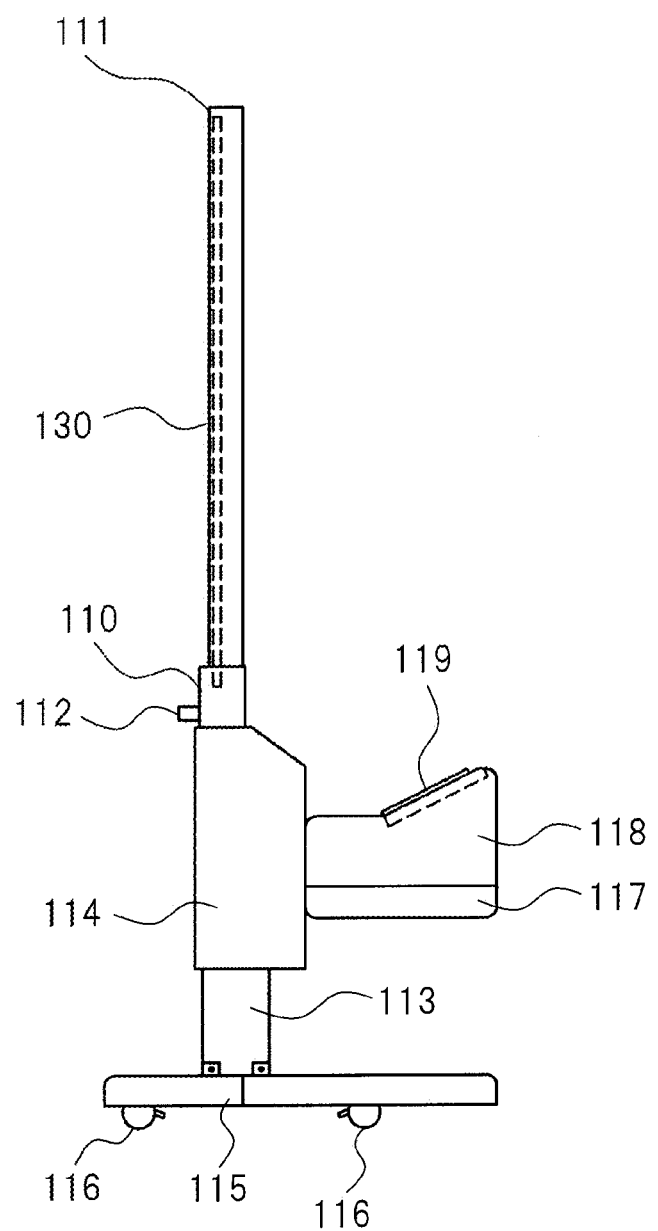
FIG. 2 is a side view illustrating the overall structure of the rear system projection board apparatus (rear projection video display apparatus) according to one embodiment of the present invention.
Figure 3:
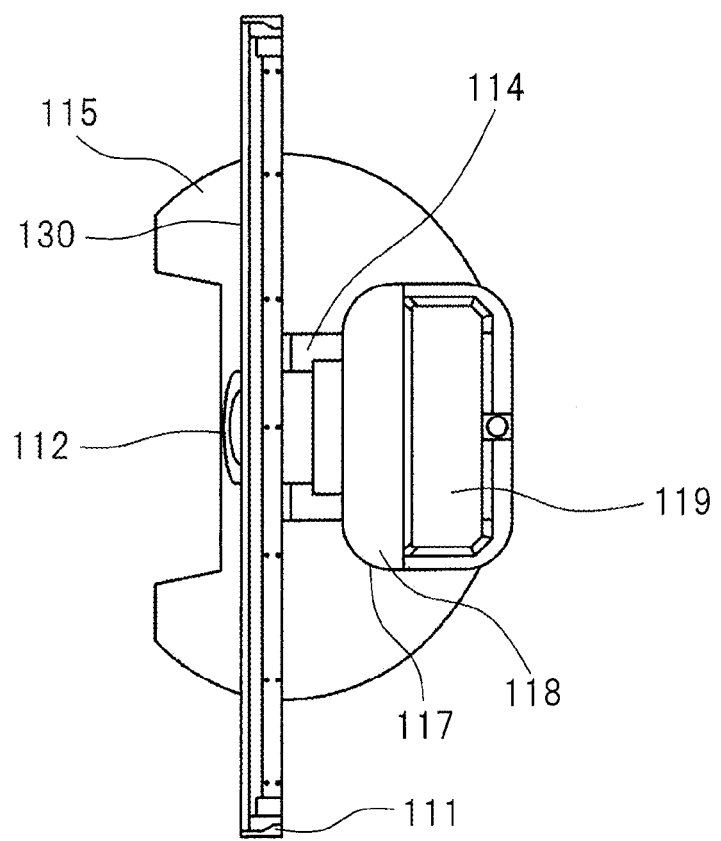
FIG. 3 is a top view illustrating the overall structure of the rear system projection board apparatus (rear projection video display apparatus) according to one embodiment of the present invention.

FIG. 1 to FIG. 3 accompanied thereto first respectively illustrate a front view, a side view, and a top view of the overall structure of a so-called rear system projection board apparatus (that is, rear projection video display apparatus) according to one embodiment of the present invention. In these drawings, a reference numeral 130 denotes a semitransparent projection screen whose detailed structure will be described below. A landscape-oriented screen in which aspect ratio of a projection (display) surface thereof is 16:9 is illustrated, for example. This semitransparent screen 130 is surrounded by a support frame 111. A handle 112 is installed substantially at the center of a support frame stiffened member 110 provided on a lower portion of the semitransparent screen 130. The handle 112 protrudes to a side of a display surface in a "C-shaped" or "U-shaped" manner.

Thus, the semitransparent screen 130 described above is vertically arranged in an upright state, that is, on a floor surface by a screen holder (stand) 113 in an indoor space such as a classroom or a conference room, for example. More specifically, a screen holder 114 whose external shape is a box-like shape is installed on an upper portion of the screen holder (stand) 113. The screen 130 described above is detachably mounted and fixed on a top surface of the screen holder 114. Further, a leg 115 whose external form is a substantially elliptic shape is formed on a lower end of this screen holder (stand) 113 (see FIG. 3). Apart of the leg 115 is cut out. Moreover, casters 116 for movement are provided on a bottom surface of the leg 115. This realizes a projection board that can move easily as the whole apparatus.

Moreover, a member for arranging an optical scanning video projecting apparatus therein, that is, a projector installation part 117 is detachably provided at a side of a rear surface of the screen holder 114 described above. A detailed structure of the projector installation part 117 will be described later. Note that a reference numeral 118 denotes a wall portion that is a part of the projector installation part 117 and forms a storage space for the optical scanning video projecting apparatus. According to the configuration described above, as is apparent from the drawings, it is possible to arrange the optical scanning video projecting apparatus at a desired position with respect to the semitransparent screen 130 described above by mounting the optical scanning video projecting apparatus on the projector installation part 117. Further, a reference numeral 119 in the drawings denotes a transmissive window, which is installed above a part of the projector installation part 117 described above, for causing video light from the optical scanning video projecting apparatus to transmit toward the outside (that is, toward the semitransparent screen 130). For example, the transmissive window may be provided merely as a space. Alternatively, the transmissive window may be formed by fitting a transparent body such as glass therein.

Figure 4:
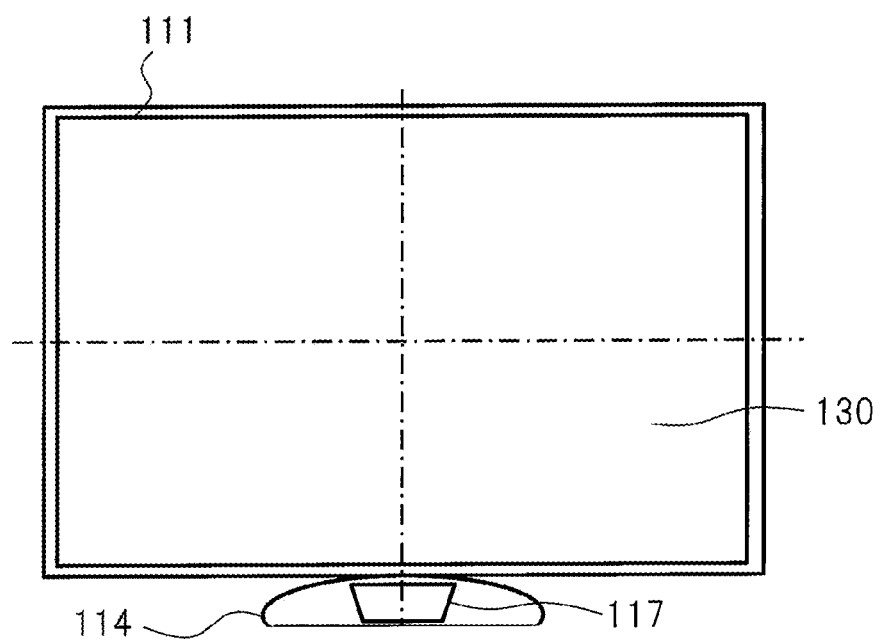
FIG. 4 is a front view illustrating the overall structure of a small front system projection board apparatus (front projection video display apparatus) according to another embodiment of the present invention.
Figure 5:
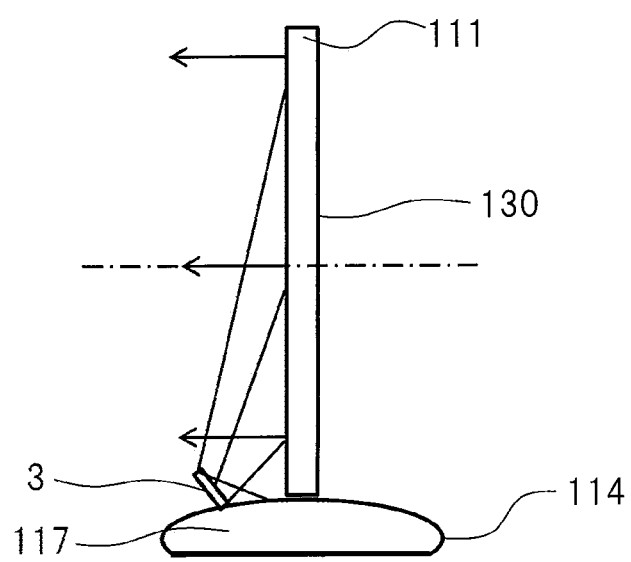
FIG. 5 is a side view illustrating the overall structure of the small front system projection board apparatus (front projection video display apparatus) according to another embodiment of the present invention.
Figure 6:
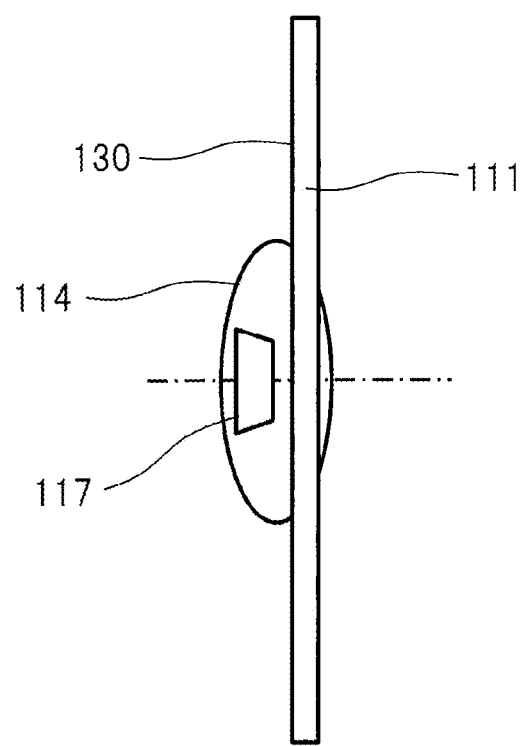
FIG. 6 is a top view illustrating the overall structure of the small front system projection board apparatus (front projection video display apparatus) according to another embodiment of the present invention.

FIG. 4 to FIG. 6 are respectively a front view, a side view, and a top view illustrating the overall structure of a so-called front system projection board apparatus (that is, front projection video display apparatus) according to another embodiment of the present invention, for example. The front system projection board apparatus is small one for table use that can be mounted on a top surface of a table or the like. In these drawings, a reference numeral 130 also denotes a semitransparent projection screen. This semitransparent screen 130 is surrounded by the support frame 111. A screen holder 114 with a substantially elliptic shape is provided at a substantially central portion of the support frame stiffened member under the semitransparent screen 130. The screen 130 described above is detachably fixed on the screen holder 114.

A portion for arranging the optical scanning video projecting apparatus therein, that is, a projector installation part 117 is formed at a side of a front surface of this screen holder 114. Note that FIG. 5 illustrates a state where an optical path folding mirror (freeform surface mirror) 3 protrudes from the projector installation part 117.

Figure 7:
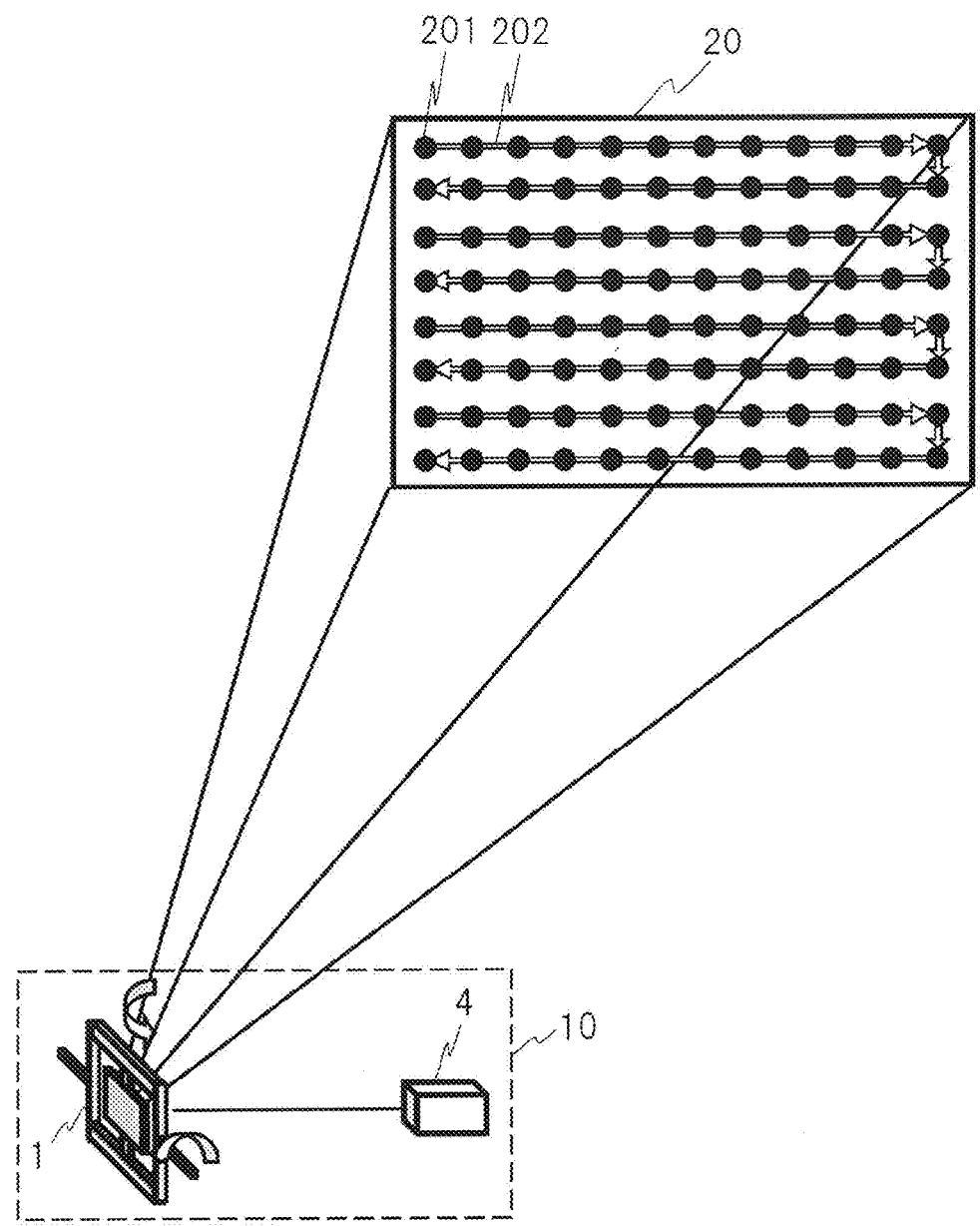
FIG. 7 is a view illustrating an optical scanning video projecting apparatus in the above rear system or front system projection board apparatus in principle.

Subsequently, FIG. 7 illustrates an optical scanning video projecting apparatus 10 in principle. The optical scanning video projecting apparatus 10 constitutes an optical scanning video projecting apparatus that projects desired video onto the semitransparent screen 130 described above in the rear system or front system projection board apparatus (rear surface or front projection video display apparatus) according to the present invention. Namely, in FIG. 7, laser beam from a light source 4 is reflected by a scanning mirror (optical scanning unit) 1 having a swing shaft, whereby it is possible to scan the laser beam. Conceptually, each pixel 201 that has been modulated is two-dimensionally scanned on an image plane along a scan locus 202.

Figure 8:
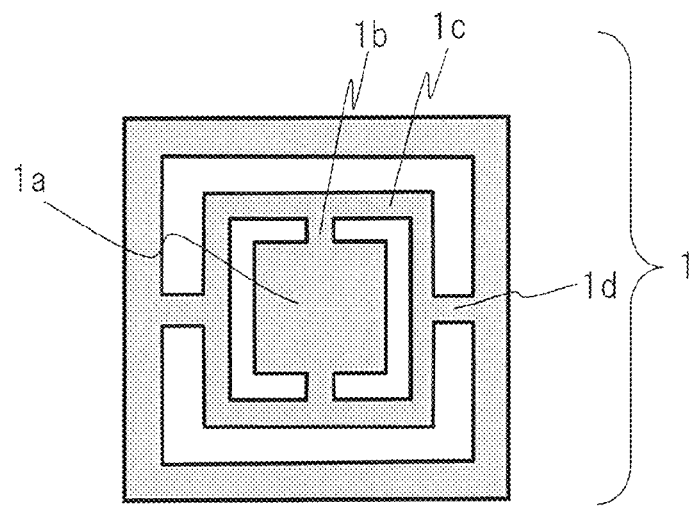
FIG. 8 is a view illustrating one example of a structure of an optical scanning unit that constitutes the above optical scanning video projecting apparatus.

Next, details of a two-dimensional deflection operation in the optical scanning unit 1 described above will be described with reference to FIG. 8. In the optical scanning unit 1 illustrated in FIG. 8, a scanning mirror surface 1a is coupled to first torsional springs 1b. The scanning mirror surface 1a deflects laser beam with a reflection angle. The first torsional springs 1b are arranged coaxially with the scanning mirror surface 1a so as to put the scanning mirror surface 1a therebetween and be opposed to each other. The torsional springs 1b are coupled to a holding member 1c. Moreover, the holding member 1c is coupled to second torsional springs 1d. Permanent magnets and coils (not illustrated in FIG. 8) are arranged at positions substantially symmetrical about each of the torsional springs 1b and 1d. These coils are formed in substantially parallel to the mirror surface 1a of the scanning mirror 1. When the mirror surface 1a of the scanning mirror 1 is in a stationary state, a magnetic field substantially parallel to the mirror surface 1a is generated. When current flows into the coils, a Lorentz force substantially Perpendicular to the mirror surface 1a is generated on the basis of a Fleming's left hand rule.

This causes the mirror surface 1a to swing to a position at which the Lorentz force balances restoring forces of the torsional springs 1b and 1d. With respect to the torsional spring 1b, by supplying alternating current with resonance frequency of the mirror surface 1a to each of the coils, the mirror surface 1a carries out a resonance operation. Similarly, with respect to the torsional spring 1d, by supplying alternating current with resonance frequency of a combination of the mirror surface 1a and the holding member 1c to each of the coils, the mirror surface 1a, the torsional spring 1b, and the holding member 1c carry out a resonance operation. This makes it possible to carry out the resonance operations for two directions based on the different resonance frequencies.

Figure 9:
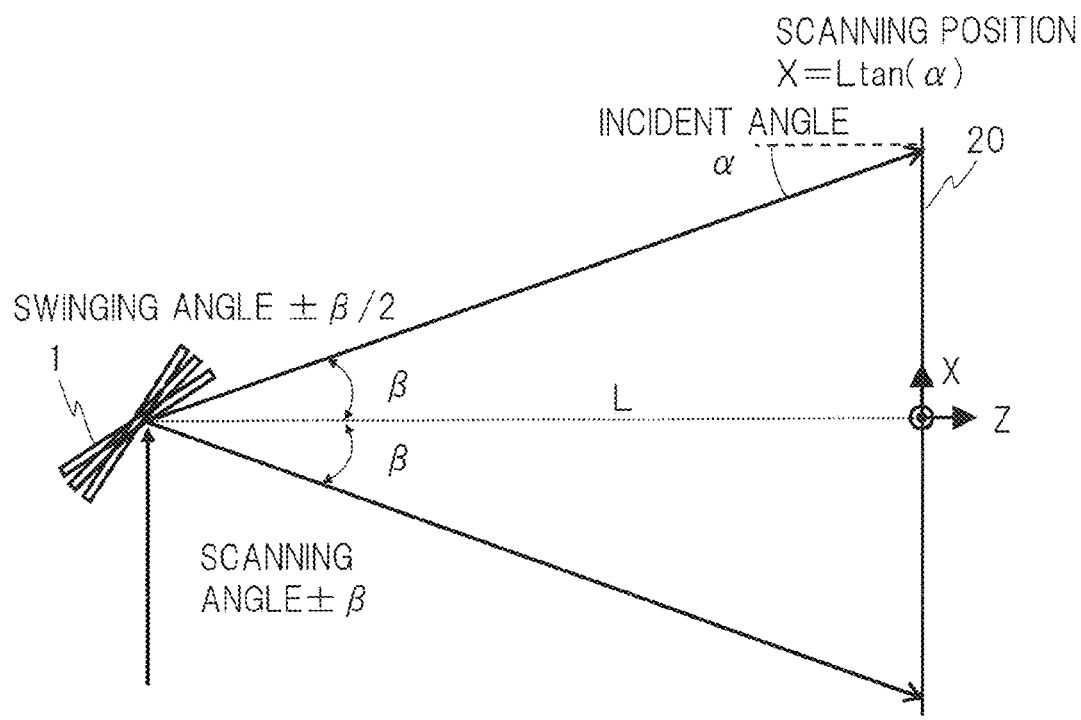
FIG. 9 is a view illustrating one example of an operation of the optical scanning unit that constitutes the above optical scanning video projecting apparatus.

More specifically, in FIG. 9, in a case where a swinging angle of the scanning mirror 1, which is a reflective surface of the optical scanning unit, is set to β/2, a scanning angle that is an angle of a reflected ray is changed into β, which is twice the swinging angle. Here, in a case where no optical element is arranged between the scanning mirror 1 and an image plane 20, the scanning angle β is equal to an incident angle α with respect to the image plane 20. Therefore, a size of a scan image with respect to a certain projection distance is determined by the swinging angle β/2 of the scanning mirror 1.

Figure 10:
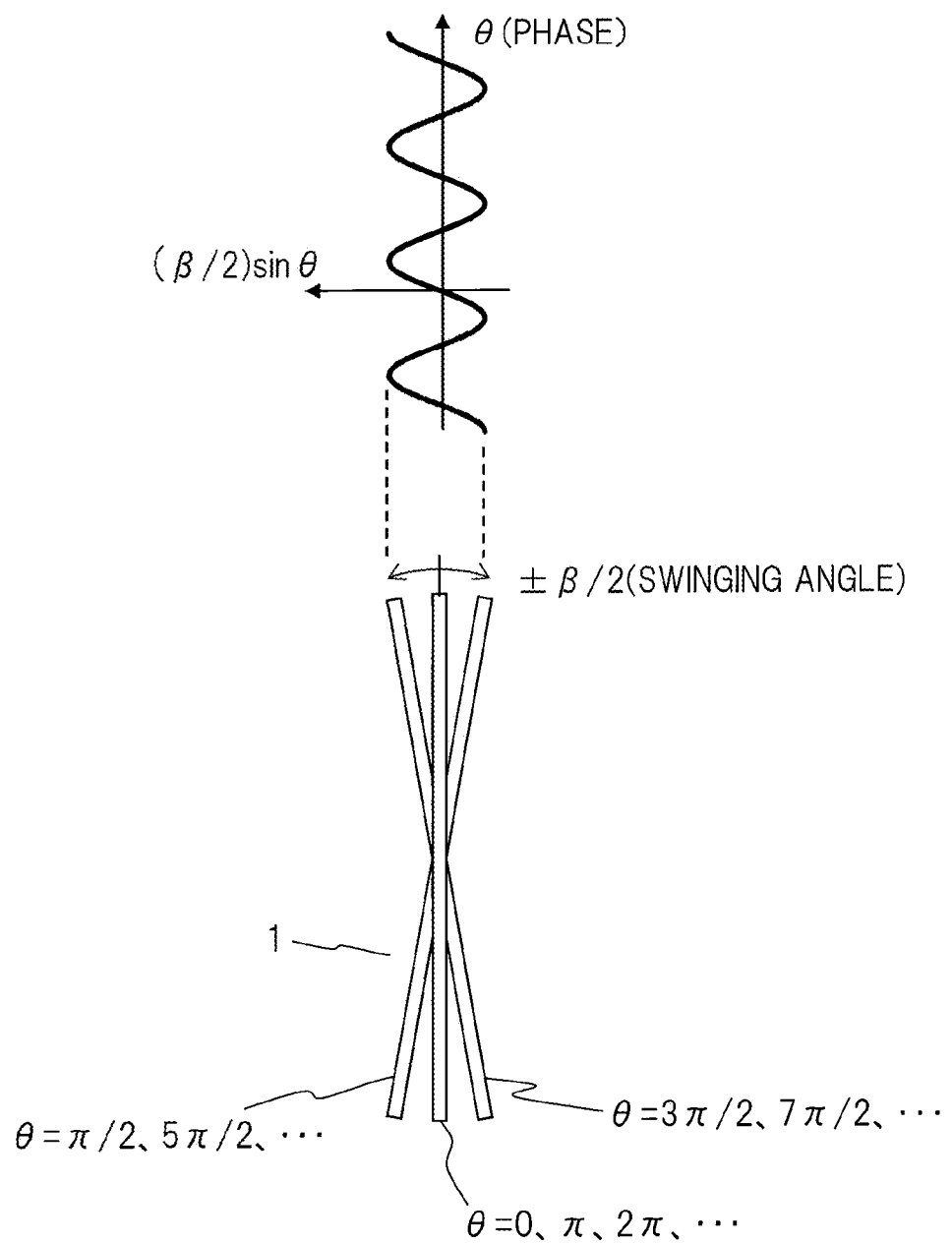
FIG. 10 is a view illustrating a change in an oscillation angle due to a phase of the above optical scanning unit.
Figure 11:
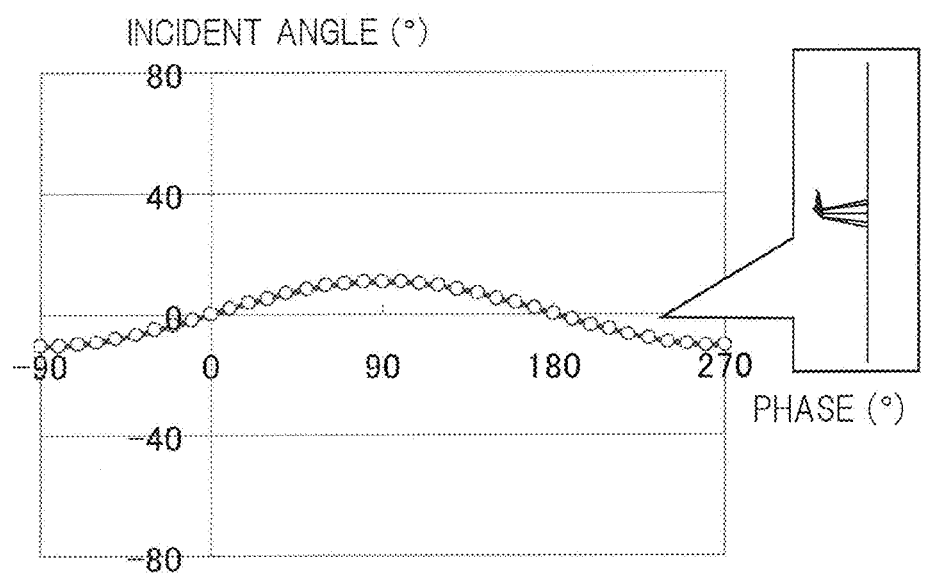
FIG. 11 is a view illustrating a relationship between the phase and the oscillation angle during a general resonance operation of the above optical scanning unit.
Figure 12:
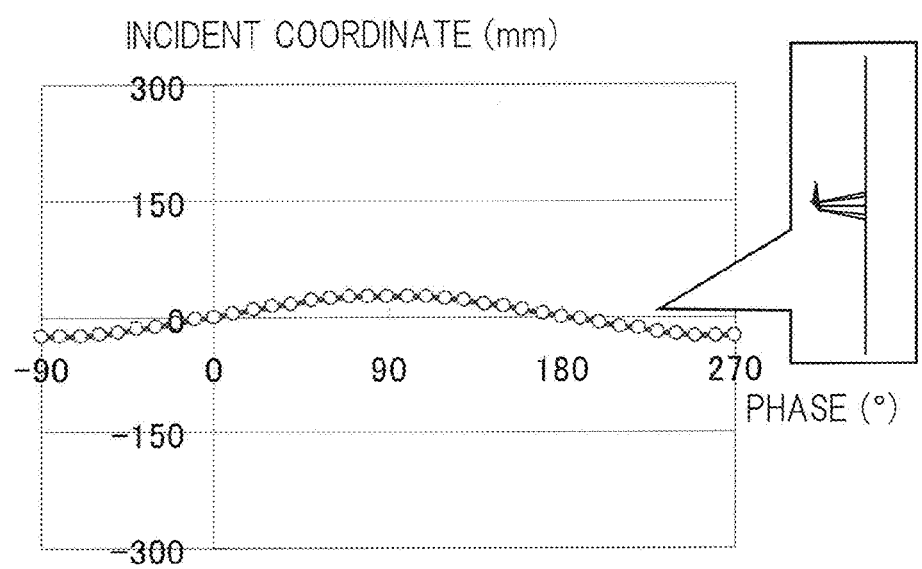
FIG. 12 is a view illustrating a relationship between the phase and a scan coordinate (or an incident coordinate) during the general resonance operation of the above optical scanning unit.

Next, a general resonance action that is an operation of the scanning mirror 1 will be described with reference to FIG. 10. In a case where the scanning mirror 1 with the swinging angle ±β/2 is driven by a resonance operation, that is, in a sinusoidal shape, a direction of the scanning mirror 1 changes in a range of ±β/2 in the sinusoidal shape. Specifically, FIG. 11 illustrates an example of a case where the scanning mirror 1 with a swinging angle of ±5.3° is used. Here, the scanning angle becomes ±10.6° that is twice, and the incident angle with respect to the image plane 20 also becomes ±10.6°. Thus, a scan coordinate illustrated in FIG. 12 is a scan coordinate on the image plane 20 in a case where a space for arrangement of any optical element is secured, and has a sinusoidal characteristic similar to that in FIG. 11.

Note that as a driving system of the scanning mirror 1, in addition to a resonance type mirror that sinusoidally changes a swinging angle, there is a galvanometer mirror that changes a swinging angle in a sawtooth wave-like manner. However, the resonance type mirror whose drive frequency is high is suitable for display with high resolution.

Further, in the above explanation, the optical scanning video projecting apparatus 10 configured to project video onto the semitransparent screen 130 described above was arranged under the semitransparent screen 130. More specifically, the optical scanning video projecting apparatus 10 was arranged adjacent to a part of a periphery at a rear surface side thereof, that is, is arranged within the projector installation part 117 provided substantially at a central portion along a lower edge of the screen. However, arrangement of the optical scanning video projecting apparatus 10 is not limited to the above example. It is obvious for a person having ordinary skill in the art that the optical scanning video projecting apparatus 10 may be installed along an upper edge or a side edge of the screen 130 in place of the above, for example. Further, although it will be described later, the number of the optical scanning video projecting apparatus 10 provided so as to be adjacent to a part of the periphery of the screen 130 is not limited to one as described above. A plurality of optical scanning video projecting apparatuses 10 may be installed.

Figure 13:
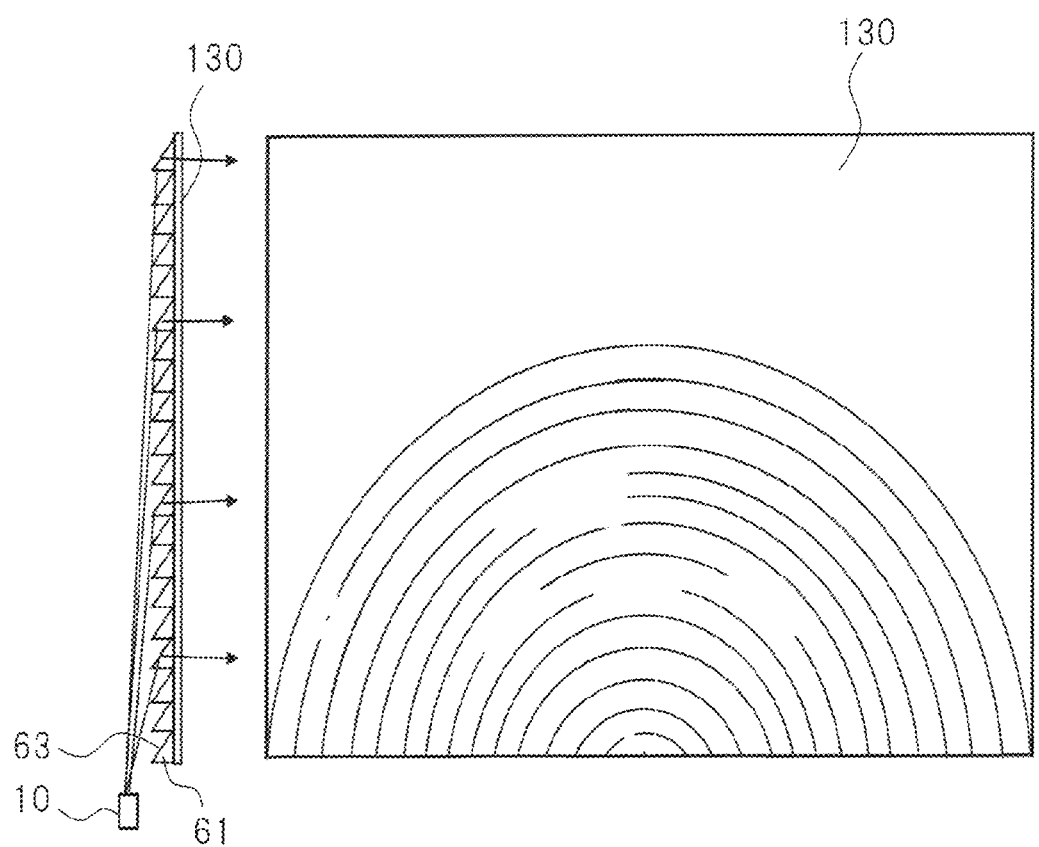
FIG. 13 is a view illustrating a concrete configuration (circular Fresnel lens) of a semitransparent screen in the above rear system projection board apparatus.
Figure 14:
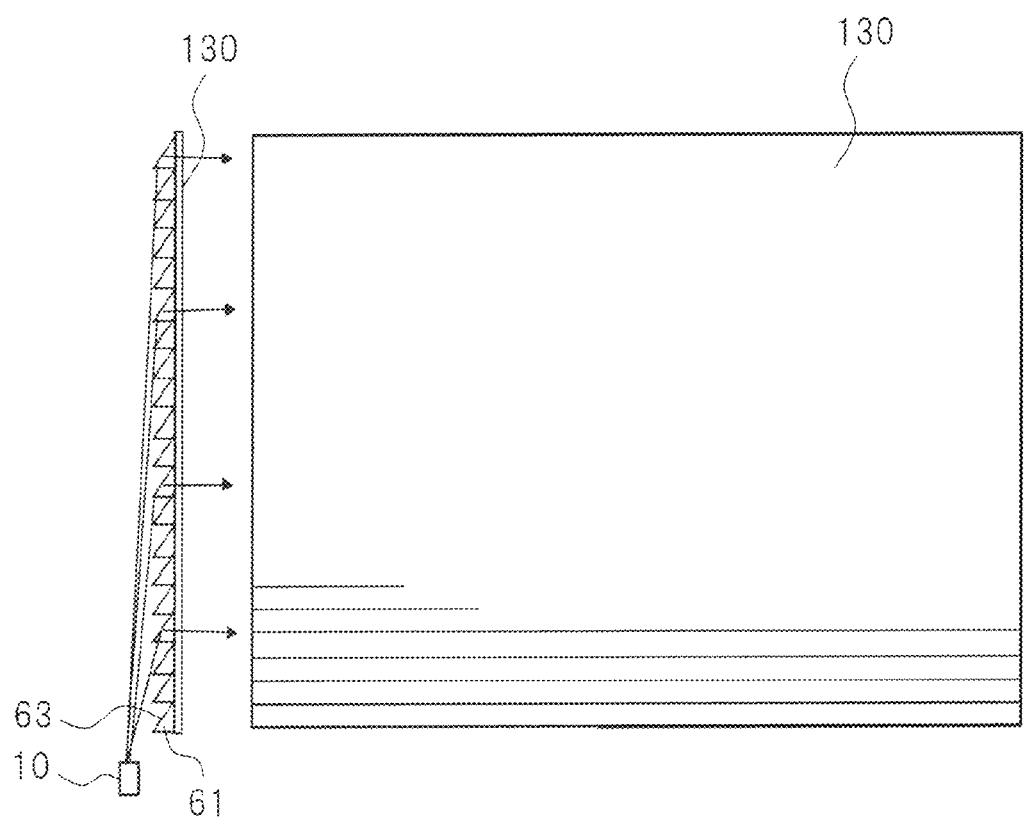
FIG. 14 is a view illustrating a concrete configuration (linear Fresnel lens) of the semitransparent screen in the above rear system projection board apparatus.

Subsequently, FIG. 13 and FIG. 14 illustrate a concrete configuration of the semitransparent screen 130 in the rear system projection board apparatus (rear projection video display apparatus) described above. This semitransparent screen 130 is configured by a board made of polycarbonate or the like, a sheet-like resin material sheet such as a PET sheet, or a glass plate, for example. As is also apparent from the drawings, a large number of optical path changers 61 are formed on a rear surface of the semitransparent screen 130 (that is, a light source side opposite to an observer side). The optical path changers 61 have a cross section of a continuous triangular shape (sawtooth wave shape), and have an action to refract the light (laser beam) described above by which a scan screen is formed and change it into light toward the side of the observer (that is, a viewer). Namely, the optical path changers 61 change a direction of the light into a direction substantially perpendicular to the scan screen to emit the light to a scanning image viewing side. As a concrete example of these optical path changers 61, for example, the optical path changers 61 may be formed as an (eccentric) circular Fresnel lens as illustrated in FIG. 13, or may be formed as a linear Fresnel lens as illustrated in FIG. 14.

Moreover, as illustrated in FIG. 15(a), the semitransparent screen 130 may also be formed so that flat portions 62 each having a predetermined distance are respectively provided between adjacent optical path changers 61 (semitransparent type). Note that in the present embodiment, these optical path changers 61 are formed at pitches (or intervals) from about 30 μm to 100 μm as one example. In addition, as illustrated in FIG. 15(b), a plate-like transparent protective plate 65 may also be provided on the rear surface of the semitransparent screen 130 (that is, a surface on which the optical path changers 61 are formed).

Figure 16:
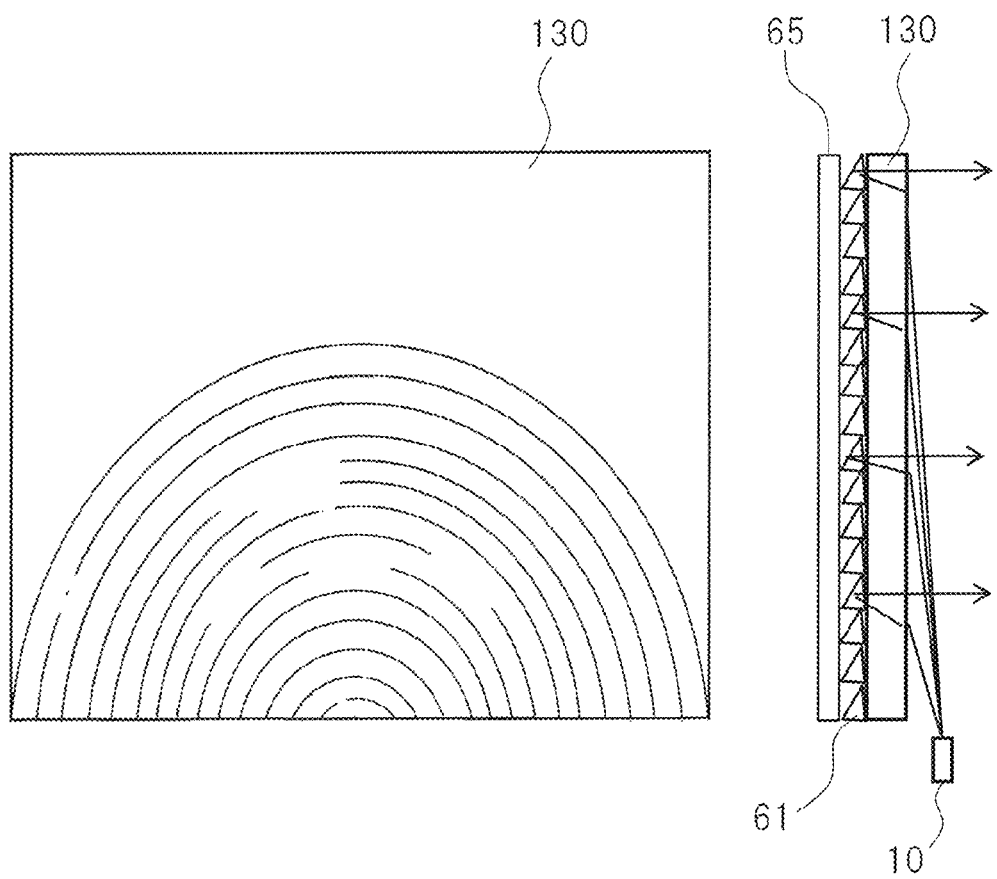
FIG. 16 is a view illustrating a concrete configuration (circular Fresnel lens) of the semitransparent screen in the above front system projection board apparatus.
Figure 17:
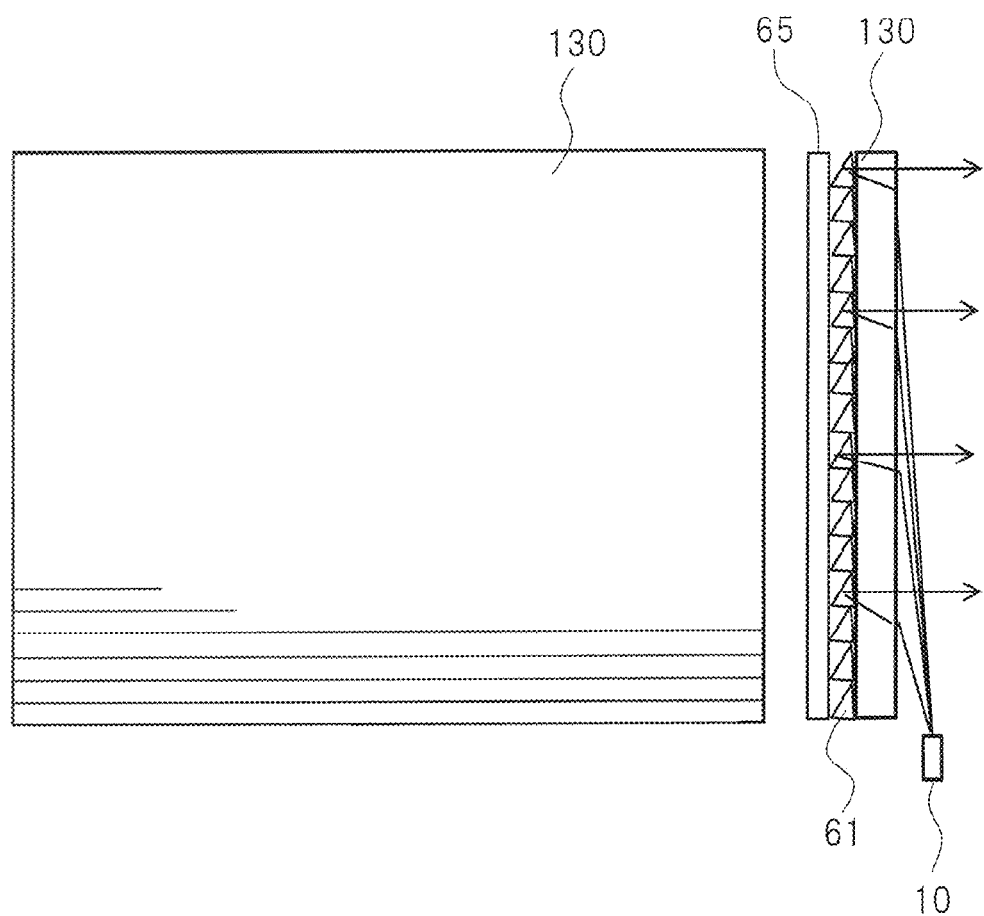
FIG. 17 is a view illustrating a concrete configuration (linear Fresnel lens) of the semitransparent screen in the above front system projection board apparatus.
Figure 18:
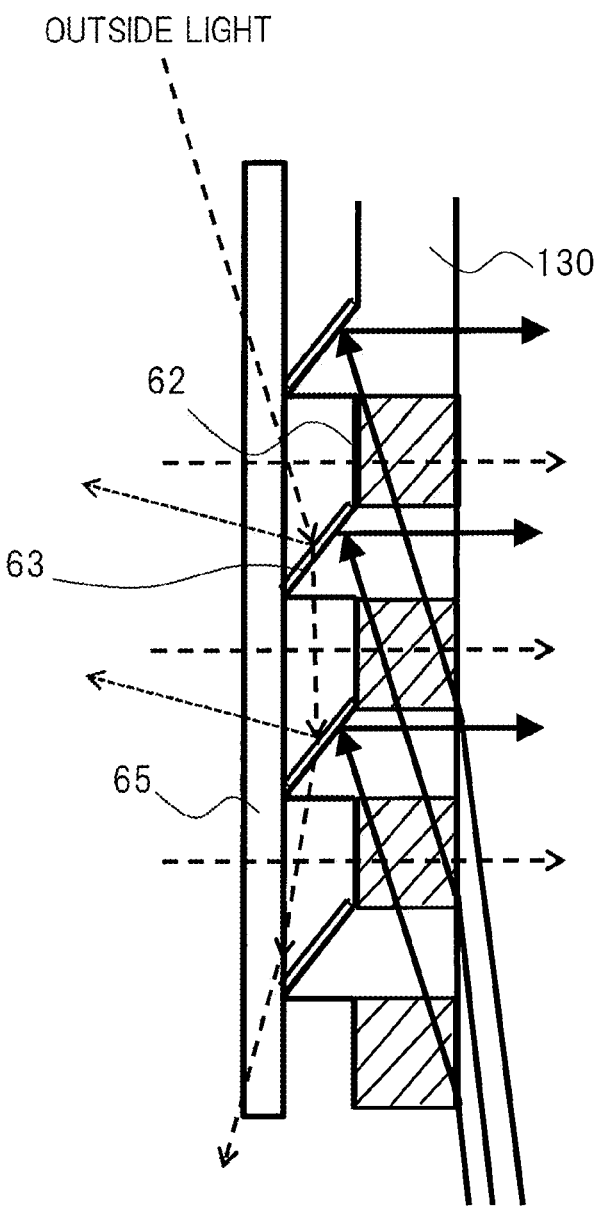
FIG. 18 is a partially enlarged sectional view illustrating a more detailed configuration of the above semitransparent screen.

Further, FIGS. 16 and 17 illustrate a concrete configuration of the semitransparent screen 130 in the front system projection board apparatus (front projection video display apparatus) described above. This semitransparent screen 130 has a cross section of a continuous triangular shape (sawtooth wave shape) on its rear surface (that is, a side opposite to the observer side). A large number of optical path changers 61 are formed thereon. Each of the optical path changers 61 has a function to refract light (laser beam) that enters from a front surface (viewing side) of the semitransparent screen 130 to form the scan screen described above and to change the light into light traveling toward the observer (that is, the viewer) side. Namely, these optical path changers 61 change a direction of the light into a direction substantially perpendicular to the scan screen to emit the light to the scanning image viewing side. As a concrete example of these optical path changers 61, for example, the optical path changers 61 maybe formed as an (eccentric) circular Fresnel lens as illustrated in FIG. 16, or may be formed as a linear Fresnel lens as illustrated in FIG. 17.

Moreover, as illustrated in FIGS. 15(a) and 15(b), the semitransparent screen 130 may also be formed so that flat portions 62 each having a predetermined distance are respectively provided between adjacent optical path changers 61 (semitransparent type). Note that a refraction factor of material or a Fresnel angle of these optical path changers 61 may be optimized so that a video ray is totally reflected. Alternatively, as illustrated in FIG. 15(b), a reflective film 64 formed from a metal film or a metallic multilayer whose reflection factor becomes higher with respect to a specific polarized wave may be provided on an inclined surface 63. In the present embodiment, these optical path changers 61 are formed at pitches (or intervals) from about 30 μm to 100 μm as one example. In addition, a plate-like transparent protective plate 65 is provided on the rear surface of the semitransparent screen 130 (that is, a surface on which the optical path changers 61 are formed).

Note that as described above, a metal film made of aluminum or the like or a metallic multilayer made of Ti, Nb, or Si is formed on each of the inclined surfaces 63 that form these optical path changers 61, for example, thereby forming a reflective surface for the light (laser beam). In a case where an oblique projection optical system is used like the present embodiment, an eccentric Fresnel lens whose Fresnel center is out of the scan screen is particularly suitable. On the other hand, according to the linear Fresnel lens, for example, manufacture thereof is relatively easy by a roll process, and it is suitable for mass production. Therefore, it is possible to manufacture a large screen at low cost.

Further, according to the plate-like transparent protective plate 65 provided on the surface of the semitransparent screen 130 on which the optical path changers 61 are formed, it is possible to protect the semitransparent screen 130 against mechanical impact from the rear surface thereof. In addition, by shielding the optical path changers 61 from outside air, dust or the like in the air is hardly deposited, and this makes it possible to maintain the semitransparent screen 130 in good condition for a long time.

According to such a screen 130, in a case where a total reflection system is adopted in order to reduce a reflection loss on an incident surface, it is possible to realize an apparatus that can acquire an excellent scanning image whose reflection loss is small, in other words, to realize an apparatus of ultra-low power consumption with high usage efficiency of light.

Further, on the other hand, according to the screen 130 composed of the semitransparent type sheet illustrated in FIG. 13 to FIG. 18 described above, in a case where video is not projected, the screen 130 becomes semitransparent when viewed from the observer side. Therefore, it is possible to obtain advantage that various improvements for design property of the whole rear projection video display apparatus are possible in addition to a sense of existence and the like in the room interior in which the apparatus is arranged. In particular, it is thought advantage that in a case of presentation to a client or a student who faces a user of the apparatus via an intervening table or the like, for example, the small front system projection board apparatus for table use as illustrated in FIG. 4 to FIG. 6 can confirm a state of the partner via the semitransparent screen 130.

In the screen 130 described above, by appropriately setting a thickness of a metal film made of aluminum or the like, which is to be formed on the inclined surface 63 of each of the optical path changers 61, it becomes possible to obtain desired transparent (or a degree of semitransparent). As one example, for example, by setting a thickness of the metal film made of aluminum to about 70 nm to 80 nm, a semitransparent screen 130 in which a transmission factor thereof is 50% and a reflection factor thereof is 50% with respect to light is obtained.

Figure 19:
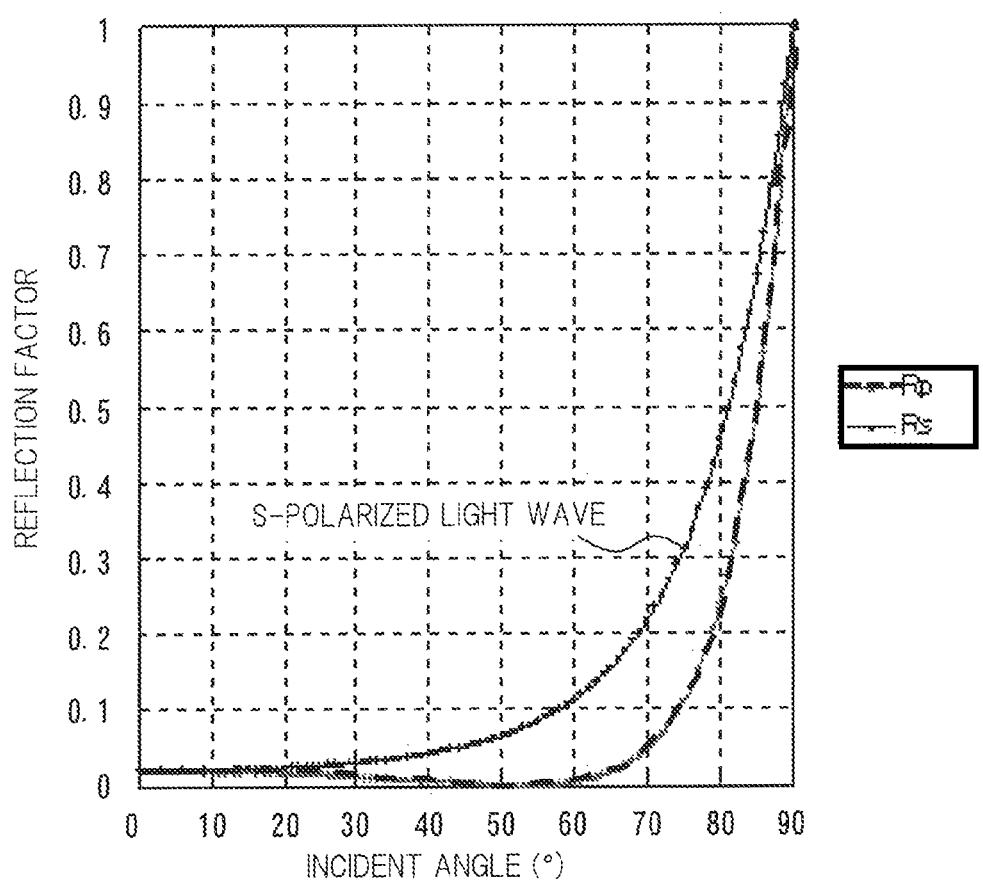
FIG. 19 is a view illustrating a reflection characteristic graph of an S-polarized light wave that is used in the above optical scanning video projecting apparatus.

In addition, it is preferable that as illustrated in FIG. 19, the laser beam emitted from the optical scanning video projecting apparatus and reflected to a predetermined direction by the optical path changers 61 of the screen 130 described above is an S-polarized light wave in consideration of its reflection characteristic. For that reason, a filter of the like for converting a P-polarized light wave into an S-polarized light wave may be provided at an output unit of the optical scanning video projecting apparatus that will be described below in detail.

As is apparent from the above, according to the rear system or front system projection board apparatus (rear/front projection video display apparatus) of the present invention described above, by adopting the semitransparent screen 130 described above together with the optical scanning video projecting apparatus 10 that uses coherent light from the light source in the scanning mirror 1 (optical scanning unit), that is, reflects and scan the laser beam to form video, excellent video can be obtained without requiring a housing that covers the whole apparatus unlike a conventional apparatus. This makes it possible to carry out folding easily. For that reason, it is possible to provide the improved rear projection video display apparatus with excellent portability that can be manufactured at low cost, and in which excellent reduction of power consumption, miniaturization and weight saving of the apparatus, and its design property are included.

In the above explanation, the general optical scanning video projecting apparatus 10 in the rear projection video display apparatus has been explained as one that scans the laser beam, which is the coherent light from the light source, by the scanning mirror (optical scanning unit) to form video. However, the present invention is not limited to it, and a further improved optical scanning video projecting apparatus can be adopted.

<Details of Optical Scanning Video Projecting Apparatus>

Thus, a configuration, behavior and an operation of the optical scanning video projecting apparatus 10 constituting the rear system projection board apparatus (rear projection video display apparatus) described above according to another embodiment, which include its modification example will be described below in detail.

Figure 20:
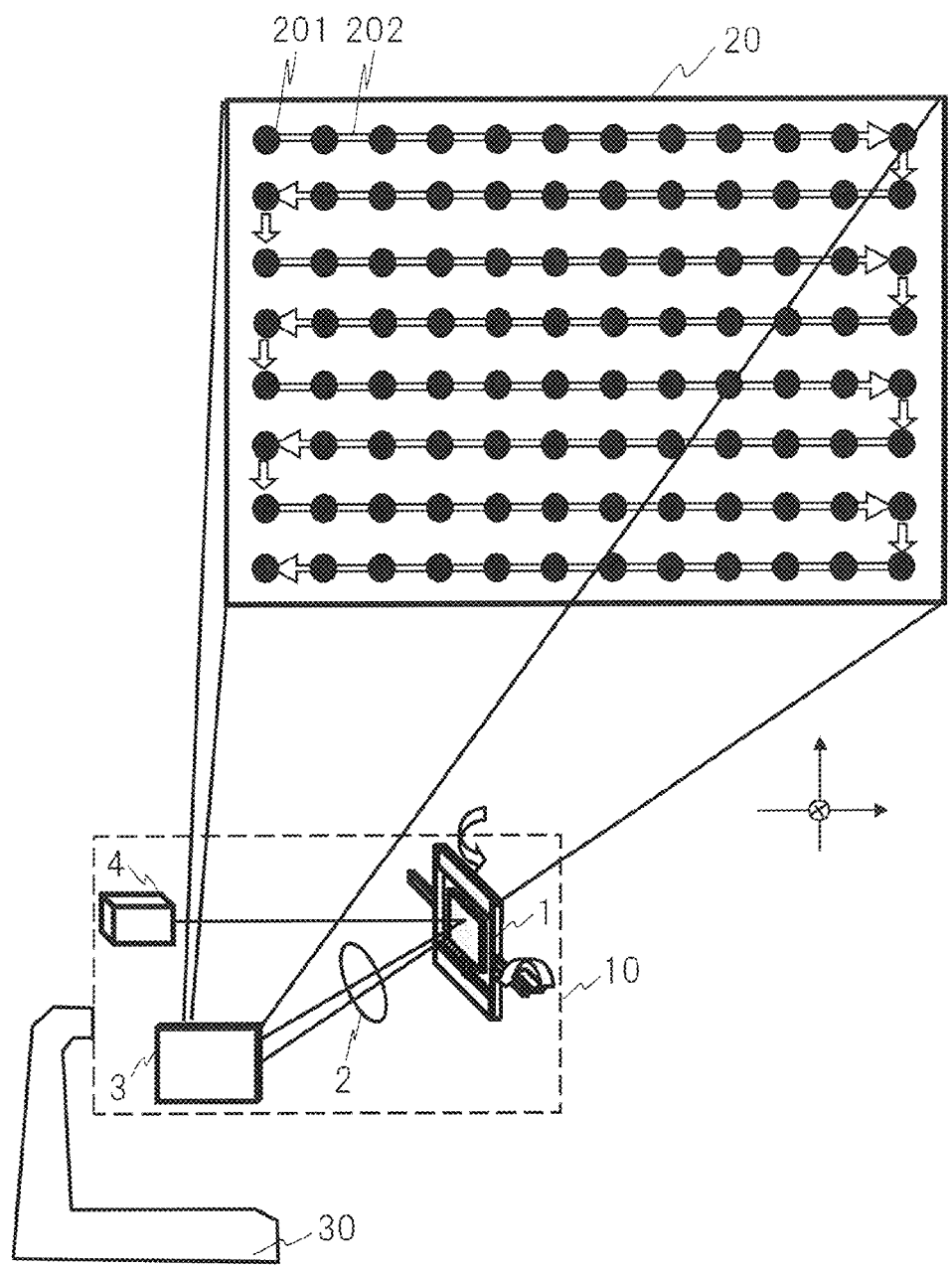
FIG. 20 is a view illustrating another concrete configuration of the semitransparent screen in the above rear or front system projection board apparatus.

As illustrated in FIG. 20, this optical scanning video projecting apparatus 10 basically includes: the light source 4 that emits a laser beam; and an optical scanning unit that carries out optical scanning in two directions including a main scanning direction (horizontal direction) and a vertical scanning direction (vertical direction) by using the scanning mirror 1 that is a resonance type mirror. The optical scanning video projecting apparatus 10 has a function to scan and deflect the laser beam emitted by the light source 4 in the main scanning direction and the vertical scanning direction.

In order to execute two-dimensional scanning corresponding to each scanning line of television, by first carrying out scanning pixels in the horizontal direction while carrying out the optical scanning of one round trip in the vertical direction, it is possible to carry out scanning for one scanning line. For example, in order to carry out display with horizontal 800 pixels and vertical 600 pixels by vertical frequency of 60 Hz, 300 round trips are required because there are 600 pixels in the horizontal direction. Thus, it is necessary that the scanning mirror 1 can be driven with high frequency of 60×300=18000 Hz (18 kHz). It is increasingly necessary to drive the scanning mirror 1 with high frequency as resolution (the number of pixels) to be displayed becomes larger. Table 1 below indicates a relationship between displayed pixels and horizontal scanning frequency (horizontal scanning number). In HD correspondence of horizontal 1920 pixels and vertical 1080 pixels, the frequency becomes 38.9 kHz, whereby further speeding up is required. In addition, in order to realize a large scan image with respect to a short projection distance, it is necessary that the swinging angle of the scanning mirror 1 is made larger.

TABLE 1

| RESOLUTION | VGA (640 × 480) | SVGA (800 × 600) | XGA (1024 × 768) | SXGA (1280 × 1024) | HD (1920 × 1080) |
| --- | --- | --- | --- | --- | --- |
| HORIZONTAL SCAN FREQUENCY | 18 kHz | 22.5 kHz | 28.8 kHz | 38.4 kHz | 38.9 kHz |

Thus, both driving the scanning mirror 1 at further high speed and driving it with a large swinging angle cause loads of the torsional springs 1b and 1d, which are mechanism components of moving parts, to be increased. Therefore, in a conventional resonance type mirror, high frequency and the swinging angle of the scanning mirror 1 have a relationship of tradeoff.

Therefore, in a conventional optical scanning apparatus (see Japanese Patent Application Publication No. 2010-139687, for example), in order to display an image with large resolution (the number of pixels), a swinging angle of a mirror becomes smaller as tradeoff. Thus, in order to display an image with a predetermined size, a large projection distance was required. In addition, there has been a problem that a movement locus of a scan coordinate on an image plane becomes a sinusoidal shape, and linearity is thus bad.

Further, in sinusoidal shape swing of the scanning mirror, a rapid change and a slow change in the angle of the scanning mirror appear periodically. In a case where a laser beam scans the image plane only by this sinusoidal swing of the scanning mirror and an angle change of the scanning mirror is fast, a change in the scanning position on the image plane also becomes fast. In a case where the angle change of the scanning mirror is slow in such a condition, the change in the scanning position on the image plane also becomes slow. Therefore, light and darkness corresponding to a sinusoidal wave are generated on the image plane.

In a case where the laser beam is modulated at equal intervals with respect to time and the angle change of the scanning mirror is fast, for the same reason, pixels are roughly arranged on the image plane. In a case where the angle change of the scanning mirror in such a condition, the pixels are densely arranged on the image plane. Therefore, a two-dimensional image in which linearity is greatly deteriorated is generated.

Here, by executing circuit processing to thin out the laser beam in a sinusoidal light portion in which pixel distribution is dense, it is possible to improve only light and darkness on the image plane. However, the linearity of the two-dimensional image cannot be improved, and new problems of an increase in a circuit scale and reduction of light quantity are generated. Note that by modulating the laser beam while matching timing of arrangement of the pixels on the image plane, the linearity can also be improved. However, the circuit scale is increased more and more.

As measures of such problems, in a conventional optical scanning apparatus (see Japanese Patent Application Publication No. 2005-234157, for example), a "scanning optical system (scanning mirror and prism)" having a plurality of reflective surfaces in addition to a scanning mirror has been proposed. However, in a case where a shape error of an optical component in its manufacturing process, or eccentricity or falling of an optical component in assembly occurs, then a change in a ray angle on the mirror surface is about twice compared with a lens surface that is a transparent surface. Therefore, manufacture of the optical system using the mirror surface frequently becomes drastically difficult.

Moreover, in another conventional technology, a "two-dimensional scanning optical system (scanning mirror, prism, a scanning lens)" having a plurality of reflective surfaces in addition to a scanning mirror has been proposed (see Japanese Patent Application Publication No. 2006-178346, for example). However, in a case where a shape error of an optical component in its manufacturing process, or eccentricity or falling of an optical component in assembly also occurs, then similarly to the above, a variation in a ray angle on the mirror surface is about twice compared with a lens surface that is a transparent surface.

In addition, in an optical system using a plurality of mirror surfaces, in order to secure optical paths before and after reflection of a laser beam on the mirror surface, it is necessary to make an interval before and after the mirror surface larger. Thus, there is also a problem that a size of the whole optical system is to be increased.

Therefore, in the optical scanning video projecting apparatus, the problem of light quantity distribution, the problem of the linearity, and a problem of degradation of reliability due to an increase in a mechanical load to the scanning mirror exist.

Further, in the optical scanning video projecting apparatus, a laser source is generally used as the light source. In that case, the generated laser beam is coherent light. Therefore, a random phase is added thereto when the laser beam is reflected by a general screen surface (rough surface), and the reflected light becomes scattering rays. Then, rays scattered by different points on the rough surface are overlapped and interfere by means of space propagation, whereby speckles that forms a random interference pattern are generated and glare occurs in a projected image. Depending on conditions, image quality is deteriorated extremely.

Further, in an optical scanning apparatus in which a semiconductor laser or the like with a small light emitting point is used as a light source, emission of a laser beam with energy, which exceeds a permitted value, in a solid angle connecting the light source to the pupil of the observer causes a risk that the retina is burned out. Therefore, its light quantity is restricted, and necessary brightness may not be obtained.

The optical scanning video projecting apparatus adopted in the rear system projection board apparatus (rear projection video display apparatus) according to the present invention is achieved in view of the problems described above. The optical scanning video projecting apparatus has excellent light use efficiency as an image display apparatus using an oblique optical system, and excellent scan performance with respect to increase in angle and/or linearity. This makes it possible to suppress speckles. Therefore, an excellent rear projection video display apparatus is achieved in which sufficient brightness can be obtained under bright environment.

Note that in order to solve the problems described above, the adopted optical scanning apparatus is configured by: a light source configured to supply a laser beam as a light beam, for example; an optical scanning unit configured to scan light emitted from the light source by means of reciprocating movement of a reflective surface; and an optical system configured to enlarge a scanning angle of the scanned light, in such a configuration, the optical system is configured to have one curved surface lens at a side of the light source and one curved surface mirror at a side of an image plane. In order to obtain higher optical performance, it is preferable that a shape of each of the curved surface lens and the curved surface mirror described above is a freeform surface whose freedom degree of design is large.

With respect to a plane defined by an incident ray and a reflected ray by the curved surface mirror when the optical scanning unit remains stationary at the center of a scanning area, a long side of the two-dimensional scanning area on the image plane is configured by a direction that becomes a more parallel positional relationship compared with a short side thereof. A direction of larger one of deflection angles of the reflective surface in two scanning directions is configured by a direction corresponding to a long side direction of the scanning area.

Moreover, the optical scanning unit is arranged by an angle of 45° or smaller with respect to an optical axis connecting the laser source to the optical scanning unit. The curved surface lens and the curved surface mirror are arranged eccentrically from the optical axis, whereby the optical scanning unit can be arranged so that scanning light reflected by the curved surface mirror does not enter the curved surface lens again even though a distance between the curved surface mirror and the image plane is set to sufficient short. Therefore, miniaturization of the apparatus can be realized.

On the other hand, in order to suppress speckles, monochromic laser sources are not respectively used as light sources with red, Green, and blue, and each of a plurality of light sources with adjacent wavelengths is used together. Moreover, by polarizing and synthesizing one of the plurality of light sources with the adjacent wavelengths as S-polarized light and the other as P-polarized light, it is possible to further achieve the effect. By setting a surface of the curved surface mirror to a surface on which plural kinds of surface roughness are mixed at the same time, coherency of a laser is reduced to suppress the speckles.

By providing the surface of the curved surface mirror described above as a rough surface and causing a part thereof to have a scattering characteristic to spuriously widen an area of a light emitting point and become a two-dimensional light source, light quantity is increased while satisfying safety standard. Further, as described above, by using the plurality of light sources with adjacent wavelengths together without using monochromic laser sources with red, green, and blue, it is possible to improve brightness, and it is also possible to widen a color reproduction range.

Hereinafter, a configuration of each unit for realizing the optical scanning apparatus described above, its function and effect will be described below in detail.

A basic configuration of the whole optical scanning apparatus described above, which is illustrated in FIG. 20, is roughly divided into the optical scanning video projecting apparatus 10, a structure 30 that holds the optical scanning video projecting apparatus 10, and the image plane 20. In such a configuration, the laser beam emitted from the light source 4 is two-dimensionally deflected by the optical scanning unit 1. This deflected laser beam receives improvement of linearity and an action of an increase in angle with a freeform surface lens 2 that is a refractive system lens and a freeform surface mirror 3 that is a reflective mirror, and is displayed on the image plane 20 as a two-dimensional scan image in which the image is rectangular (two-dimensional) and light quantity distribution is even.

Figure 21:
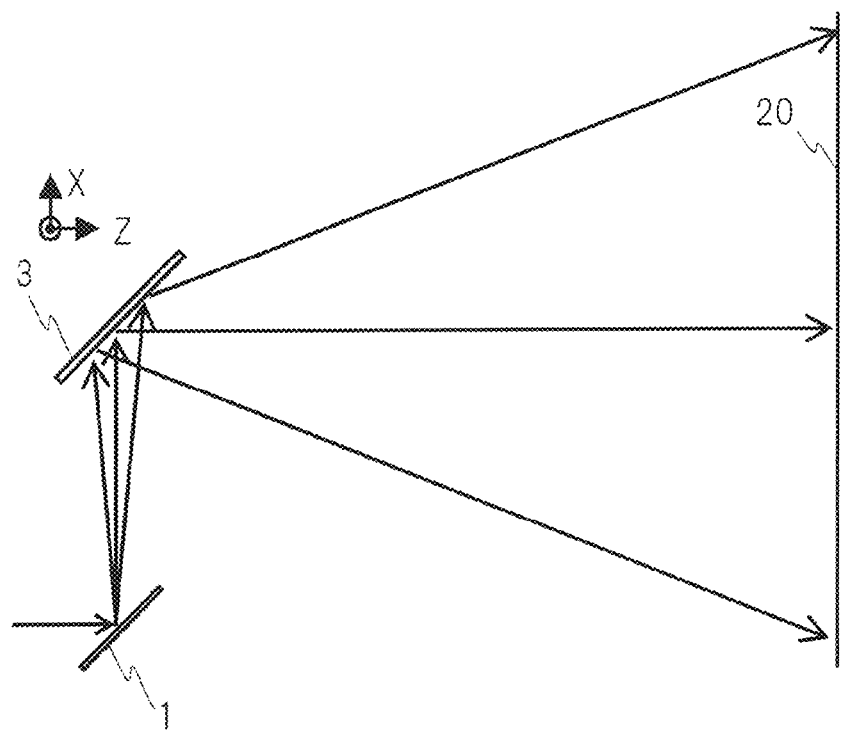
FIG. 21 is a view illustrating the optical scanning video projecting apparatus in the above rear system and front system projection board apparatus according to an embodiment.

FIG. 21 illustrates one example of arrangement of the freeform surface mirror 3. In FIG. 21, the freeform surface mirror 3 is arranged so that with respect to a first plane (an X-Z plane by definition of a coordinate system in Table 2) defined by an incident ray and a reflected ray in a freeform surface mirror when the optical scanning unit 1 remains stationary at the center of a scanning area, a long side of the two-dimensional scanning area on the image plane 20 approaches a parallel positional relationship compared with a short side thereof. This reason is as follows. By arranging the freeform surface mirror 3 obliquely with respect to a ray at a long side for which a scanning amount is large, a coordinate area in which rays scanned with a scanning angle that becomes twice a predetermined swinging angle are reflected by the freeform surface mirror 3 becomes wider. Therefore, a freedom degree of a shape of the freeform surface mirror 3 is increased.

<First Embodiment>

Subsequently, a basic configuration of an optical system in an optical scanning apparatus including the freeform surface lens 2 described above will be described with reference to FIG. 22 to FIG. 32.

Figure 22:
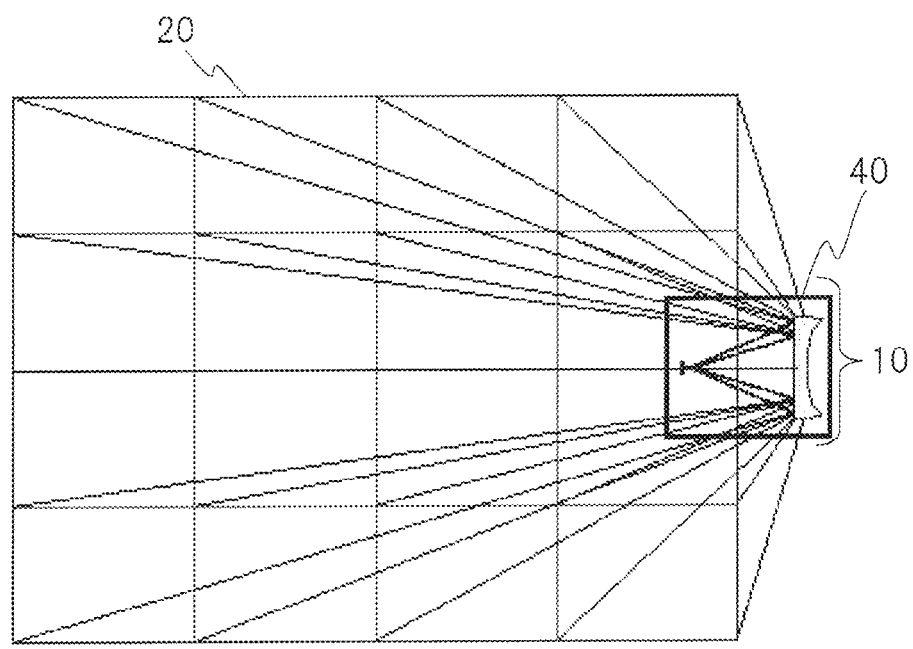
FIG. 22 is a front view illustrating a basic optical configuration of the above optical scanning video projecting apparatus according to a first embodiment (in which an optical scanning apparatus is arranged under an image plane)
Figure 23:
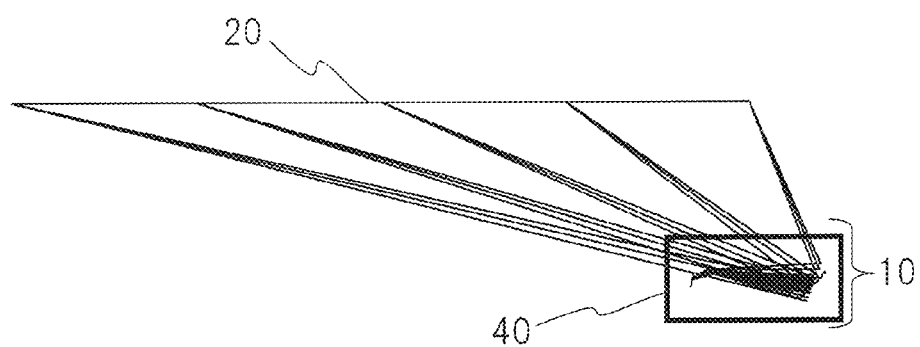
FIG. 23 is a side view illustrating the basic optical configuration of the above optical scanning video projecting apparatus according to the first embodiment (in which the optical scanning apparatus is arranged under the image plane)

FIG. 22 and FIG. 23 are a basic configuration diagram of the optical system in the optical scanning apparatus according to a first embodiment. FIGS. 22 and 23 illustrate a state where rays emitted from the optical scanning video projecting apparatus 10 reach divided points of 5×5 on an image plane 20. A reference numeral 40 in these drawings denotes a housing of the optical scanning video projecting apparatus 10.

Figure 24:
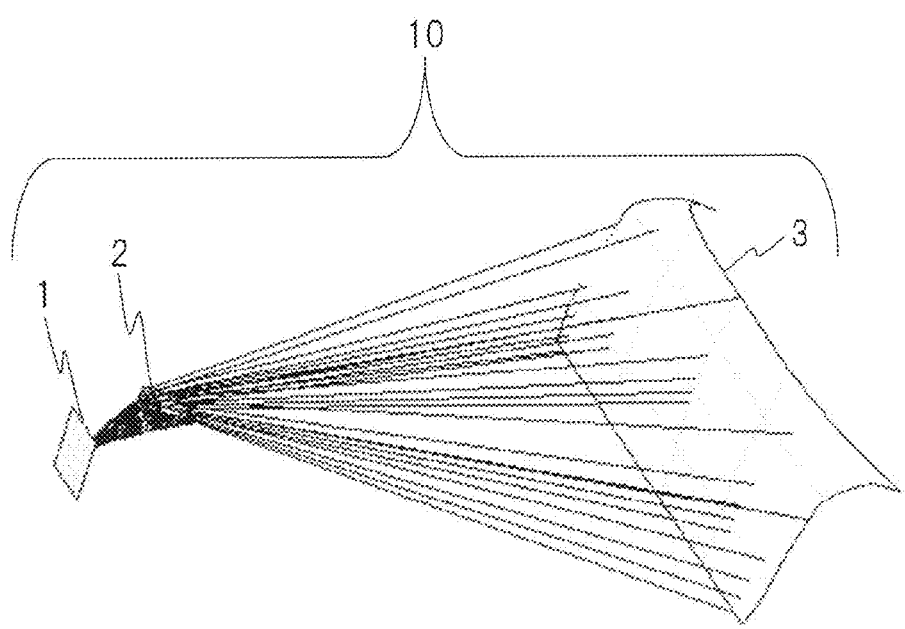
FIG. 24 is an enlarged view of a projection unit in the above optical scanning video projecting apparatus according to the first embodiment.

Further, FIG. 24 illustrates main parts constituting the optical scanning video projecting apparatus 10. In this drawing, scanning of a laser beam emitted from the light source 4 (see FIG. 20) is deflected by swing of the scanning mirror 1, and the laser beam then passes through the freeform surface lens 2 and the freeform surface mirror 3 to reach the image plane 20 (not illustrated in the drawings).

FIG. 25 is a detail drawing of the freeform surface lens 2 described above. The freeform surface lens 2 is configured by a first freeform surface lens 2a and a second freeform surface lens 2b. A physical length of a portion through which laser beams corresponding to a longitudinal direction of a scan screen in the second freeform surface lens 2b pass becomes larger compared with a portion through which laser beams corresponding to a short direction of the scan screen.

Moreover, in a portion at which the laser beams corresponding to the longitudinal direction of the scan screen in the freeform surface mirror 3 illustrated in FIG. 24 are reflected, a shape of a convex surface becomes stronger toward the scan screen compared with a portion at which the laser beams corresponding to the short direction of the scan screen are reflected.

Note that in FIG. 24 and FIG. 25, the optical scanning video projecting apparatus 10 is displayed along a direction by which it is easier to understand shapes of these optical elements.

Figure 26:
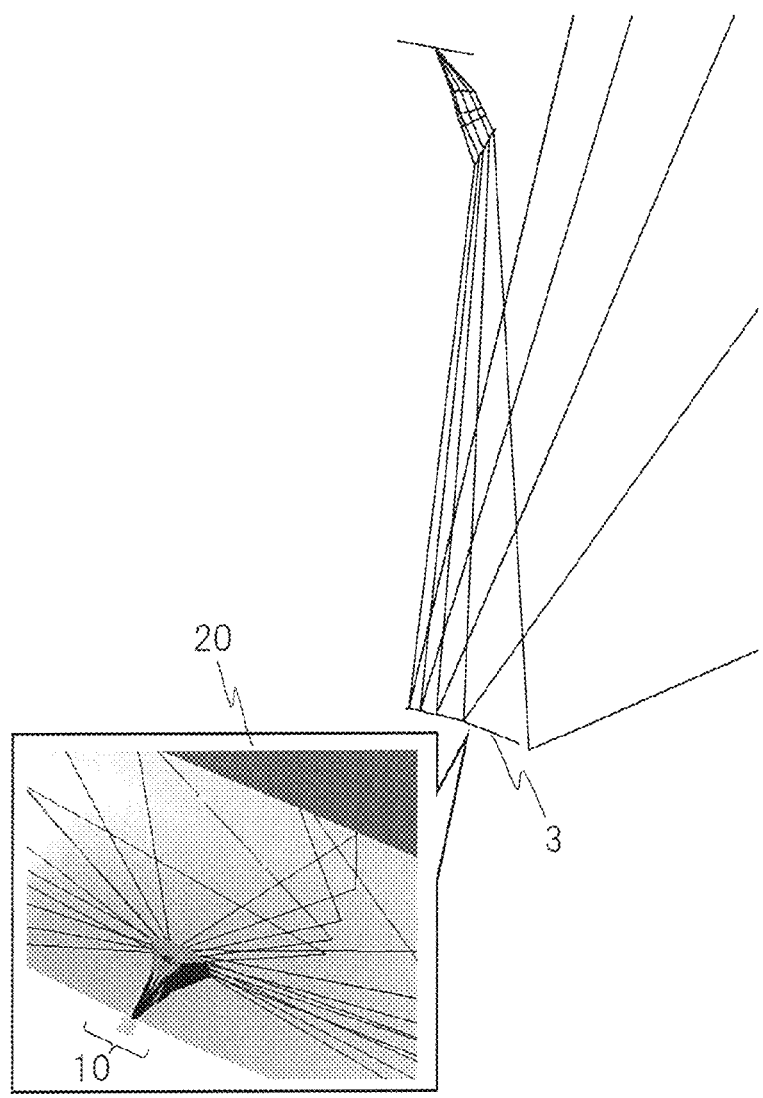
FIG. 26 is a configuration view for confirming optical path interference of the above optical scanning video projecting apparatus according to the first embodiment.

Moreover, in the ray diagram of FIG. 22 described above, it is hard to understand that the ray reflected by the freeform surface mirror 3 is not irradiated to the freeform surface lens 2 again, that is, presence or absence of optical path interference. Therefore, FIG. 26 illustrates a ray diagram in a direction by which it is found that no optical path interference occurs.

In addition, Table 2 and Table 3 below indicate one example of optical data.

TABLE 2

| NAME | SURFACE NUMBER | SHAPE | RADIUS OF CURVATURE | DISTANCE BETWEEN SURFACES | NAME OF GRASS MATERIAL | CONTENT OF ECCENTRICITY AND FALLING |
|---|---|---|---|---|---|---|
| LASER LIGHT SOURCE | (0) | SPHERE | ∞ | 5 | | |
| INCIDENT PUPIL | (1) | SPHERE | ∞ | 0 | | |
| MEMS | (2) | SPHERE | ∞ | 0 | REFLECTIVE SURFACE | DECENTER & RETURN |
| DUMMY SURFACE | (3) | SPHERE | ∞ | −8.5 | | NORMAL ECCENTRICITY |
| FREEFORM SURFACE LENS | (4) | XY POLYNOMIAL SURFACE | ∞ | −2.7 | PMMA 25 | DECENTER & RETURN |
| | (5) | XY POLYNOMIAL SURFACE | ∞ | −0.961 | | DECENTER & RETURN |
| FREEFORM SURFACE LENS | (6) | XY POLYNOMIAL SURFACE | ∞ | −3.5 | PMMA 25 | DECENTER & RETURN |
| | (7) | XY POLYNOMIAL SURFACE | ∞ | −60 | | DECENTER & RETURN |
| FREEFORM SURFACE MIRROR | (8) | XY POLYNOMIAL SURFACE | ∞ | 0 | REFLECTIVE SURFACE | DECENTER & RETURN |
| DUMMY SURFACE | (9) | SPHERE | ∞ | 100 | | NORMAL ECCENTRICITY |
| IMAGE PLANE | (10) | SPHERE | ∞ | 0 | | NORMAL ECCENTRICITY |

| | | | AMOUNT OF ECCENTRICITY (mm) | | AMOUNT OF FALLING (°) | |
|---|---|---|---|---|---|---|
| NAME | | SURFACE NUMBER | X ECCENTRICITY xde | Y ECCENTRICITY yde | AROUND X AXIS ade | AROUND Y AXIS bde |
| LASER LIGHT SOURCE | | (0) | | | | |
| INCIDENT PUPIL | | (1) | | | | |
| MEMS | | (2) | 0 | 0 | 0 | −40.860 |
| DUMMY SURFACE | | (3) | 0 | 0 | 0 | −90.000 |
| FREEFORM SURFACE LENS | | (4) | −0.090 | 0 | 0 | 22.106 |
| | | (5) | 0.340 | 0 | 0 | 5.090 |
| FREEFORM SURFACE LENS | | (6) | 1.987 | 0 | 0 | 21.588 |
| | | (7) | 2.307 | 0 | 0 | −4.349 |
| FREEFORM SURFACE MIRROR | | (8) | 63.719 | 0 | 0 | 80.166 |
| DUMMY SURFACE | | (9) | 0 | 0 | 0 | 128.061 |
| IMAGE PLANE | | (10) | 270 | 0 | 0 | 0 |

TABLE 3

| | | FREEFORM SURFACE LENS | | FREEFORM SURFACE LENS | | FREEFORM SURFACE MIRROR |
|---|---|---|---|---|---|---|
| CODE | | FOURTH SURFACE | FIFTH SURFACE | SIXTH SURFACE | SEVENTH SURFACE | EIGHTH SURFACE |
| c | 1/R | 0 | 0 | 0 | 0 | 0 |
| K | K | 0 | 0 | 0 | 0 | 0 |
| C2 | $X$ | 0.349624563 | 0.269927984 | −0.185371844 | −0.309182354 | −0.628649481 |
| C4 | $X^2$ | 0.04128861 | −0.012182237 | −0.054746638 | 0.003698041 | −0.009288099 |
| C6 | $Y^2$ | −0.141017861 | −0.048519056 | 0.764937711 | 0.021587641 | 0.002196752 |
| C7 | $X^3$ | −0.02150047 | 0.004069698 | 0.005633624 | −0.005692978 | 0.000701226 |
| C9 | $XY^2$ | −0.017256707 | 0.025427159 | 0.108572457 | −0.00623869 | 0.000244257 |
| C11 | $X^4$ | −0.000821675 | 6.1483E−04 | 0.00550315 | 1.8254E−04 | 2.0585E−05 |

TABLE 3-continued

| CODE | | FREEFORM SURFACE LENS FOURTH SURFACE | FREEFORM SURFACE LENS FIFTH SURFACE | FREEFORM SURFACE LENS SIXTH SURFACE | FREEFORM SURFACE LENS SEVENTH SURFACE | FREEFORM SURFACE MIRROR EIGHTH SURFACE |
|---|---|---|---|---|---|---|
| C13 | $X^2Y^2$ | 0.014813883 | 8.7481E−03 | 0.021244535 | 2.9920E−03 | −1.1730E−05 |
| C15 | $Y^4$ | −0.026216902 | −3.1692E−01 | −0.395137143 | 2.3554E−03 | −9.4200E−07 |
| C16 | $X^5$ | 0.000110443 | 1.1006E−04 | −0.000208594 | 1.3819E−04 | −7.8182E−07 |
| C18 | $X^3Y^2$ | −0.002662644 | 7.4408E−03 | −0.001397694 | −3.8605E−04 | −6.2747E−07 |
| C20 | $XY^4$ | 0.046531764 | 6.1055E−02 | −0.100446252 | −6.6014E−04 | 8.1691E−08 |
| C22 | $X^6$ | 4.37627E−05 | 2.3341E−05 | 0.000292687 | 4.9997E−06 | 2.0093E−08 |
| C24 | $X^4Y^2$ | 0.003196906 | −4.1073E−04 | −0.000492441 | −3.9561E−05 | 4.4766E−08 |
| C26 | $X^2Y^4$ | 0.003450416 | −8.7915E−03 | −0.025788093 | 2.6119E−05 | 5.4970E−09 |
| C28 | $Y^6$ | −0.067092382 | 5.5329E−03 | 0.459287803 | 6.4168E−05 | −9.7367E−10 |
| C29 | $X^7$ | −4.28869E−06 | 6.5180E−06 | 0.000509734 | 4.5678E−06 | −2.2207E−09 |
| C31 | $X^5Y^2$ | −0.000659626 | −2.2057E−04 | 0.00031577 | 6.9710E−06 | −2.6343E−10 |
| C33 | $X^3Y^4$ | −0.011448858 | 3.2124E−03 | −0.000933577 | 7.0756E−06 | −8.9063E−10 |
| C35 | $XY^6$ | −0.066580054 | 6.3687E−03 | 0.046089419 | −6.4576E−05 | −6.8233E−11 |
| C37 | $X^8$ | −4.81707E−06 | 1.4610E−06 | −0.000200734 | −2.6466E−07 | −2.8978E−10 |
| C39 | $X^6Y^2$ | −7.6712E−05 | −5.9685E−05 | −0.000125075 | −4.2372E−06 | −6.8633E−11 |
| C41 | $X^4Y^4$ | 0.003204566 | −8.1972E−04 | −0.000409066 | 4.6693E−06 | −2.2445E−11 |
| C43 | $X^2Y^6$ | −0.033227934 | −2.2869E−02 | 0.040759007 | 2.2739E−06 | 8.3163E−12 |
| C45 | $Y^8$ | 0.064497411 | −6.2588E−01 | −0.432182695 | 9.1847E−07 | 7.3071E−13 |
| C46 | $X^9$ | 2.9152E−08 | −2.3726E−08 | −0.000232996 | 2.7004E−06 | −2.4595E−12 |
| C48 | $X^7Y^2$ | −1.44485E−05 | −4.5344E−06 | −5.20091E−06 | 1.1587E−06 | 6.3132E−12 |
| C50 | $X^5Y^4$ | −0.000616877 | −4.2762E−05 | 0.00093 | 7.6834E−07 | 1.8258E−12 |
| C52 | $X^3Y^6$ | 0.010702798 | 1.0703E−02 | −0.000219987 | −1.7926E−06 | 5.6079E−13 |
| C54 | $XY^8$ | 0.048561261 | −1.6442E−01 | −0.00049315 | 7.4764E−06 | 3.3298E−15 |
| C56 | $X^{10}$ | 1.7083E−06 | −2.5101E−07 | 8.78141E−05 | −7.1733E−08 | 2.6285E−15 |
| C58 | $X^8Y^2$ | 1.73327E−05 | 6.4384E−06 | −9.79968E−06 | −9.5138E−08 | 1.0107E−13 |
| C60 | $X^6Y^4$ | 8.56939E−05 | 3.9058E−06 | −8.42942E−05 | −2.2269E−07 | −3.9928E−14 |
| C62 | $X^4Y^6$ | −0.00167207 | 1.3904E−03 | −0.000578202 | 2.2427E−07 | −1.2971E−14 |
| C64 | $X^2Y^8$ | 0.02820875 | 1.3481E−02 | −0.013192328 | −5.8871E−07 | −3.7322E−15 |
| C66 | $Y^{10}$ | 0.007477294 | 4.6528E−01 | 0.136172617 | −7.2216E−07 | −1.8566E−16 |

Table 2 indicates arrangement positions of an MEMS (resonant swing with horizontal ±5.3° and vertical ±2.9°) as the scanning mirror 1, a freeform surface lens, and a freeform surface mirror from a laser source of each of optical elements that are a zeroth surface. Table 3 indicates freeform surface coefficients of a freeform surface shape defined by Formula 1 below.

$$Z = \frac{c \cdot (x^2 + y^2)}{1 + \sqrt{1 - (1+K)c^2 \cdot (x^2 + y^2)}} + \sum\sum (Cj(m,n) \times x^m \times y^n)$$ [Formula 1]

Figure 27:
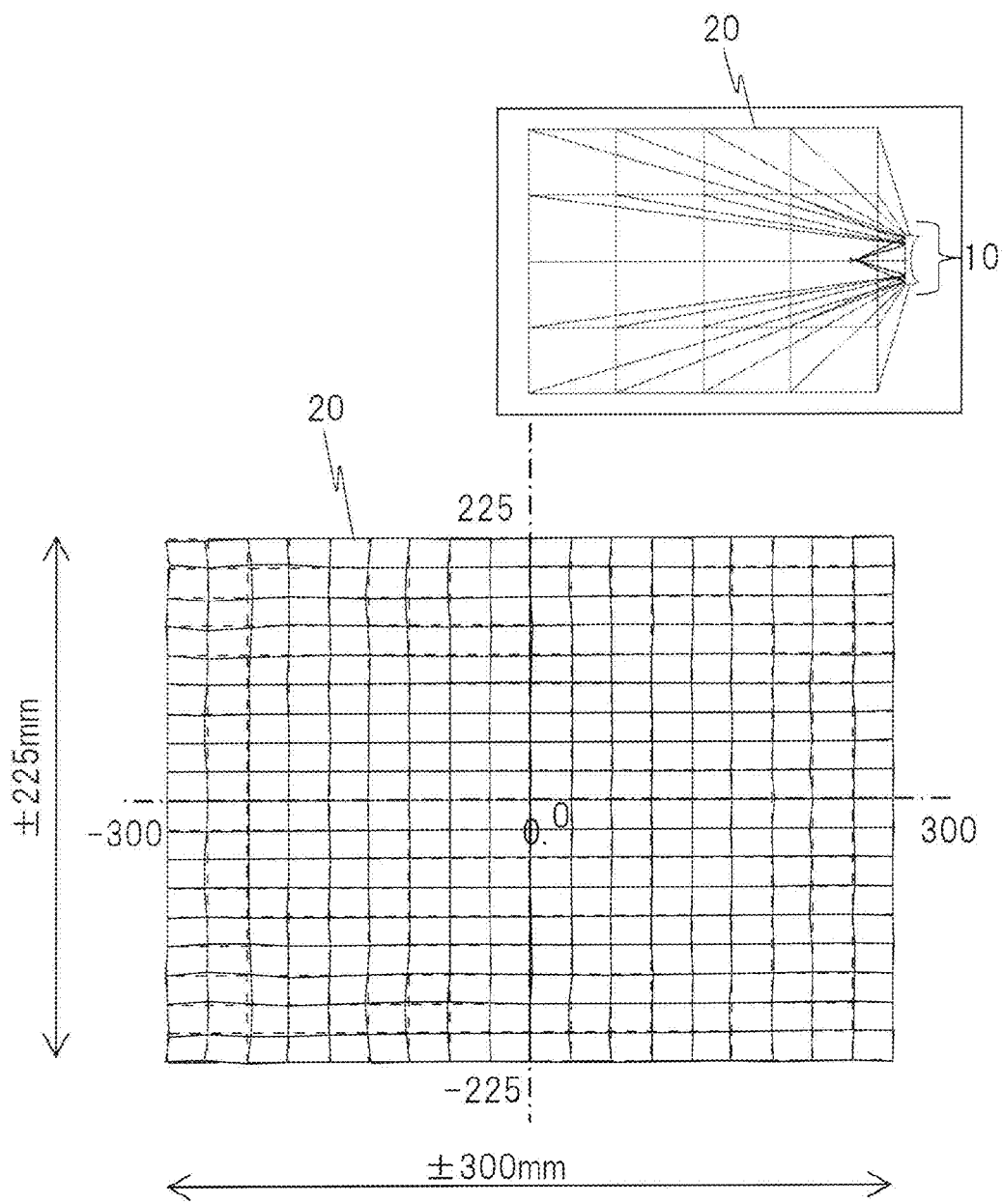
FIG. 27 is a distortion performance diagram of the above optical scanning video projecting apparatus according to the first embodiment.

FIG. 27 is a view illustrating coordinates at which rays with scanning angles adjusted by a scanning mirror 1 having a swinging angle of ±5.3° in a main scanning direction and a swinging angle of ±2.9° in a vertical scanning direction reach the image plane 20 at 10° intervals of a phase. FIG. 27 indicates results obtained by evaluating a scanning area in detail by division of 19×19. A projection distance from the freeform surface mirror 3 illustrated in FIG. 24 is 100 mm, and the scanning area of 600×450 mm on the image plane 20 by the freeform surface is scanned. A state where improvement of linearity and an increase in angle are realized at the same time can be understood.

Next, results of the improvement of linearity and the increase in angle from an incident angle and an incident coordinate on the image plane will be described with reference to FIG. 28 to FIG. 32 while being compared with the general resonance action that has already been illustrated in FIG. 11 and FIG. 12 described above.

Note that FIG. 11 and FIG. 12 described above are respectively views illustrating the incident angle on the image plane and the incident coordinate on the image plane in a state where only a space for equivalent of the freeform surface lens 2 and the freeform surface mirror 3 is provided at first. The incident angle sinusoidally changes in a range of ±10.6° that is a value twice 5.3°. Similarly, the incident coordinate also sinusoidally changes in a range of ±26.6 mm.

Figure 28:
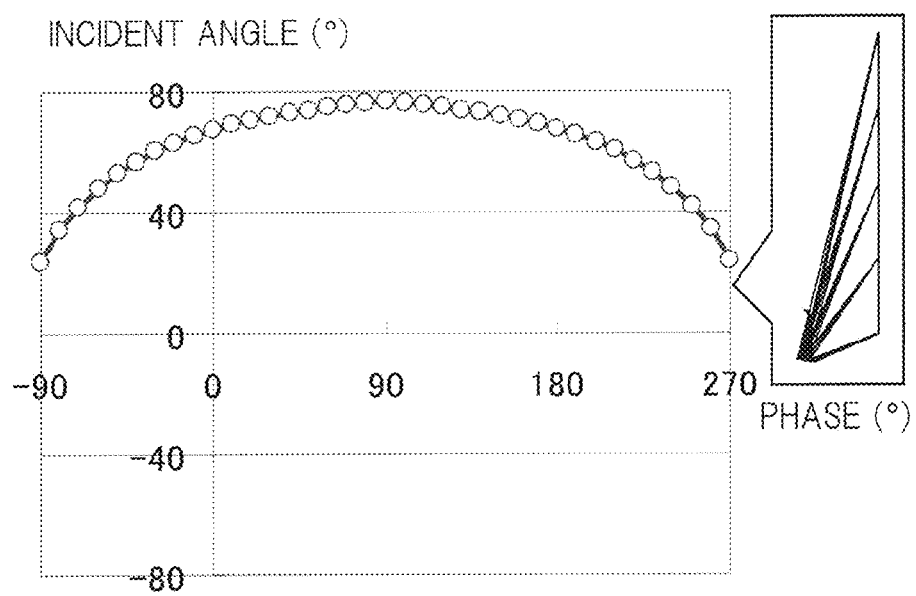
FIG. 28 is a relationship view between a phase and an incident angle of the above optical scanning video projecting apparatus according to the first embodiment.
Figure 29:
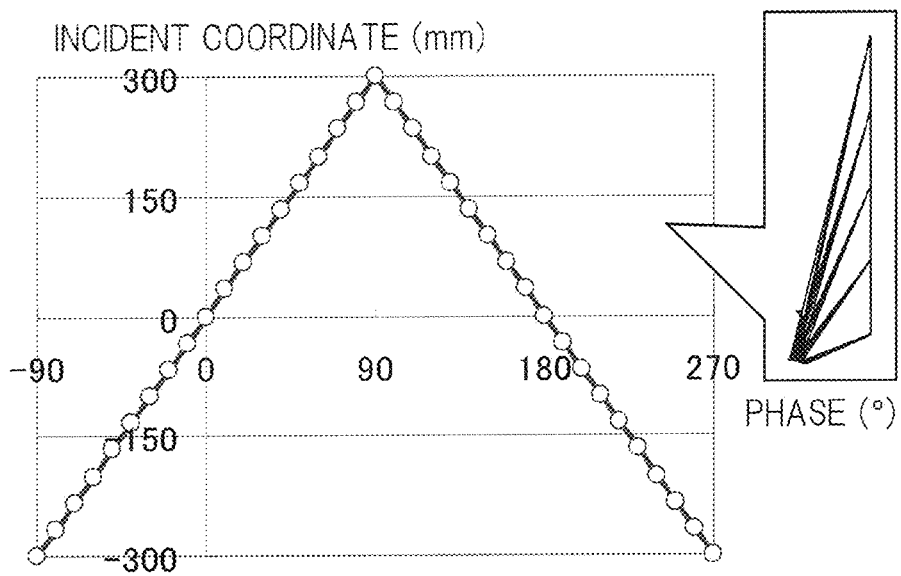
FIG. 29 is a relationship view between the phase and an incident coordinate of the above optical scanning video projecting apparatus according to the first embodiment.

On the other hand, in FIG. 28 and FIG. 29, by largely changing the incident angle by means of actions of the freeform surface lens 2 and the freeform surface mirror 3, an incident coordinate with a triangular wave shape in a range of ±300 mm on the image plane 20 is realized. Namely, a scanning area on a scan image surface is ±26.6 mm in a conventional system, while it is ±300 mm in the present embodiment, thereby realizing an increase in angle of more than ten times.

At this time, a horizontal size corresponding to a long side of the two-dimensional scanning area is X=600 mm, and a projection distance is L=100 mm. Therefore, a very small value L/X=0.17 is realized.

Note that the projection distance is defined by a length of a perpendicular line from a reference position to the image plane. The reference position defines an arrangement position of freeform surface mirror on lens data. However, in applications to give priority to miniaturization of the optical scanning video projecting apparatus 10, it is also effective to enlarge the value of L/X in a range not exceeding "1".

Further, for the purpose of comparison, the conventional technology (see Japanese Patent Application Publication No. 2010-139687 and Japanese Patent Application Publication No. 2005-234157 described above) describes an angle of view of ±18.9° symmetrical in a horizontal direction. When the value of L/X is calculated on the basis of this description, a large value is obtained by L/X=1/2/tan 18.9=1.46. It can be understood that an increase in angle is insufficient in the conventional technology.

Next, characteristics of the freeform surface lens 2 and the freeform surface mirror 3 will be described with reference to FIG. 30 and FIG. 31.

Figure 30:
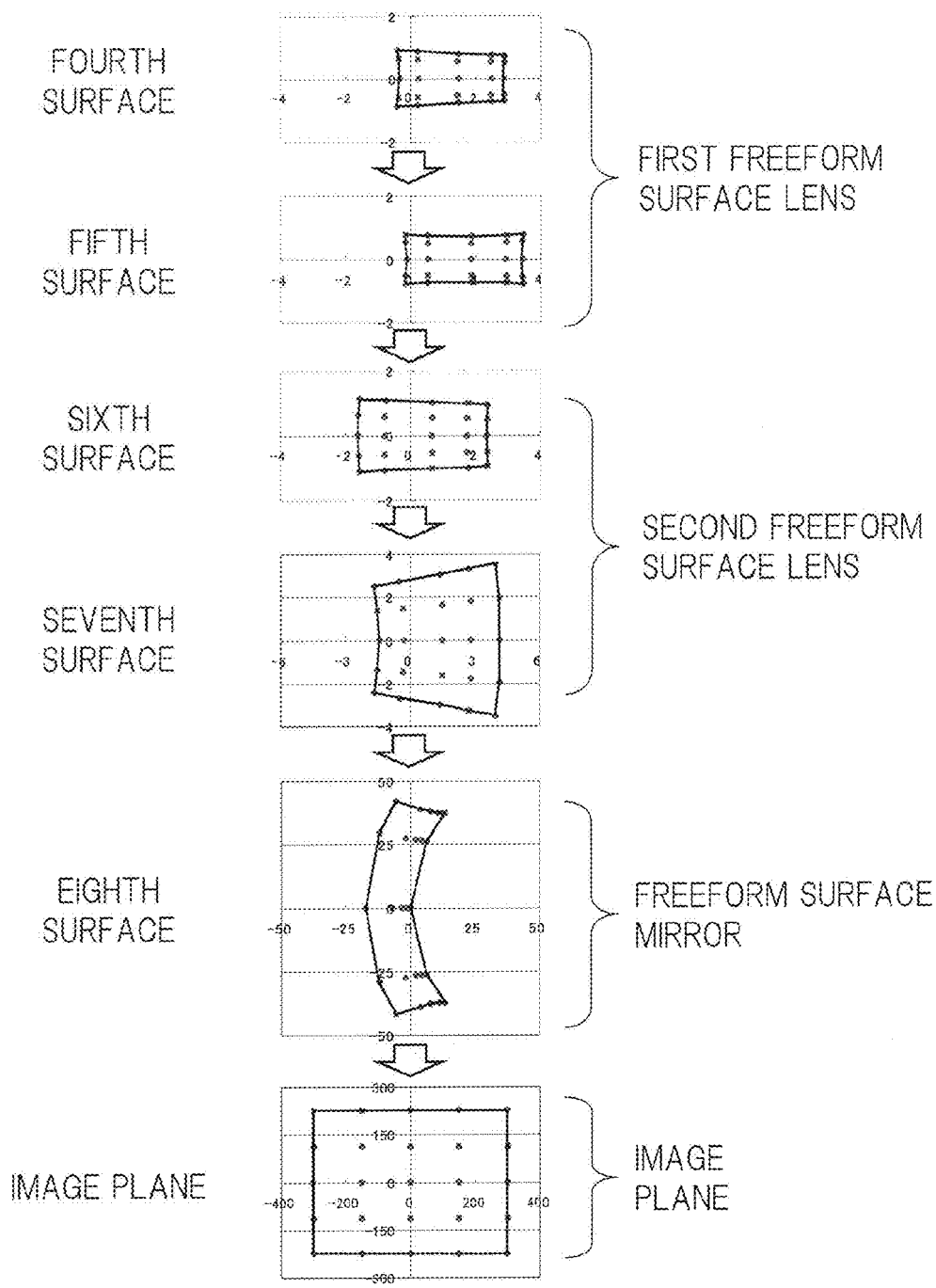
FIG. 30 is a coordinate view illustrating respective optical surfaces of a main ray in the above optical scanning video projecting apparatus according to the first embodiment in which a two-dimensional scanning area is divided into 5×5.

FIG. 30 illustrates an area of a ray in which coordinates of a main ray exist as a control result of the ray by the freeform surface lens 2 and the freeform surface mirror 3. Since a main scanning direction of the scanning mirror 1 is larger than a vertical scanning direction thereof, an area of the main ray on a fourth surface, which is an incident surface of the first freeform surface lens 2a, becomes a horizontally long area.

A state where the area of the main ray changes into a vertically long area whenever a laser beam in turn passes through an emission surface of the first freeform surface lens 2a and the second freeform surface lens 2b can be understood from this drawing.

Note that in an eighth surface that is the freeform surface mirror 3, the area becomes the vertically long area. However, the main scanning direction (a horizontal direction in FIG. 30) is not narrowed extremely in the eighth surface, but this results from a situation that a vertical size on the eighth surface is made larger as a freedom degree.

This reason will be explained with reference to FIG. 31.

Figure 31:
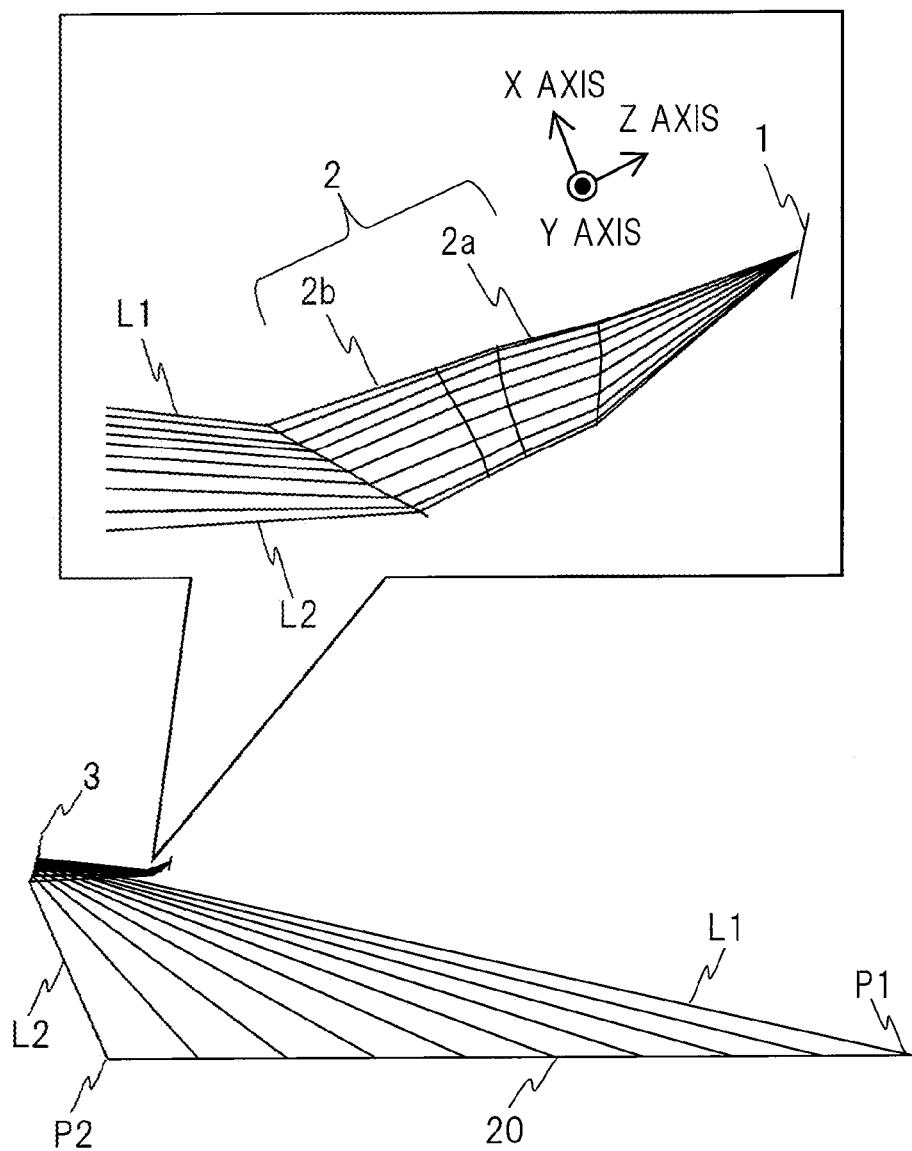
FIG. 31 is a ray diagram illustrating a shape of the freeform surface lens in a main scanning direction of the above optical scanning video projecting apparatus according to the first embodiment.

FIG. 31 is a ray diagram on a cross section of the main scanning direction, and is a view illustrating the ray diagram of the whole optical system and an enlarged view of the freeform surface lens 2 together. Swing of the scanning mirror 1 causes a ray L1 that passes through a positive side of an X axis in FIG. 31 to be reflected by the freeform surface mirror 3 to reach a coordinate P1 on the image plane 20. On the other hand, a ray L2 that passes through a negative side of the X axis is reflected by the freeform surface mirror 3 to reach a coordinate P2 on the image plane 20. Here, it is necessary that an optical path of the ray L2 passing through the second freeform surface lens 2b and an optical path of the ray L1 reflected by the freeform surface mirror 3 do not interfere in the second freeform surface lens 2b. In order to do this, it is necessary that a width formed by the ray L1 and the ray L2 on the freeform surface mirror 3 is to be made smaller. This is a reason why a size of a ray passing range in a horizontal direction on the freeform surface mirror 3 is made smaller.

Further, in the present embodiment, as illustrated in FIG. 31, an optical path length of the ray L1 from reflection by the freeform surface mirror 3 to the image plane 20 is larger than an optical path length of the ray L2. For this reason, image magnification is different depending upon a position of optical scanning, and linearity of a scanning image is thus deteriorated. In order to improve this, it is necessary that the optical path length of the ray L1 is made shorter than the optical path length of the ray L2 by the freeform surface lens 2 and the freeform surface mirror 3.

Thus, in order to make the air-conversion optical path length of the ray L1 passing through the freeform surface lens 2 smaller than that of the ray L2, lens thickness at a side that the ray L1 passes through was made thinner to form so-called spurious prism. A change amount of the optical path length that can be realized by causing the freeform surface lens 2 to form the spurious prism is smaller compared with a difference of the optical path length after the laser beam is reflected by the freeform surface mirror 3. However, it would be effective to restrict the optical path length before the freeform surface mirror 3 on the design.

On the other hand, in a case where a lens shape of the freeform surface lens 2 described above is formed as prism, an optical path thereafter is different by a wavelength of light due to dispersion of lens material (that is, a refraction factor is different depending upon the wavelength of light). Thus, a reach distance on the image plane is different for every wavelength of light, chromatic aberration of magnification occurs. In order to reduce this chromatic aberration of magnification, in the freeform surface lens 2 and the freeform surface mirror 3 described above, the optical path length of the ray L1 is made shorter than the optical path length of the ray L2, and the air-conversion optical path length of the ray L1 passing through the freeform surface lens 2 is made shorter than that of the ray L2. It was found by simulation that in a case where a ratio of the lens thickness at the side that the ray L1 passes through and lens thickness at a side that the ray L2 passes through is set to three times or less, it is possible to reduce chromatic aberration of magnification to a level of causing no problem in practical use. Moreover, in a case where it is set to within twice, it is possible to obtain further good imaging performance.

Image magnification is different depending upon the position of optical scanning generated for a reason why the optical path length of the ray L1 from reflection by the freeform surface mirror 3 to the image plane 20 is larger than the optical path length of the ray L2. Deterioration of linearity of the scanning image can be reduced sufficiently by optimization of a mirror shape of the freeform surface mirror 3 that has a large freedom degree of design and optimization of a shape of the freeform surface lens described above (power distribution).

Figure 32:
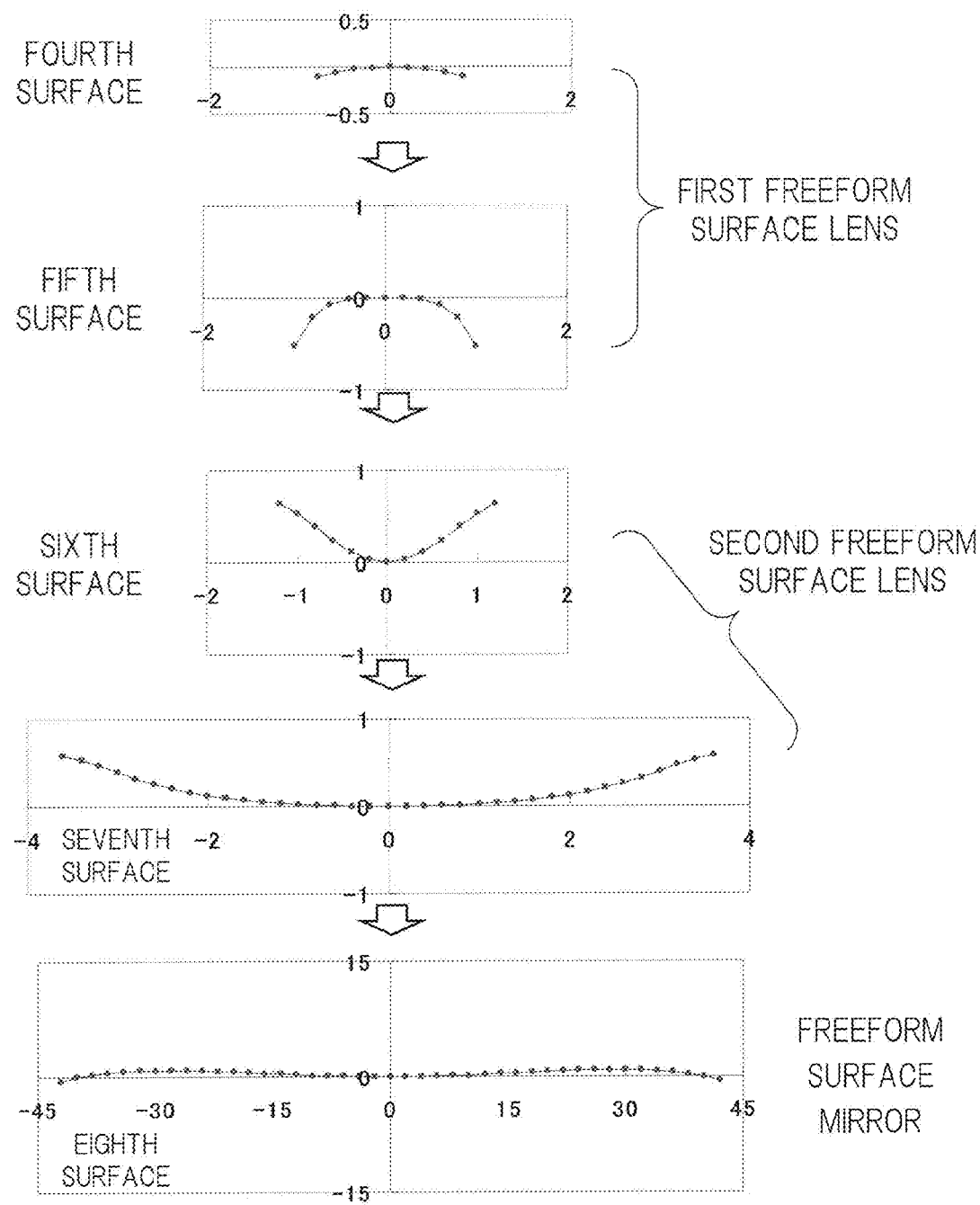
FIG. 32 is a shape diagram of the freeform surface lens and mirror in a vertical scanning direction of the above optical scanning video projecting apparatus according to the first embodiment.

On the other hand, characteristics in the vertical scanning direction will be described with reference with FIG. 32. FIG. 32 is a view of a sag amount by each of optical elements in a vertical scanning direction. In FIG. 32, each of the first freeform surface lens 2a and the second freeform surface lens 2b has negative refractive power in a concave lens shape. Further, a central portion of the freeform surface mirror 3 has positive refractive power because of a concave surface, and a peripheral portion thereof has negative refractive power because of a convex surface. This is because the vertical scanning direction is set to plane symmetrical arrangement in the lens data according to the first embodiment. by changing a condition of plane symmetry, that is, an arrangement relationship, the portion of the positive refractive power and the portion of the negative refractive power are changed. Thus, expression that a portion of positive refractive power and a portion of negative refractive power exist in the freeform surface mirror 3 is correct.

As described above, it can be understood that by arranging the freeform surface lens 2 and the freeform surface mirror 3 in a predetermined condition, the swinging angle of the scanning mirror 1 can apparently be increased to ten times or more, and improvement of linearity is realized at the same time. In other words, it is possible to realize an optical scanning apparatus with a super wide angle even though the swinging angle of the scanning mirror 1 is small. Mechanical reliability of the MEMS as the scanning mirror 1 is never impaired.

<Second Embodiment>

Next, a configuration of an optical system in an optical scanning apparatus according to a second embodiment will be described with respect to FIG. 33 to FIG. 36, Table 4 and Table 5.

Figure 33:
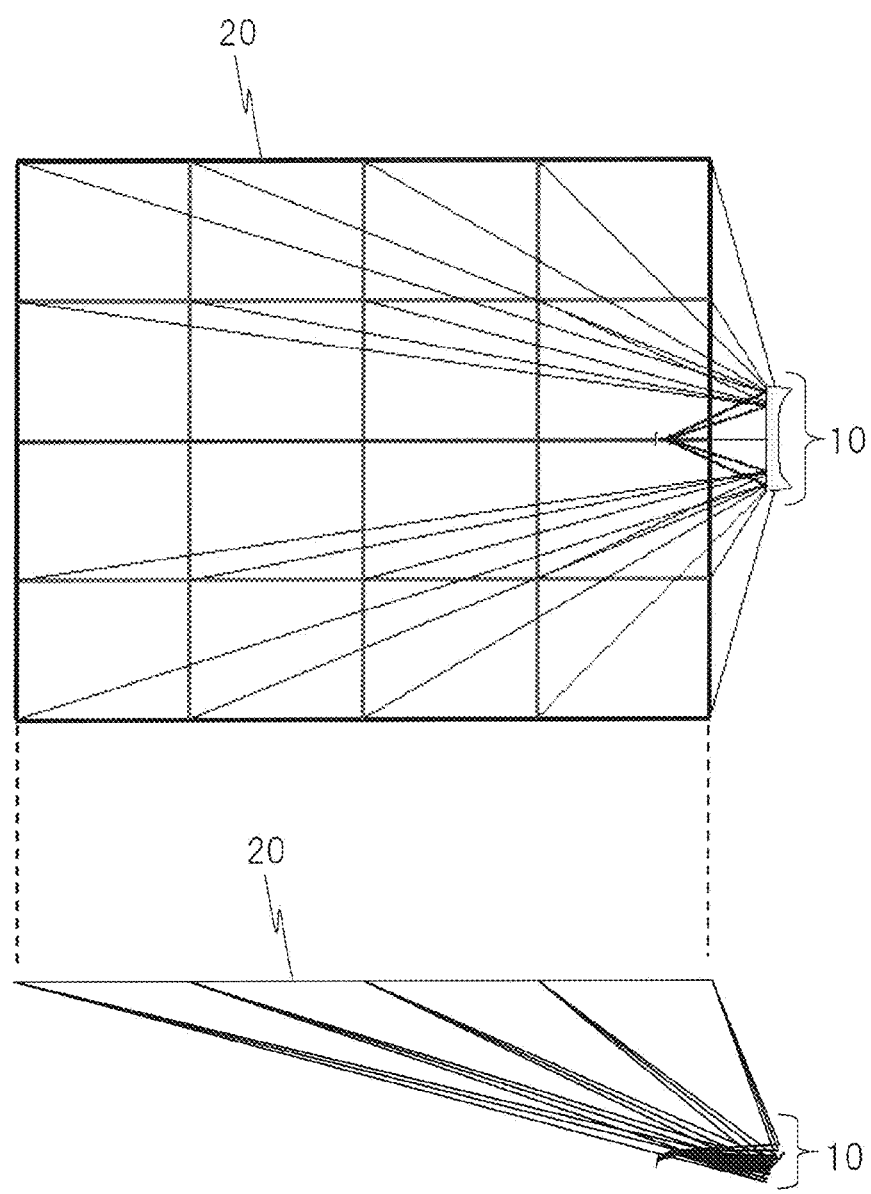
FIG. 33 is a view illustrating a basic optical configuration diagram of the above optical scanning video projecting apparatus according to a second embodiment.
Figure 34:
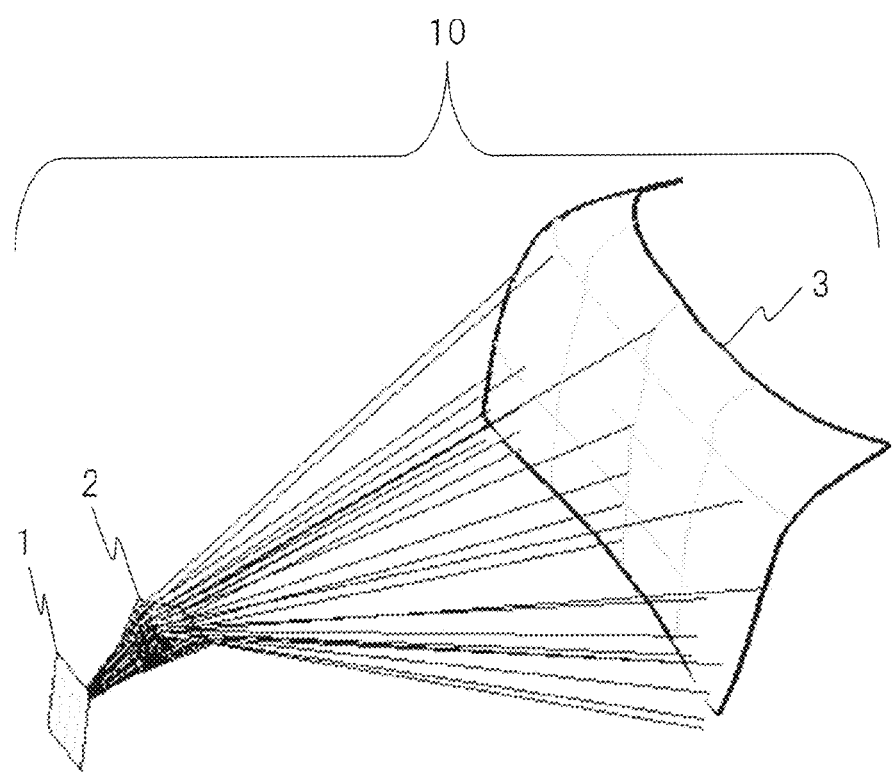
FIG. 34 is an enlarged view of an optical scanning video projecting apparatus in the above optical scanning video projecting apparatus according to the second embodiment.
Figure 36:
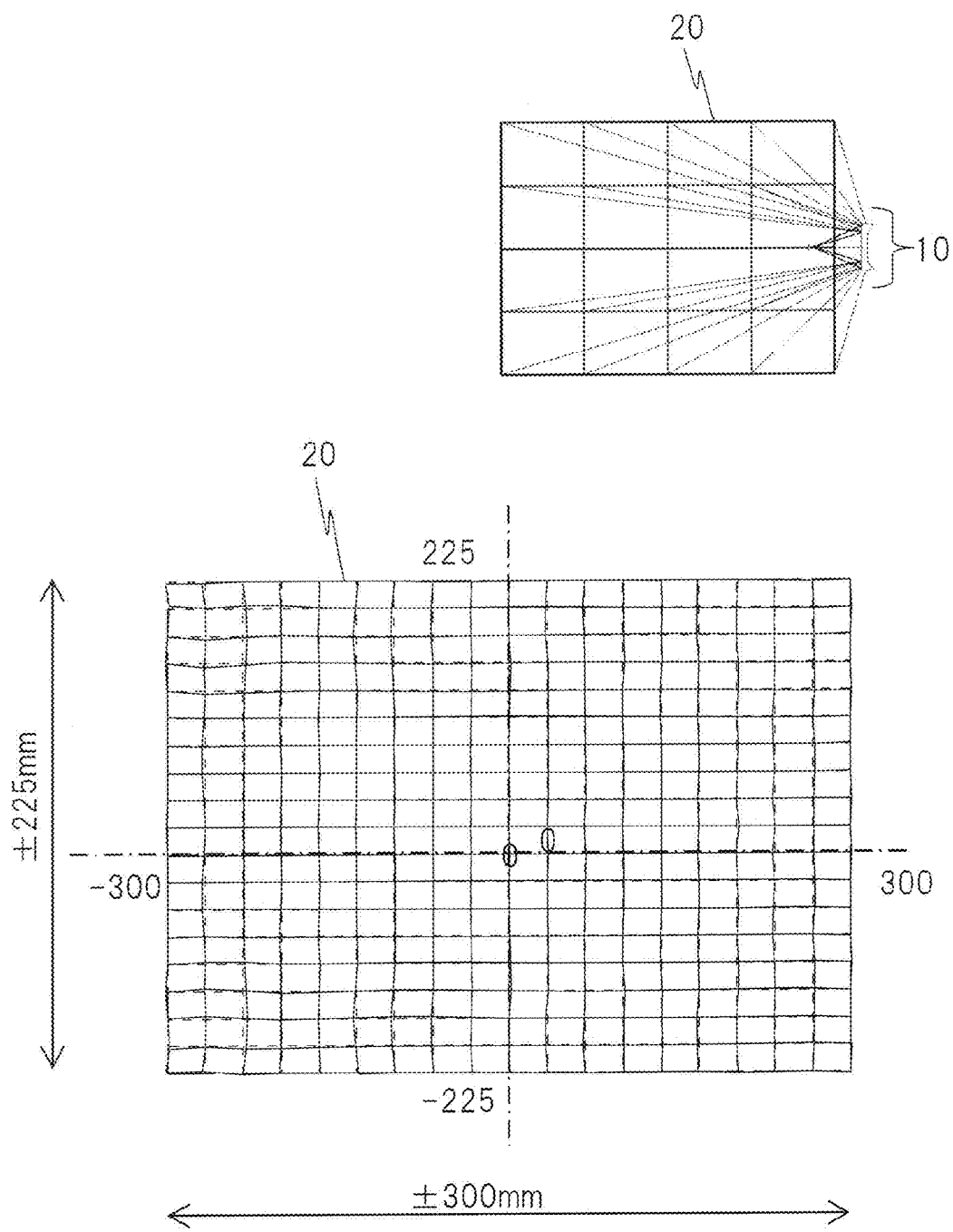
FIG. 36 is a distortion performance diagram of the above optical scanning video projecting apparatus according to the second embodiment.

FIG. 33 is a basic optical configuration diagram according to the second embodiment. FIG. 34 is an enlarged view of an optical scanning video projecting apparatus according to the second embodiment. FIG. 35 is an enlarged view of a freeform surface lens according to the second embodiment. FIG. 36 is a distortion performance diagram according to the second embodiment. Further, Table 4 below denotes one example of lens data according to the second embodiment. Table 5 denotes one example of coefficients of the freeform surface.

TABLE 4

| NAME | SURFACE NUMBER | SHAPE | RADIUS OF CURVATURE | DISTANCE BETWEEN SURFACES | NAME OF GRASS MATERIAL | CONTENT OF ECCENTRICITY AND FALLING |
|---|---|---|---|---|---|---|
| LASER LIGHT SOURCE | (0) | SPHERE | ∞ | 5 | | |
| INCIDENT PUPIL | (1) | SPHERE | ∞ | 0 | | |
| MEMS | (2) | SPHERE | ∞ | 0 | REFLECTIVE SURFACE | DECENTER & RETURN |
| DUMMY SURFACE | (3) | SPHERE | ∞ | −10 | | NORMAL ECCENTRICITY |
| FREEFORM SURFACE LENS | (4) | XY POLYNOMIAL SURFACE | −140.2019 | −5 | PMMA 25' | DECENTER & RETURN |
|  | (5) | XY POLYNOMIAL SURFACE | −87.9970 | −50 | | DECENTER & RETURN |
| FREEFORM SURFACE MIRROR | (6) | XY POLYNOMIAL SURFACE | −2074.526 | 0 | REFLECTIVE SURFACE | DECENTER & RETURN |
| DUMMY SURFACE | (7) | SPHERE | ∞ | 100 | | NORMAL ECCENTRICITY |
| IMAGE PLANE | (8) | SPHERE | ∞ | 0 | | NORMAL ECCENTRICITY |

| | | AMOUNT OF ECCENTRICITY (mm) | | AMOUNT OF FALLING (°) | |
|---|---|---|---|---|---|
| NAME | SURFACE NUMBER | X ECCENTRICITY xde | Y ECCENTRICITY yde | AROUND X AXIS ade | AROUND Y AXIS bde |
| LASER LIGHT SOURCE | (0) | | | | |
| INCIDENT PUPIL | (1) | | | | |
| MEMS | (2) | 0 | 0 | 0 | −39.818 |
| DUMMY SURFACE | (3) | 0 | 0 | 0 | −90.000 |
| FREEFORM SURFACE LENS | (4) | 1.556 | 0 | 0 | 10.869 |
| | (5) | 1.808 | 0 | 0 | −1.11 |
| FREEFORM SURFACE MIRROR | (6) | 38.062 | 0 | 0 | 62.596 |
| DUMMY SURFACE | (7) | 0 | 0 | 0 | 127.800 |
| IMAGE PLANE | (8) | 270 | 0 | 0 | 0 |

TABLE 5

| CODE | | FREEFORM SURFACE LENS | | FREEFORM SURFACE MIRROR |
|---|---|---|---|---|
| | | FOURTH SURFACE | FIFTH SURFACE | SIXTH SURFACE |
| c | 1/R | −0.007132572 | −0.011364024 | −0.000482038 |
| K | K | 0 | 0 | 0 |
| C2 | $X$ | 0.191070273 | −0.35249979 | −0.204793784 |
| C4 | $X^2$ | −0.103663775 | −0.007850465 | −0.005957753 |
| C6 | $Y^2$ | 0.567561957 | −0.03719686 | 0.002400809 |
| C7 | $X^3$ | −0.007521603 | −0.003417279 | 6.10749E−05 |
| C9 | $XY^2$ | 0.091876877 | 0.000517977 | 0.000192292 |
| C11 | $X^4$ | 0.004959388 | 2.6292E−04 | 7.5623E−06 |
| C13 | $X^2Y^2$ | −0.002077849 | 3.9894E−03 | −1.6143E−06 |
| C15 | $Y^4$ | −0.407964888 | 2.9205E−03 | −7.7905E−07 |
| C16 | $X^5$ | −0.002088801 | 1.4189E−04 | 3.3066E−06 |
| C18 | $X^3Y^2$ | 0.003570485 | −2.7959E−04 | −4.7153E−07 |
| C20 | $XY^4$ | −0.142157669 | −7.1242E−04 | 1.7743E−07 |
| C22 | $X^6$ | 0.000829819 | 1.5620E−06 | 3.2352E−08 |
| C24 | $X^4Y^2$ | 0.000617828 | −4.3309E−05 | 6.5997E−10 |
| C26 | $X^2Y^4$ | −0.000686478 | 5.7570E−05 | 3.3298E−09 |
| C28 | $Y^6$ | 0.626930796 | 3.7339E−06 | −2.9924E−09 |
| C29 | $X^7$ | 0.001104665 | 3.0946E−06 | −7.2033E−10 |
| C31 | $X^5Y^2$ | 0.001174248 | 2.8098E−06 | 3.6755E−10 |
| C33 | $X^3Y^4$ | −0.003606619 | 4.8514E−06 | −8.1503E−10 |
| C35 | $XY^6$ | 0.123222494 | −8.9434E−05 | −2.6672E−10 |
| C37 | $X^8$ | −0.000403152 | −5.6393E−07 | −1.1905E−10 |
| C39 | $X^6Y^2$ | 0.000245671 | −5.2579E−06 | −7.9248E−11 |
| C41 | $X^4Y^4$ | −0.007652178 | 3.6503E−06 | −1.2810E−11 |
| C43 | $X^2Y^6$ | 0.032961649 | 8.1001E−07 | 1.3911E−11 |
| C45 | $Y^8$ | −0.590578953 | 9.9163E−06 | 3.2946E−12 |
| C46 | $X^9$ | −0.0002447 | 2.4449E−07 | −9.9787E−13 |
| C48 | $X^7Y^2$ | −0.000655028 | 1.1531E−06 | 4.6133E−12 |
| C50 | $X^5Y^4$ | 0.001749715 | 5.5272E−07 | 1.3281E−12 |
| C52 | $X^3Y^6$ | −0.006489721 | −2.3944E−06 | 1.1915E−12 |
| C54 | $XY^8$ | −0.041212334 | 6.2778E−06 | 7.9863E−14 |
| C56 | $X^{10}$ | 0.00011303 | −5.5414E−08 | −2.6446E−13 |

TABLE 5-continued

| CODE | | FREEFORM SURFACE LENS | | FREEFORM SURFACE MIRROR |
|---|---|---|---|---|
| | | FOURTH SURFACE | FIFTH SURFACE | SIXTH SURFACE |
| C58 | $X^8Y^2$ | 0.00026706 | −1.7895E−08 | 2.4070E−13 |
| C60 | $X^6Y^4$ | −0.000981428 | −2.3583E−07 | −8.1436E−14 |
| C62 | $X^4Y^6$ | 0.007212128 | 3.7389E−07 | −2.2139E−14 |
| C64 | $X^2Y^8$ | −0.026269329 | −3.1933E−07 | −1.1348E−14 |
| C66 | $Y^{10}$ | 0.271096853 | −7.0287E−07 | −1.1555E−15 |

Note that in this second embodiment, the freeform surface lens 2 is configured by one piece, and the other points are similar to those according to the first embodiment described above.

<Third Embodiment>

Moreover, a configuration of an optical scanning apparatus according to a third embodiment will be described with reference to FIG. 37 to FIG. 40.

Figure 37:
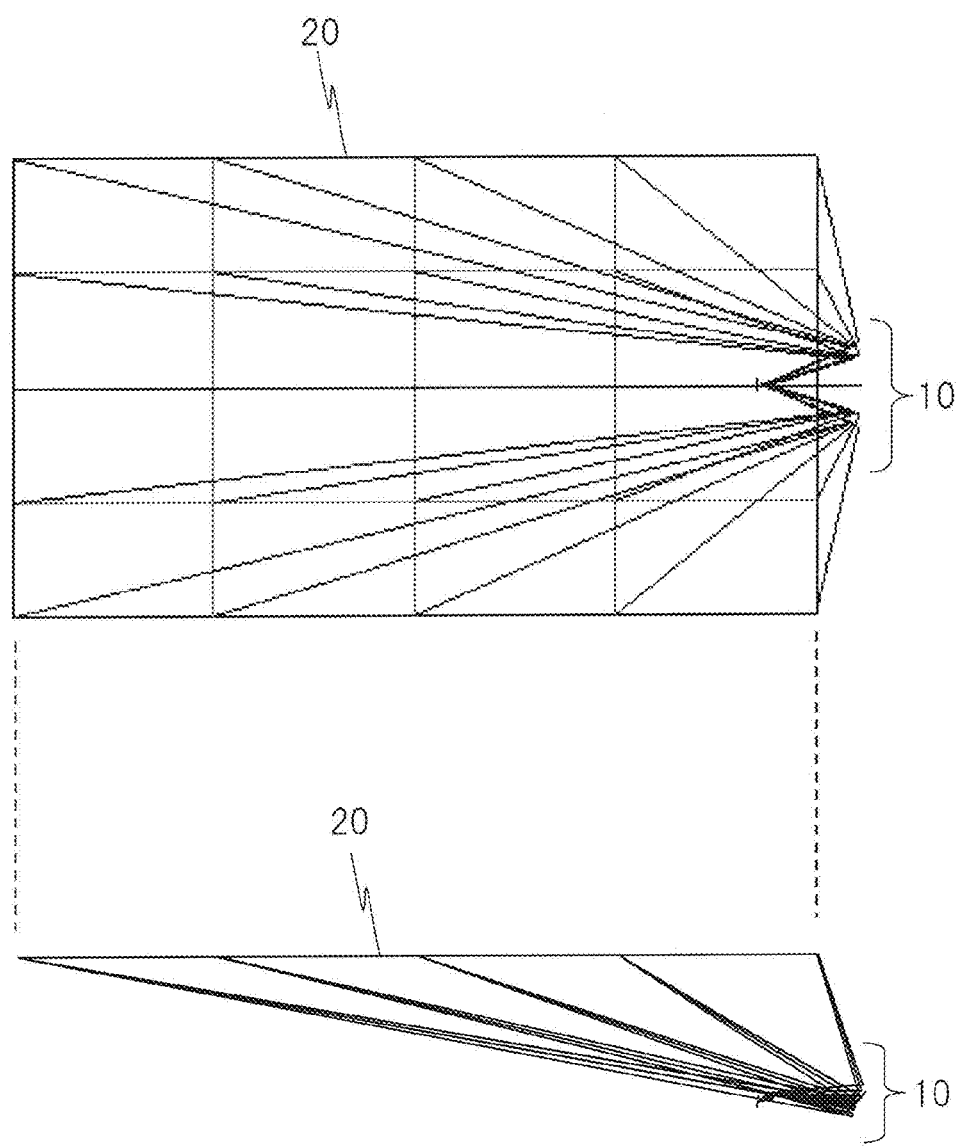
FIG. 37 is a basic optical configuration diagram of the above optical scanning video projecting apparatus according to a third embodiment.
Figure 38:
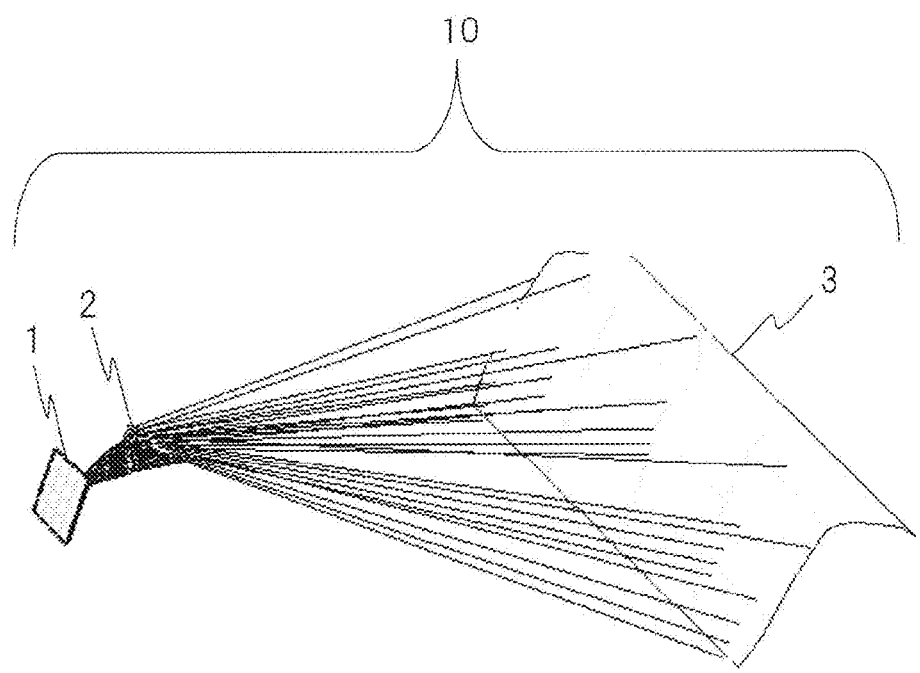
FIG. 38 is an enlarged view of an optical scanning video projecting apparatus in the above optical scanning video projecting apparatus according to the third embodiment.

FIG. 37 is a basic optical configuration diagram according to the third embodiment. FIG. 38 is an enlarged view of an optical scanning video projecting apparatus according to the third embodiment. FIG. 39 is an enlarged view of a freeform surface lens according to the third embodiment. FIG. 40 is a distortion performance diagram according to the third embodiment. Further, Table 6 below denotes one example of lens data according to the third embodiment. Table 7 denotes one example of coefficients of the freeform surface.

TABLE 6

| NAME | SURFACE NUMBER | SHAPE | RADIUS OF CURVATURE | DISTANCE BETWEEN SURFACES | NAME OF GRASS MATERIAL | CONTENT OF ECCENTRICITY AND FALLING |
|---|---|---|---|---|---|---|
| LASER LIGHT SOURCE | (0) | SPHERE | ∞ | 5 | | |
| INCIDENT PUPIL | (1) | SPHERE | ∞ | 0 | | |
| MEMS | (2) | SPHERE | ∞ | 0 | REFLECTIVE SURFACE | DECENTER & RETURN |
| DUMMY SURFACE | (3) | SPHERE | ∞ | −8.5 | | NORMAL ECCENTRICITY |
| FREEFORM SURFACE LENS | (4) | XY POLYNOMIAL SURFACE | ∞ | −2.7 | PMMA 25' | DECENTER & RETURN |
| | (5) | XY POLYNOMIAL SURFACE | ∞ | −0.981 | | DECENTER & RETURN |
| FREEFORM SURFACE LENS | (6) | XY POLYNOMIAL SURFACE | ∞ | −3.5 | PMMA 25' | DECENTER & RETURN |
| | (7) | XY POLYNOMIAL SURFACE | ∞ | −59.819 | | DECENTER & RETURN |
| FREEFORM SURFACE MIRROR | (8) | XY POLYNOMIAL SURFACE | ∞ | 0 | REFLECTIVE SURFACE | DECENTER & RETURN |
| DUMMY SURFACE | (9) | SPHERE | ∞ | 100 | | NORMAL ECCENTRICITY |
| IMAGE PLANE | (10) | SPHERE | ∞ | 0 | | NORMAL ECCENTRICITY |

| | | AMOUNT OF ECCENTRICITY (mm) | | AMOUNT OF FALLING (°) | |
|---|---|---|---|---|---|
| NAME | SURFACE NUMBER | X ECCENTRICITY xde | Y ECCENTRICITY yde | AROUND X AXIS ade | AROUND Y AXIS bde |
| LASER LIGHT SOURCE | (0) | | | | |
| INCIDENT PUPIL | (1) | | | | |
| MEMS | (2) | 0 | 0 | 0 | −40.865 |
| DUMMY SURFACE | (3) | 0 | 0 | 0 | −90.000 |
| FREEFORM SURFACE LENS | (4) | −0.094 | 0 | 0 | 22.012 |
| | (5) | 0.337 | 0 | 0 | 5.086 |
| FREEFORM SURFACE LENS | (6) | 1.990 | 0 | 0 | 21.457 |
| | (7) | 2.322 | 0 | 0 | −4.297 |
| FREEFORM SURFACE MIRROR | (8) | 62.309 | 0 | 0 | 80.113 |
| DUMMY SURFACE | (9) | 0 | 0 | 0 | 129.307 |
| IMAGE PLANE | (10) | 270 | 0 | 0 | 0 |

TABLE 7

| CODE | | FREEFORM SURFACE LENS | | FREEFORM SURFACE LENS | | FREEFORM SURFACE MIRROR |
|---|---|---|---|---|---|---|
| | | FOURTH SURFACE | FIFTH SURFACE | SIXTH SURFACE | SEVENTH SURFACE | EIGHTH SURFACE |
| c | 1/R | 0 | 0 | 0 | 0 | 0 |
| K | K | 0 | 0 | 0 | 0 | 0 |
| C2 | X | 0.346744527 | 0.26782264 | −0.180273253 | −0.309131769 | −0.631304397 |
| C4 | $X^2$ | 0.04252678 | −0.013311811 | −0.055711788 | 0.003492276 | −0.009243924 |
| C6 | $Y^2$ | −0.155063178 | −0.054453872 | 0.832549045 | 0.021625569 | 0.002365015 |
| C7 | $X^3$ | −0.021634778 | 0.004038403 | 0.005476125 | −0.005649828 | 0.000687608 |
| C9 | $XY^2$ | −0.013903268 | 0.020147273 | 0.095469608 | −0.006145659 | 0.000233248 |
| C11 | $X^4$ | −0.000851684 | 6.1694E−04 | 0.005660408 | 1.8017E−04 | 1.6596E−05 |
| C13 | $X^2Y^2$ | 0.013117177 | 8.0799E−03 | 0.019905661 | 2.9934E−03 | −1.1722E−05 |
| C15 | $Y^4$ | −0.019803254 | −2.9061E−01 | −0.443797536 | 2.2993E−03 | −9.8768E−07 |
| C16 | $X^5$ | 0.000105773 | 1.1159E−04 | −0.000171959 | 1.3871E−04 | −9.5748E−07 |
| C18 | $X^3Y^2$ | −0.002889421 | 7.2556E−03 | −0.00221254 | −3.7959E−04 | −6.2226E−07 |
| C20 | $XY^4$ | 0.038443615 | 8.7639E−02 | −0.084230933 | −6.8728E−04 | 8.0919E−08 |
| C22 | $X^6$ | 4.31381E−05 | 2.3962E−05 | 0.000295724 | 4.9598E−06 | 2.3519E−08 |
| C24 | $X^4Y^2$ | 0.003062574 | −4.5787E−04 | −0.000316974 | −3.9453E−06 | 4.6828E−08 |
| C26 | $X^2Y^4$ | 0.006110861 | −1.2666E−02 | −0.025609184 | 2.1866E−05 | 5.6518E−09 |
| C28 | $Y^6$ | −0.062935333 | −1.1715E−01 | 0.45537754 | 7.4176E−05 | −9.1435E−10 |
| C29 | $X^7$ | −4.4624E−06 | 6.7419E−06 | 0.00050416 | 4.5761E−06 | −2.6301E−09 |
| C31 | $X^5Y^2$ | −0.000620824 | −2.3565E−04 | 0.00026525 | 7.1689E−06 | −2.3094E−10 |
| C33 | $X^3Y^4$ | −0.010973323 | 2.2225E−03 | −0.000248937 | 6.8180E−06 | −8.5694E−10 |
| C35 | $XY^6$ | −0.065581465 | 2.4661E−02 | 0.045870765 | −6.3356E−05 | −6.2195E−11 |
| C37 | $X^8$ | −4.84041E−06 | 1.5208E−06 | −0.000200859 | −2.6322E−07 | −3.5249E−10 |
| C39 | $X^6Y^2$ | −7.42022E−05 | −6.2873E−05 | −1.54748E−05 | −4.2365E−06 | −6.3592E−11 |
| C41 | $X^4Y^4$ | 0.002800899 | −8.18545E−04 | −0.000783594 | 4.6472E−06 | −2.1806E−11 |
| C43 | $X^2Y^6$ | −0.031790714 | −1.9997E−02 | 0.039158598 | 2.2779E−06 | 8.3537E−12 |
| C45 | $Y^8$ | 0.059212604 | −7.1397E−01 | −0.411847122 | 7.4042E−07 | 7.3022E−13 |
| C46 | $X^9$ | 6.27795E−08 | −1.5713E−08 | −0.000233248 | 2.6990E−07 | −2.9044E−12 |
| C48 | $X^7Y^2$ | −1.82739E−05 | −4.5629E−06 | 1.16318E−06 | 1.1549E−06 | 8.3784E−12 |
| C50 | $X^5Y^4$ | −0.000499521 | −1.6187E−05 | 0.000915373 | 7.9373E−07 | 1.9435E−12 |
| C52 | $X^3Y^6$ | 0.011648932 | 1.1649E−02 | −5.05992E−05 | −1.8391E−06 | 5.7069E−13 |
| C54 | $XY^8$ | 0.057087544 | −1.5520E−01 | −0.005093218 | 7.7288E−06 | 1.8796E−15 |
| C56 | $X^{10}$ | 1.744E−06 | −2.5337E−07 | 8.77099E−05 | −7.1972E−08 | −3.3208E−14 |
| C58 | $X^8Y^2$ | 1.58227E−05 | 6.8173E−06 | −1.94823E−05 | −9.7713E−08 | 1.1231E−13 |
| C60 | $X^6Y^4$ | 0.000104213 | 1.4834E−05 | −7.59028E−05 | −2.1420E−07 | −5.2882E−14 |
| C62 | $X^4Y^6$ | −0.002043173 | 1.2694E−03 | −0.000559016 | 2.0402E−07 | −1.6189E−14 |
| C64 | $X^2Y^8$ | 0.024744197 | −1.3458E−03 | −0.012352595 | −5.7551E−07 | −3.8572E−15 |
| C66 | $Y^{10}$ | 0.009346022 | 7.0781E−01 | 0.127910068 | −7.8724E−07 | −2.0337E−16 |

In this third embodiment, a swinging angle (resonant swing with horizontal ±5.3° and vertical ±2.9°) of an MEMS as a scanning mirror 1 is essentially for a wide screen of 16:9, and a size of an image plane is thus set as a two-dimensional area of 800×450 mm by 16:9. Only the point is different from that according to the first embodiment described above. As is apparent from FIG. 40, linearity that is distortion performance is greatly improved compared with FIG. 27 indicating linearity that is distortion performance according to the first embodiment. In the scanning mirror 1 that has been developed to scan an image plane of 16:9, it is essentially good to scan the image plane of 16:9 as combination. However, to the contrary, it can be said that the scanning mirror that has been developed as 16:9 can also be applied to an image plane of 4:3 in the configuration in which the freeform surface lens 2 and the freeform surface mirror 3 are used according to the present invention.

<Other Modification Example>

Figure 41:
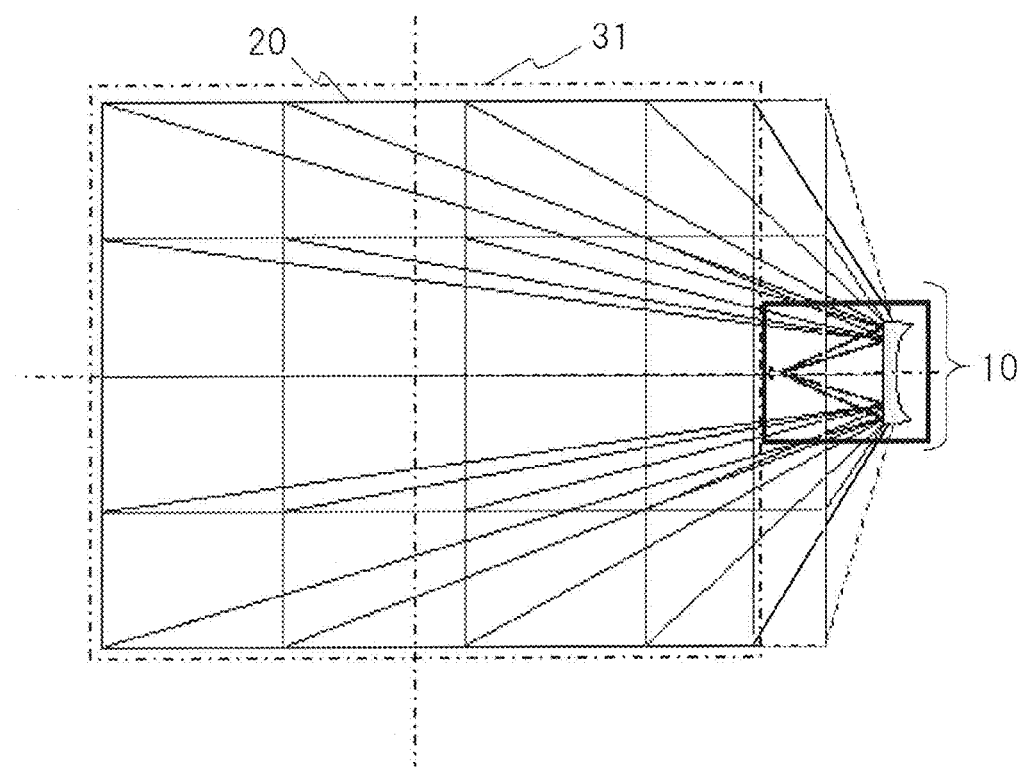
FIG. 41 is a top view illustrating a first usage form of the other modification example of the optical scanning apparatus in the above optical scanning video projecting apparatus.
Figure 42:
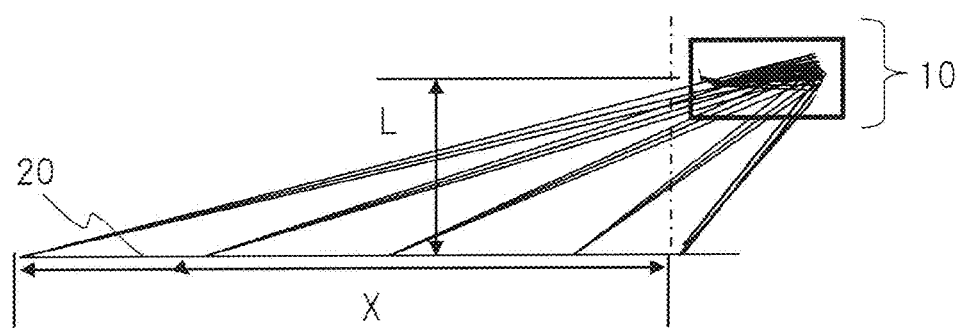
FIG. 42 is a side view illustrating the first usage form of the other modification example of the optical scanning apparatus in the above optical scanning video projecting apparatus.

FIG. 41 and FIG. 42 are explanatory drawings illustrating a first usage form of the other modification example of the optical scanning apparatus. FIGS. 41 and 42 are respectively a top view of the optical scanning apparatus including a scan image surface and a side view thereof.

This usage form according to the modification example has a configuration in which an optical scanning video projecting apparatus 10 including a housing 40 is arranged at an effective upper portion of a scan image surface 20. FIGS. 41 and 42 illustrate a state where laser beams reach divided points of 5×5 on the scan image surface 20. However, only an X axis direction is narrowed from an area (which is displayed by a dashed-dotted line 31 in FIG. 41), to which an effective scanning area in the vicinity of the optical scanning video projecting apparatus 10 is effectively assigned, so that the scanning laser beams do not overlap the optical scanning video projecting apparatus 10. As a result, a freedom degree of installation of the optical scanning video projecting apparatus 10 becomes larger. In addition, even though a size of the optical scanning video projecting apparatus 10 including the housing 40 becomes large, a set does not cut off a scanning image in an actual usage state, whereby it is possible to improve usability thereof.

Further, even though the optical scanning video projecting apparatus 10 is arranged in a vertical direction of a scan screen (in a longitudinal direction of the scan screen in FIG. 41), in the optical scanning apparatus described above and an image display apparatus using this, the set does not cut off the scanning image in the actual usage state due to the above reason.

Figure 43:
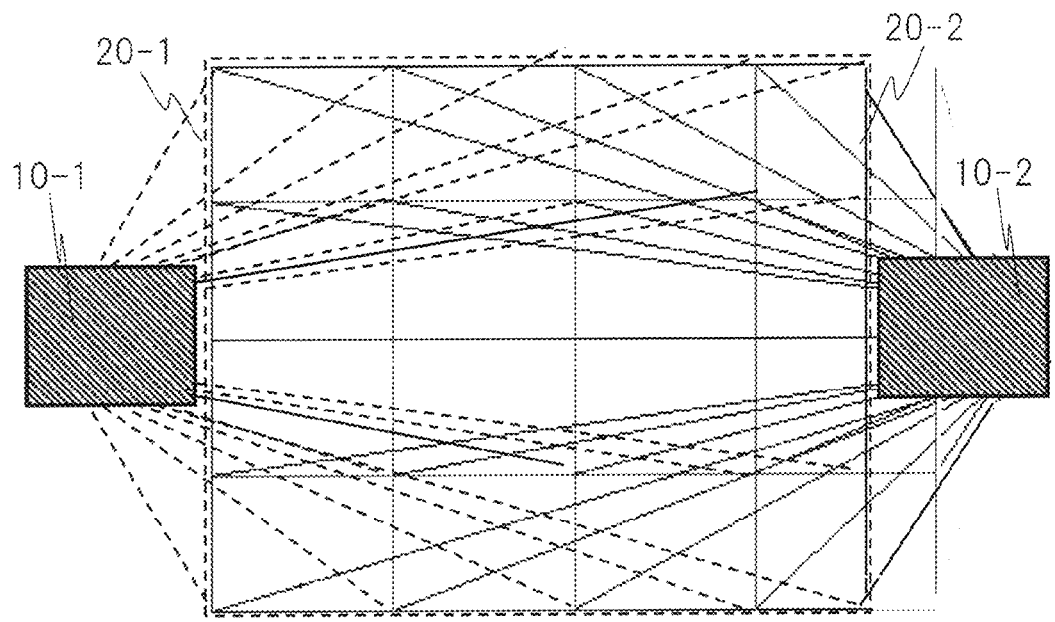
FIG. 43 is a view illustrating a second usage form of the other modification example of the optical scanning apparatus in the above optical scanning video projecting apparatus.

FIG. 43 is an explanatory drawing illustrating a second usage form of the other modification example. A difference from the first usage form illustrated in FIG. 41 is that a plurality of optical scanning apparatuses 10-1 and 10-2 are arranged at different positions of the scan screen (in FIG. 43, two are arranged for convenience of explanation). In the present usage form, the optical scanning apparatuses 10-1, 10-2 can be arranged without cutting off a scan screen display area. Therefore, by using a plurality of optical scanning apparatuses to display the same scanning image and overlap the screens, it is possible to become high luminance.

Further, by intendedly shifting scanning image positions of the plurality of optical scanning apparatuses each having the same resolution, it is possible to view the scanning image so as to increase resolution thereof artificially. By interlacing and creating a scanning image by image information for different fields to overlap the screens, it is possible to improve the resolution thereof.

Figure 44:
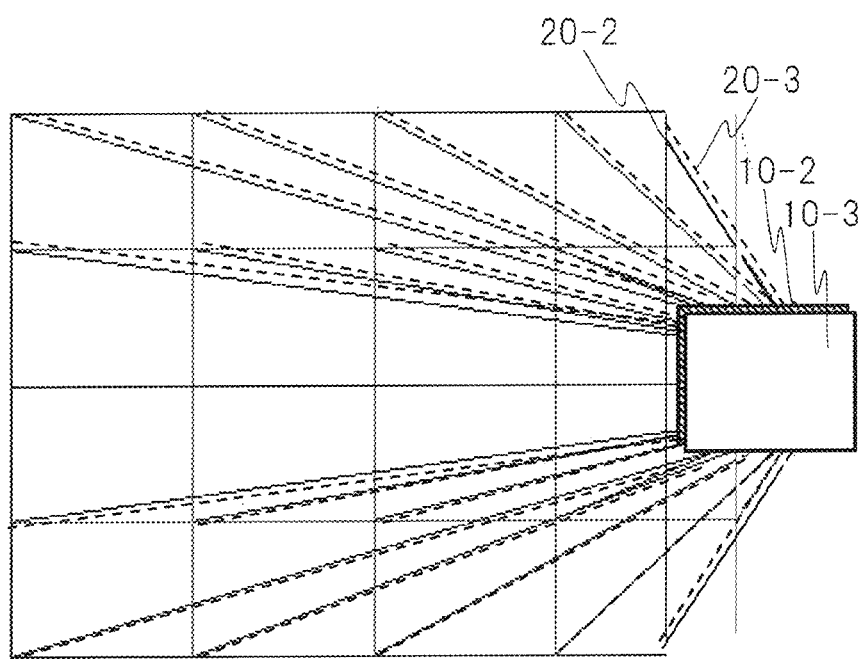
FIG. 44 is a view illustrating a third usage form of the other modification example of the optical scanning apparatus in the above optical scanning video projecting apparatus.

FIG. 44 is an explanatory drawing illustrating a third usage form of the other modification example. In FIG. 44, optical scanning apparatuses 10-2, 10-3 can be arranged without cutting off a scan screen display area. Therefore, by using the plurality of optical scanning apparatuses to display the same scanning image and overlap the screens, it is possible to obtain the similar effects to those in the second usage form described above.

In the rear system projection board apparatus (that is, rear projection video display apparatus) illustrated in FIG. 1 to FIG. 3 according to one embodiment of the present invention or the so-called small front system projection board apparatus (that is, front projection video display apparatus) for table use, which can be mounted on a top surface of a table or the like, illustrated in FIG. 4 to FIG. 6 according to another embodiment of the present invention, the usage form illustrated in FIG. 44 is the better, for example. At this time, it is desirable that a plurality of optical scanning apparatuses or a single optical scanning apparatus is arranged at a lower portion of the projection board apparatus in consideration of stability of the set. However, the optical scanning apparatuses may be arranged in a horizontal direction of the screen as illustrated in FIG. 44 in accordance with an aspect ratio of the screen.

Moreover, in a case where a laser beam of one optical scanning apparatus is set to one polarized wave (for example, P wave), a laser beam of the other optical scanning apparatus is set to the other polarized wave (for example, S wave), and video for a right eye and video for a left eye are respectively set to the scanning images, then it is possible to overlap the screens by using polarization glasses to enjoy a stereoscopic image.

Similarly, by respectively sending video for a right eye and video for a left eye to one optical scanning video projecting apparatus 10 and the other optical scanning apparatus as the scanning images and using special glasses provided with a function to overlap the screens and switch images respectively entering the right and left eyes in time division, it is possible to enjoy a stereoscopic image.

<Uniformity in Brightness of Scan Screen>

Figure 45:
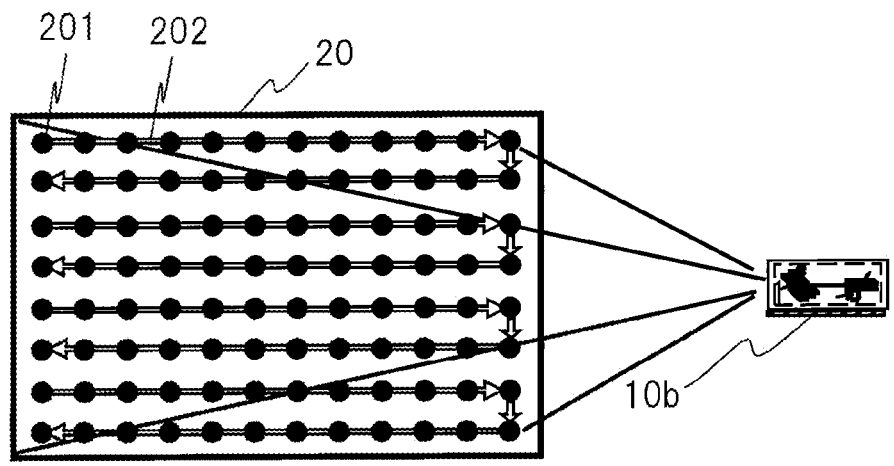
FIG. 45 is a view illustrating a basic configuration of a scanning projection apparatus regarding uniformity in brightness of a scan screen.

Next, a technique to make brightness of a scan screen uniform will be described below. FIG. 45 is an explanatory drawing for explaining its principle. Scanning of a laser beam emitted from the light source 4 (see FIG. 20), which is a main part constituting an optical scanning video projecting apparatus 10b, is deflected by swing of the scanning mirror 1 (see FIG. 20), and then, the laser beam is respectively refracted and reflected by the freeform surface lens 2 (see FIG. 20) and the freeform surface mirror 3 (see FIG. 20) to reach a scan image surface 20.

Figure 46:
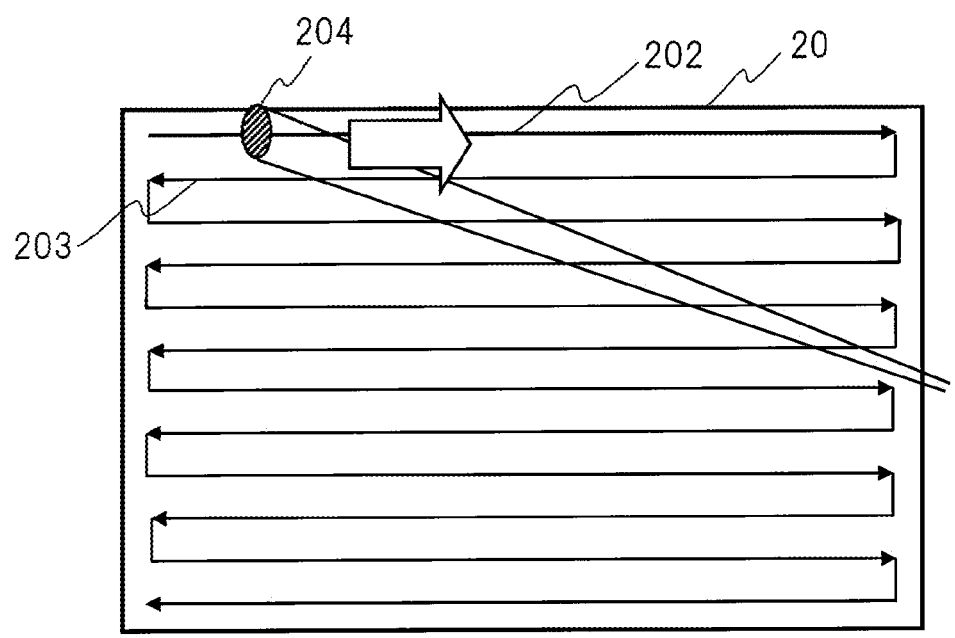
FIG. 46 is an explanatory drawing for explaining a scanning state of laser beam that scans an image plane of the above optical scanning apparatus.
Figure 47:
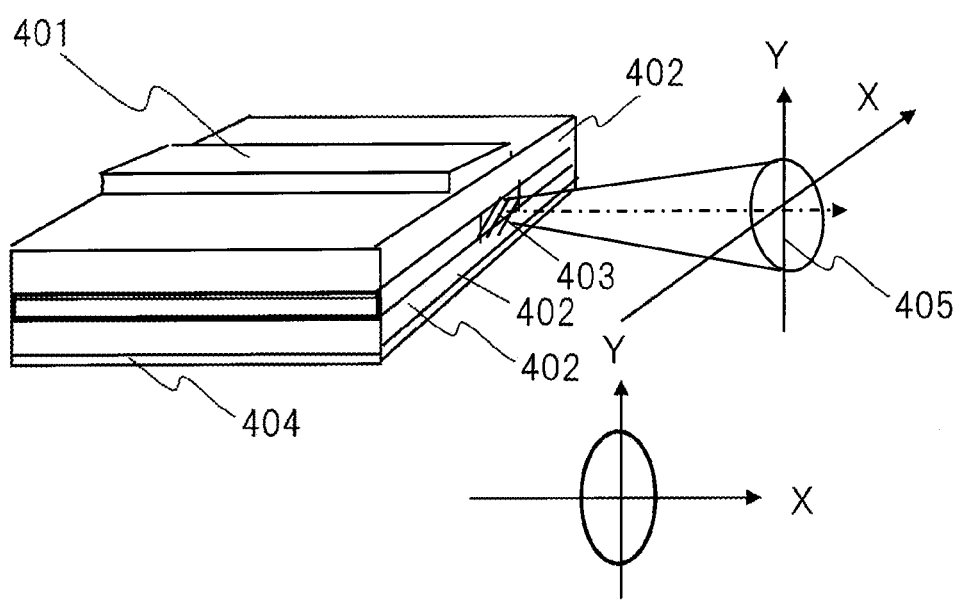
FIG. 47 is a schematic view illustrating a light emitting point of a semiconductor laser in the above optical scanning apparatus.

The laser beam emitted from the optical scanning video projecting apparatus 10b has a spot size (corresponding to one pixel) 201 having a specific size. As illustrated in FIG. 46, a laser beam 204 is scanned on the scan image surface 20 along an arrow 202 in a horizontal direction during first scanning and along an arrow 203 in a reverse direction thereto during second scanning. Thus, since there is no flyback period unlike an interlace system, there is no loss in the scanning time. As a result, resolution thereof is never impaired. As a laser source, a semiconductor laser is configured by a clad layer 402 put between electrodes 401 and 404 and an active region 403 that exists in the clad layer 402 as illustrated in FIG. 47, for example. A spot shape 405 of the emitted laser beam becomes an elliptical shape in which a direction orthogonal to the active region 403 that exists in the clad layer 402 (Y axis in FIG. 47) is a longitudinal direction thereof.

Figure 48:
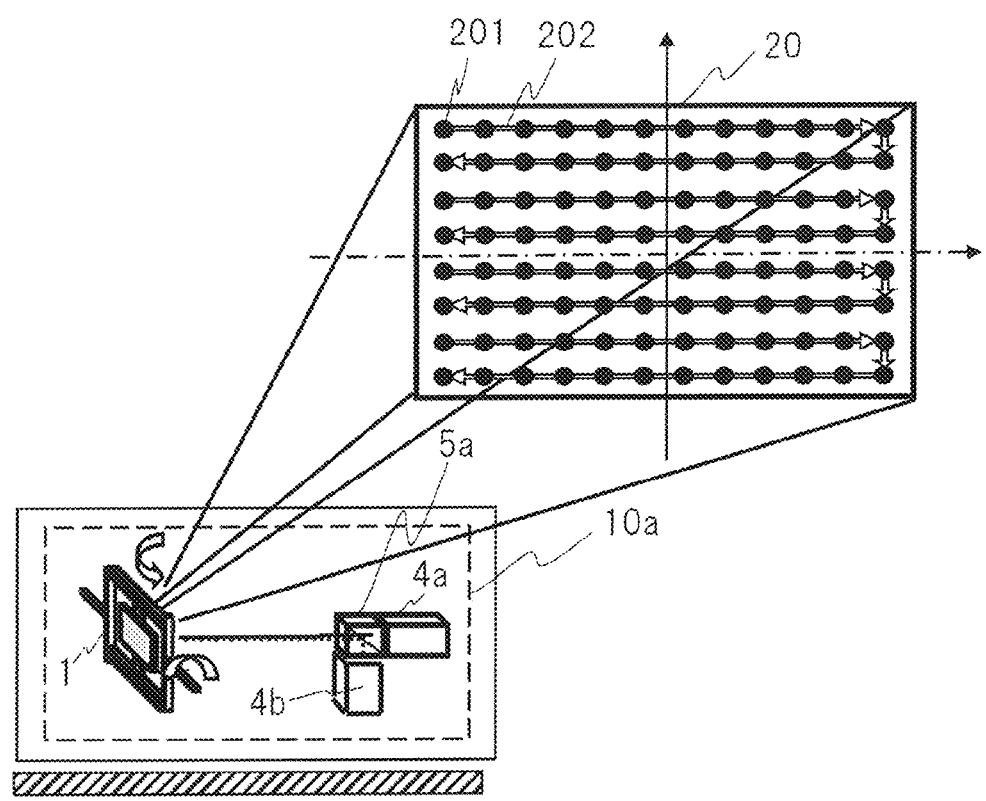
FIG. 48 is a basic configuration diagram for explaining first technical means of the above optical scanning apparatus.

For this reason, in a case where the semiconductor laser whose spot shape becomes an elliptical shape is used as the laser source, as illustrated in FIG. 48, by matching a short side of the ellipsoid spot shape with a direction of a far distance on the scan screen with respect to the optical scanning apparatus (that is, a longitudinal direction in FIG. 48), it is possible to reduce deterioration of the spot shape due to oblique incidence.

Note that, in the conventional technology, as described above, resolution performance was unambiguously determined on the basis of a size of the scan screen determined by an oscillation angle of a scanning mirror when a spot size of the laser beam is determined.

On the other hand, in the optical scanning video projecting apparatus 10b provided with the configuration described above, a final surface of an optical system is configured by a reflective surface. Thus, a laser beam scanned and deflected by a scanning mirror undergoes deflection twice an incident angle on the reflective surface of the mirror. For that reason, it is possible to deflect the laser beam largely with respect to displacement magnitude of the scanning mirror, and it is possible to realize a peculiar feature that an angle with respect to a normal line of a surface of a corresponding freeform surface mirror is differentiated depending upon a corresponding position of the scan screen so that a reflection angle of the freeform surface mirror is different from each other. For this reason, unlike the conventional technology, resolution is not determined only by a spot size of the laser beam and an oscillation angle of the scanning mirror.

Moreover, in the optical scanning video projecting apparatus 10b described above, the laser beam enters each position of the scan screen with a different incident angle. Therefore, there is need to change each of the spot size of the laser beam and luminance or density in accordance with the scanning position independently or by combining them.

Next, first technical means for embodying the content described above will be described.

In the first technical means, as illustrated in FIG. 48, an optical scanning video projecting apparatus 10a is configured by combining a plurality of laser sources. However, for convenience of explanation, a case of two kinds will be described herein.

According to the configuration illustrated in FIG. 48, light from a first light source 4a and light from a second light source 4b are synthesized by a light synthesizer 5a. After the synthesized light is scanned and deflected by means of swing of a scanning mirror 1, the light is refracted by the freeform surface lens 2 (see FIG. 20) and reflected by the freeform surface mirror 3 (see FIG. 20) to reach the scan image surface 20. By using a polarized light synthesis prism as the light synthesizer 5a, for example, and respectively setting a laser beam from the first light source 4a and a laser beam from the second light source 4b to a P-polarized wave and an S-polarized wave, it is possible to synthesize the laser beams effectively.

Moreover, by Generating the P-polarized wave as laser beams of a synthesis optical system or multiple light emitting laser, which synthesizes the laser beams with different wavelengths of RGB oscillated by laser sources in the first light source 4a, and by similarly generating the S-polarized wave as laser beams of a synthesis optical system or multiple light emitting laser, which synthesizes the laser beams with different wavelengths of RGB oscillated by laser sources in the second light source 4b, it is possible to synthesize the laser beams effectively and display color video.

Namely, by changing optical outputs of the laser beams emitted from the first and second laser sources 4a, 4b in accordance with a position of the scan screen, it is possible to improve uniformity of luminance of the whole screen. Note that in order to obtain a high optical output without impairing its reliability, this can be realized by causing current exceeding a rated value to flow in a pulse manner for a specific short period. It goes without saying that at this time, a spot diameter of the synthesized laser beam may also be changed while being synchronized with an output of the laser beam of each of the light sources.

Figure 49:
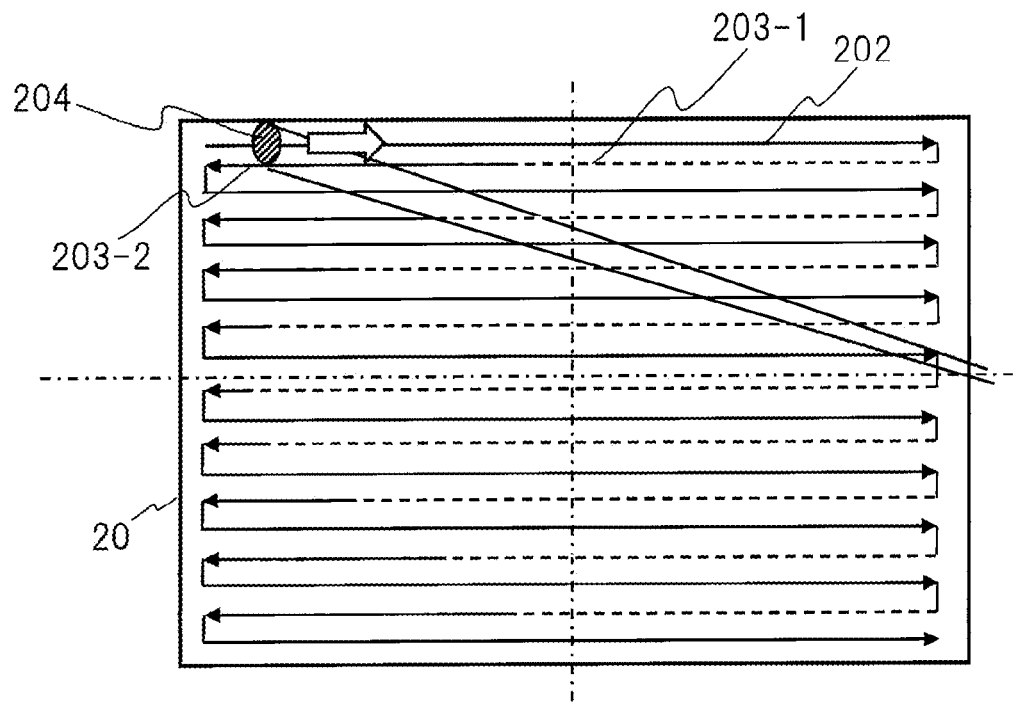
FIG. 49 is an explanatory drawing for explaining a scanning state of laser beam that scans an image plane by means of the first technical means of the above optical scanning apparatus.

FIG. 49 is a principle view for explaining the first technical means to make brightness on the scan screen uniform. An optical scanning apparatus (not illustrated in the drawings) is used to carry out first horizontal scanning along an arrow 202 while making resolution power in a vertical direction of the screen finer, and carry out second scanning along an arrow 203-1 and an arrow 203-2 of a reverse direction. At this time, the laser beam is not emitted (or oscillated) in a region of the arrow 203-1 (which is displayed by a broken line in FIG. 49). As a result, it becomes possible to relatively increase brightness of the screen in a left side of FIG. 49. Similarly, it goes without saying that a region in which the laser beam is to be emitted (or oscillated) can also be controlled freely by changing brightness of a part of the screen (for example, a right side or upper and lower portions) or tilting a change amount of brightness.

Figure 50:
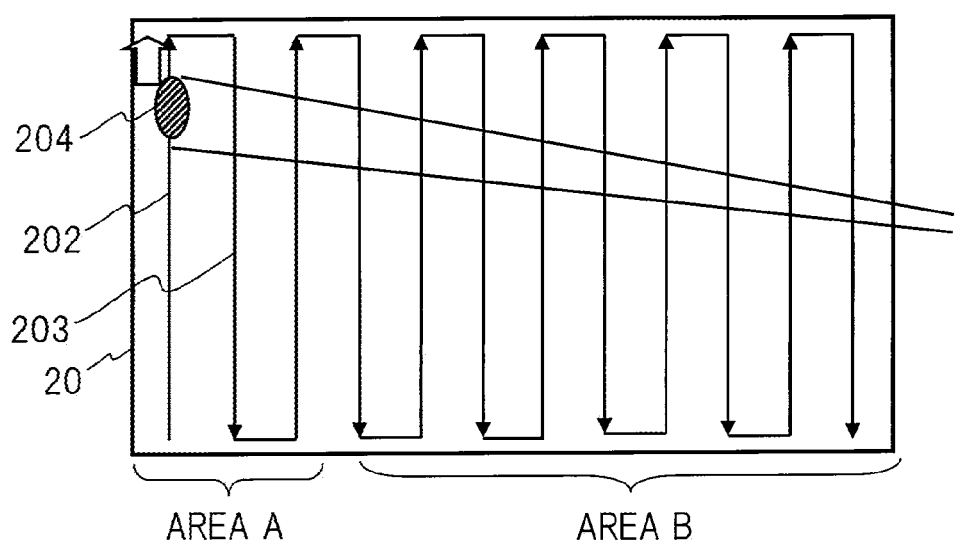
FIG. 50 is an explanatory drawing for explaining a scanning state of laser beam that scans an image plane by means of second technical means of the above optical scanning apparatus.

Moreover, second technical means for embodying the content described above will be described. FIG. 50 is a principle view for explaining the second technical means for making brightness on the scan screen uniform. A difference from the first technical means illustrated in FIG. 49 described above is that an optical scanning apparatus (not illustrated in the drawings) is used to scan a laser beam in a vertical direction of the screen.

Figure 51:
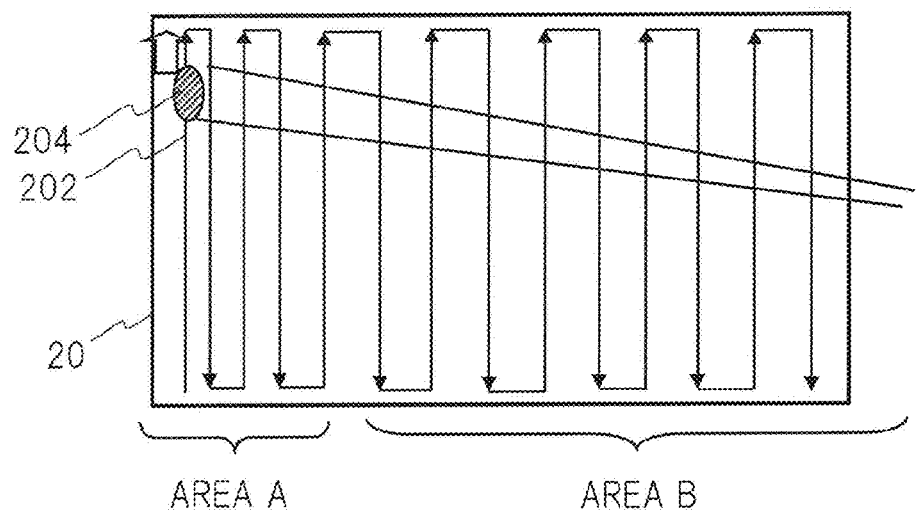
FIG. 51 is an explanatory drawing for explaining a scanning state of laser beam that scans an image plane by means of the other technical means of the above optical scanning apparatus.

In a case where the semiconductor laser whose spot shape becomes an elliptical shape is used as the laser source, by matching a short side of the ellipsoid spot shape of the laser beam 204 with a direction of a far distance on the scan screen with respect to an optical scanning apparatus (not illustrated in the drawings) (that is, a longitudinal direction in FIG. 50), it is possible to reduce deterioration of the spot shape due to oblique incidence. Further, in order to make brightness in the scan screen uniform, for example, by changing a scanning interval in the longitudinal direction of the screen between a scanning area in an area A and a scanning area in an area B as illustrated in FIG. 51, it becomes possible to relatively increase brightness of the screen at a left side of the scan screen. Similarly, it goes without saying that the laser beam is to be emitted (or oscillated) can also be controlled in the scanning area in the vertical direction of the screen freely by changing brightness of a part of the screen (for example, a right side or upper and lower portions) or tilting a change amount of brightness.

Next, a technique to reduce speckles will be described below. As effective technical means for reducing speckles, three technical means described below are effective.

(1) A coherent laser beam is converted into irregular light temporally and/or spatially.
(2) Light with a plurality of wavelengths is mixed without using light with a single wavelength.
(3) intensity of light is changed temporally and/or spatially to generate irregular light.

As one of concrete technical means that realizes (1) and (3) described above, by controlling surface roughness of a surface of a freeform surface mirror used in an oblique project optical system of the optical scanning apparatus, speckles, which are random interference patterns of the laser beam, are suppressed from being generated.

Its realization is achieved by molding plastic and providing reflection coating onto a surface thereof. For this reason, surface roughness of a mold surface can be transferred to surface roughness of a reflective surface of the mirror as it is. Therefore, by controlling the surface roughness of the mold surface, it is possible to reduce speckles.

Figure 52:
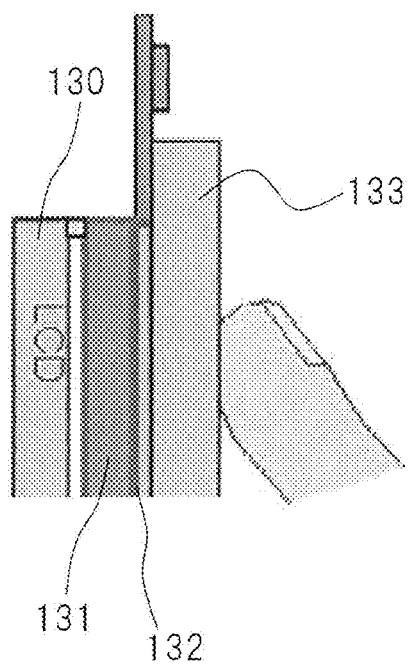
FIG. 52 is a view illustrating a modification example in which an electrostatic type pressure sensor for the above projection board apparatus is incorporated into a screen.

Note that, as illustrated in FIG. 52, an electrostatic type pressure sensor (electrostatic capacitive touch panel) can be incorporated on a surface of the screen 130. More specifically, as illustrated in FIG. 52, this electrostatic type pressure sensor is configured by installing a sensor panel 131 on the surface of the screen 130 and mounting a hard cover (panel) 133 such as glass or acryl on a sensor surface via transparent ITO 132. For example, in an electrostatic capacitive type, by reading a change in electrostatic capacity of a sensor circuit, a coordinate position is detected and read. Further, in a surface type, in a state where voltage is applied to electrodes of four corners to form an even electric field on a panel surface, by reading a change in the electric field when a finger is touched, it becomes possible to detect a coordinate position.

By incorporating such an electrostatic capacitive touch panel thereon, for example, in a case where the projection board apparatus according to the present invention is used to display an image of a personal computer on the screen 130, it is possible to carry out an operation of the personal computer by touching the screen 130 by means of the finger of a user.

Although the various embodiments have been explained in detail, the present invention is not limited to only the embodiments described above. Various modification examples may be included therein. For example, in the above embodiments, the whole apparatus has been described in detail for clearly explaining the present invention. However, the apparatus is not necessarily limited to one provided with the whole configuration that has been explained. Further, a part of the configuration of a certain embodiment can be replaced by the configuration of the other embodiment, and the configuration of the other embodiment can be added to the configuration of a certain embodiment. Further, the other configuration can be added to, removed from, or replaced by a part of the configuration of each of the embodiments.

REFERENCE SINGS LIST

1 . . . optical scanning unit, . . . scanning mirror, 2 . . . freeform surface lens, 3 . . . freeform surface mirror, 4 . . . light source, 5a . . . light synthesizer, 10 . . . optical scanning video projecting apparatus, 10a, 10b, 10-1, 10-2, 10-3 . . . optical scanning apparatus, 20 . . . image plane, 40 . . . housing, 61 . . . optical path changer, 63 . . . inclined surface, 113 . . . screen holder (stand), 130 . . . projection screen (semitransparent screen), 401, 404 . . . electrode, 402 . . . clad layer, and 403 . . . active region.

The invention claimed is:

1. A projection video display apparatus comprising:
a video projection screen that is arranged in an indoor space in a state where, both a rear surface and a front surface of the projection screen are exposed to the indoor space wherein the video projection screen is configured to:
guide a video light toward the front surface of the video projection screen, and
cause part of the light in the indoor space to be transmitted therethrough; and
a video projector arranged at a predetermined position on a side of the rear surface or the front surface of the video projection screen, wherein the video projector is configured to:
enlarge and project a video from the rear surface or the front surface of the video projection screen by scanning the video light on the video projection screen, wherein the video light is obtained from light with a specific wavelength alone or by synthesizing the light with the specific wavelength, and
wherein the video projection screen includes a reflection layer, with a reflection factor that is set with respect to a specific polarized wave included in the video light.

2. The projection video display apparatus according to claim 1, wherein the reflection layer is formed on a whole display surface of the rear surface of the video projection screen, and
the reflection layer is configured to guide the video light in a predetermined direction.

3. The projection video display apparatus according to claim 2, wherein the reflection layer is configured by forming reflection coating on a part of a circular Fresnel lens or a linear Fresnel lens that is formed on an entirety of the rear surface of the video projection screen.

4. The projection video display apparatus according to claim 1, wherein the reflection layer includes a circular Fresnel lens formed on an entirety of the rear surface of the video projection screen, wherein a center of the circular Fresnel lens is positioned outside an external form of the video projection screen.

5. The projection video display apparatus according to claim 1, wherein the video light is composed of coherent light and emitted as an S-polarized light wave.

6. The projection video display apparatus according to claim 5, wherein the projector includes:
a light source configured to supply a coherent light beam;
an optical scanning unit configured to scan the light beam emitted from the light source by reciprocatingly swinging movement of a reflective surface; and
an optical scanning unit configured to carry out optical scanning for the light beam emitted from the light source of a two-dimensional scanning area in an image plane in two directions by the reciprocatingly swinging movement of the reflective surface, the two directions including a long side direction that is a main scanning direction and a short side direction that is a vertical scanning direction.

7. The projection video display apparatus according to claim 6, wherein the projector further includes:
an optical system between the optical scanning unit and the image plane, the optical system being configured to enlarge a scanning angle of the scanned light beam, and wherein the optical system at least includes one curved surface lens at a side of the optical scanning unit and one curved surface mirror at a side of the image plane in a plane different from a first plane, the first plane being defined by an incident ray and a reflected ray in the curved surface mirror when the optical scanning unit remains stationary at a center of the scanning area.

8. The projection video display apparatus according to claim 1, further comprising:
a sensor configured to detect a position coordinate that a finger of a user touches the video projection screen.

9. The projection video display apparatus according to claim 8, wherein the sensor is composed of an electrostatic type pressure sensor.

* * * * *